(12) United States Patent
Selman

(10) Patent No.: US 12,411,896 B1
(45) Date of Patent: Sep. 9, 2025

(54) DOCUMENT GRAPH

(71) Applicant: DocuSign, Inc., San Francisco, CA (US)

(72) Inventor: Daniel Selman, Winchester (GB)

(73) Assignee: Docusign, Inc., San Francisco, CA (US)

( * ) Notice: Subject to any disclaimer, the term of this patent is extended or adjusted under 35 U.S.C. 154(b) by 0 days.

(21) Appl. No.: 18/423,235

(22) Filed: Jan. 25, 2024

(51) Int. Cl.
*G06F 16/30* (2019.01)
*G06F 16/903* (2019.01)
*G06F 16/93* (2019.01)

(52) U.S. Cl.
CPC ........ *G06F 16/93* (2019.01); *G06F 16/90335* (2019.01)

(58) Field of Classification Search
CPC ............................ G06F 16/93; G06F 16/90335
See application file for complete search history.

(56) References Cited

U.S. PATENT DOCUMENTS

2023/0079343 A1\* 3/2023 Roy ........................ G06F 16/93
707/739

\* cited by examiner

*Primary Examiner* — Baoquoc N To
(74) *Attorney, Agent, or Firm* — KDW FIRM PLLC

(57) ABSTRACT

A method, an apparatus, and a computer-readable storage medium for generating a document graph. A plurality of electronic documents is received. Each electronic document has a predetermined document type. A machine learning model is selected from the plurality of machine learning models based on the predetermined document type. The selected machine learning model is instructed to extract a plurality of document portions from each electronic document in the plurality of electronic documents in accordance with the predetermined document type. A relationship between two or more document portions is defined based on the content of each document portion, and the document portions are associated based on the relationship. A graph structure having a plurality of nodes is generated. Each node includes at least one document portion. Each node is connected to another node in accordance with the relationship between document portions included in the nodes. The graph structure is stored.

20 Claims, 23 Drawing Sheets

DOCUMENT GRAPH

BACKGROUND

An electronic document management platform allows organizations to manage a growing collection of electronic documents, such as electronic agreements. Preparation of agreements is a highly complex process that typically involves substantial research into the subject matter of the agreement, parties to the agreement, terms and conditions of the agreement, regulatory requirements (if any), and other information. Once information is assembled, the agreement is prepared and negotiations between parties may ensue. Some agreements may require specific language to be included in its clauses. Moreover, some parties may wish particular wording to be used when certain clauses are included. Other requirements, including regulatory requirements, may also need to be incorporated into the language of the agreement. Inclusion of improper language may cause a breakdown in negotiations, agreements to become unenforceable, and result in various other legal problems. Some parties have prior agreements that they have entered into that may be helpful for generation of future agreements. However, such existing agreements may need to be tailored to specific contractual obligations, circumstances, etc. Ensuring that all agreement requirements, conditions, etc. are represented in the final agreements in the proper form is extremely difficult. While existing agreement generation systems are capable of querying agreement storage databases to locate information that may need to be included in new agreements, the queries that these systems execute return incomplete data or, worse, incorrect information.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
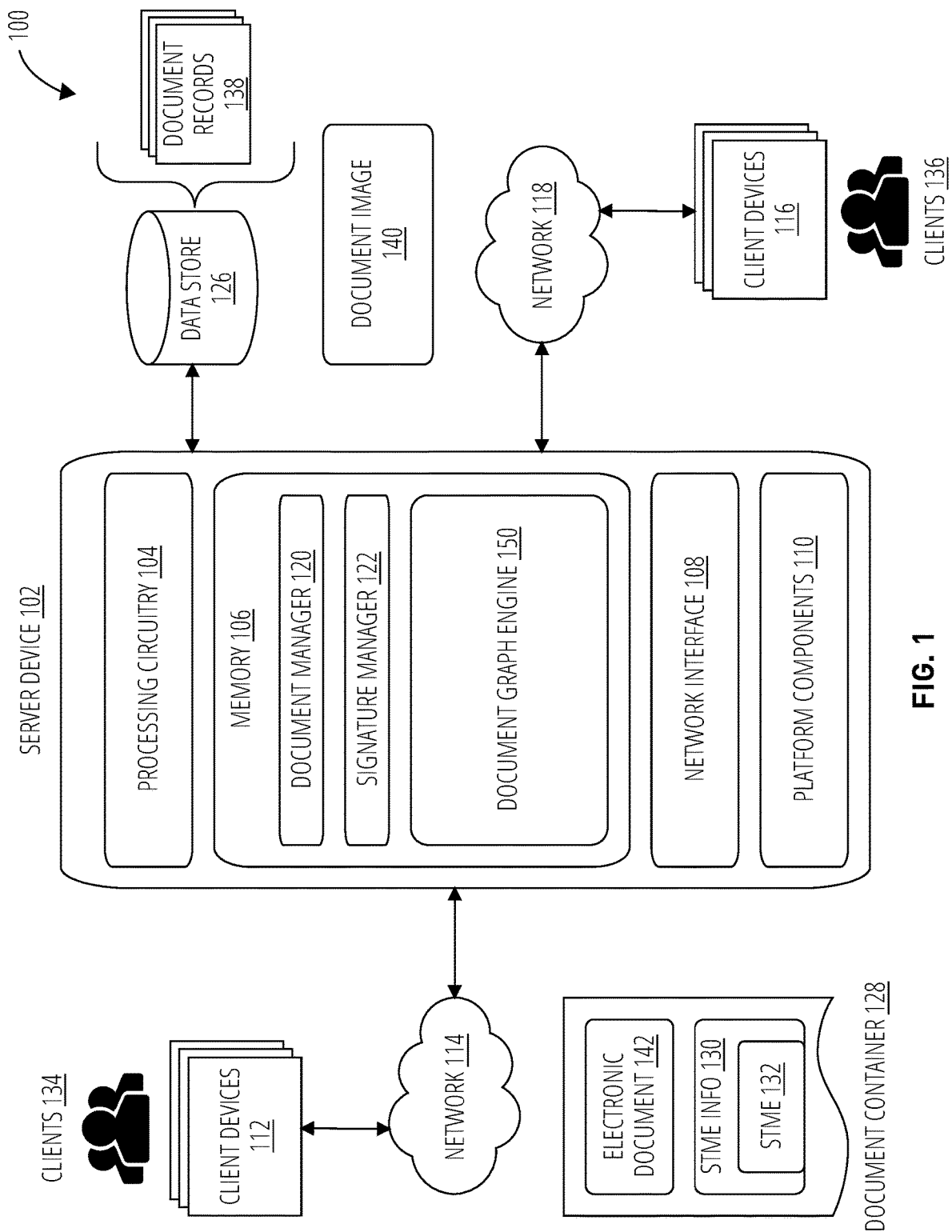
FIG. 1 illustrates an example system, according to some embodiments of the current subject matter.

Embodiments disclosed herein are generally directed to techniques for managing a collection of electronic documents within a document management environment. In general, a document may comprise a multimedia record. The term "electronic" may refer to technology having electrical, digital, magnetic, wireless, optical, electromagnetic, or similar capabilities. The term "electronic document" may refer to any electronic multimedia content intended to be used in an electronic form. An electronic document may be part of an electronic record. The term "electronic record" may refer to a contract or other record created, generated, sent, communicated, received, or stored by an electronic mechanism. An electronic document may have an electronic signature. The term "electronic signature" may refer to an electronic sound, symbol, or process, attached to or logically associated with an electronic document, such as a contract or other record, and executed or adopted by a person with the intent to sign the record.

An online electronic document management system provides a host of different benefits to users (e.g., a client or customer) of the system. One advantage is added convenience in generating and signing an electronic document, such as a legally binding agreement. Parties to an agreement can review, revise and sign the agreement from anywhere around the world on a multitude of electronic devices, such as computers, tablets and smartphones.

In some cases, a user may need to search for information contained within electronic documents. For example, electronic agreements may be lengthy and filled with technical, legal or business terms with complex goals and outcomes. Thus, a user may need to search for information within a collection of electronic documents, such as warranty terms, contractual obligations, pricing information, and so forth. Furthermore, during an electronic signing (e-signing) negotiation or process, multiple parties may make extensive modifications or revisions over time to an electronic agreement. A number of revisions typically increases as a function of a length and complexity of an agreement. Consequently, a user may search electronic documents to find revisions to ensure they are acceptable.

Conventional document management systems typically provide search tools to allow a user to perform searches for information within an electronic document (e.g., intra-document searches) or across multiple electronic documents (e.g., inter-document searches) stored as part of a collection of documents (e.g., a document corpus). However, search tools for an electronic document are typically limited to variations of lexical searches. Lexical searching is a process of searching for a particular word or group of words within a given text or corpus. It involves looking for matches of the specified search terms exactly as they appear in the text, without any variations or alterations in spelling, punctuation, or word order. Lexical searching can be useful in a variety of contexts, such as language analysis, information retrieval, and content management. For example, it can be used to identify instances of a specific keyword or phrase in a large dataset, to extract relevant information from unstructured text, or to monitor online conversations for particular topics or keywords.

Moreover, conventional document management systems generally lack an ability to support answering complex agreement process related questions that may be related to location of various electronic documents and/or generation of documents using one or more electronic documents in an existing corpus of documents. For example, a user may submit a query relating to finding a clause in agreement(s) related to "data privacy and data retention". Existing systems will typically conduct a lexical search using these words without determining agreement clauses that may be related to these concepts, such as, for example, "confidentiality", "data breach", etc. Moreover, it is difficult for conventional systems to track entities (e.g., users) that may have been involved in agreement negotiations, e.g., such as, by commenting on agreements, revising the agreements, signing the agreements, etc. Similarly, current document management systems do not keep track of or determine whether particular forms, templates, specific clauses, etc. that may have been used by users to prepare other documents, e.g., agreements, etc. Further, such systems lack an ability to determine how agreements may have been amended over time and how such amendments affected various agreement clauses, rights, obligations of parties, etc. over time.

The current subject matter solves these problems by providing a document graph structure that may, for example, be stored in a graph database and/or any other storage location. The document graph structure may include one or more nodes that may represent an extensible set of entities (e.g., agreements, envelopes, documents, people, companies, web forms, orchestrations, data models, etc.) and edges connecting the nodes that may represent relationships between entities in the nodes (e.g., "SIGNED BY", "INCLUDES CLAUSE", "CREATED FROM", "EMPLOYED BY"). Both nodes and edges may also have an extensible set of properties (e.g., nodes and/or edges may be tagged with various information, e.g., date/time, from/to, etc.). Nodes in the document graph structure may include natural language text (e.g., documents, templates, clauses, etc.) and may store vector embeddings representative of such text, which, upon receiving of a query, may allow execution of a semantic similarity search to find nodes and/or edges in the document graph structure that may be semantically similar to the natural language text.

In some embodiments, one or more machine learning models and/or artificial intelligence (AI) models may be used to populate the document graph structure. For example, the models may be used to transform structured and/or unstructured text from documents (having any desired format, e.g., text, image, video, audio, etc.) into structured nodes and edges in the document graph structure. For example, an electronic document in. PDF format may be received and converted to text, where during analysis, the document may be identified and classified as a mutual non-disclosure agreement (NDA) written in US English. Moreover, paragraphs 4 and 5 of the NDA may be detected to be product warranty clauses. Moreover, the analysis may reveal that the parties to the NDA are Company A and Company B. A document graph structure may be generated where the NDA, as document, may serve a root node that may be connected using edges or relationships (PARTY_TO) to nodes containing Company A and Company B. The root node may also be connected using an edge or relationship (INCLUDES) to a node that contains paragraphs 4 and 5.

Once the document graph structure is populated, it may be used for execution of graph queries that may traverse the nodes and/or edges to retrieve information/data identified by the queries. For example, a query seeking product warranty clauses, may traverse, using semantic similarity searching techniques and/or lexical searching techniques, the root node and access the node that contains paragraphs 4 and 5 using relationship INCLUDES. As can be understood, the current subject matter is not limited to the above examples. Semantic search capability can be very helpful in quickly locating the relevant information within an electronic document, such as an electronic agreement. It saves time compared to manually going through the entire document and it can be especially useful in cases where the document is very long or complex.

Semantic searching is a process of searching for information by understanding the meaning behind the search query and the content being searched. It involves analyzing the context, relationships, and connections between words and concepts to provide more accurate and relevant search results. Unlike lexical searching, which relies on exact matches of search terms, semantic searching takes into account the overall meaning and intent of the query, as well as the meaning and relationships between words and phrases within the content being searched. This enables semantic search engines to deliver more precise and personalized results, even when the search terms used may not be an exact match with the content being searched. Semantic searching uses advanced technologies such as natural language processing (NLP), machine learning, and artificial intelligence (AI) to analyze and understand the meaning and relationships between words and concepts in order to provide more accurate and relevant search results. It is particularly useful for searching large and complex datasets, such as scientific papers, legal documents, and other types of unstructured data, where traditional keyword-based searches may not be effective.

In some embodiments, the current subject matter may be configured to generate a document graph structure based on a plurality of electronic documents. The documents may be labeled and/or unlabeled electronic documents (e.g., documents stored in electronic format, e.g., .docx, .pdf, .html, etc.) that may be obtained from one or more storage locations. Labeled documents may be documents that may have been previously analyzed (either manually and/or using a machine learning model) and labeled. For example, to label a lease agreement, the agreement may be parsed into specific clauses, paragraphs, sentences, words, etc. and/or any other portions (such as, for example, through use of optical character recognition, etc.). Upon analysis of these portions (such as, for example, through natural language processing, and/or any other mechanisms), various labels, identifiers, metadata, and/or any other identification may be assigned to the portions indicating content of each specific portion (e.g., "termination label" may be assigned to a termination clause of the lease agreement, etc.). Alternatively, or in addition, the labels may identify the entire document, any summary/ies of the document and/or any of its portions. The labels may be stored together with the documents in a storage location. The labels may be stored in any desired fashion.

Alternatively, or in addition, the electronic documents may be unlabeled documents. Unlabeled documents may be documents that may be stored in any public and/or private storage locations, databases, etc. For example, the documents may be stored in one or more government databases (e.g., SEC-EDGAR, etc.), non-governmental databases, third party publicly accessible databases, member-access based databases, etc. The unlabeled documents may or may not have been parsed, analyzed, etc. The documents in such storage locations may or may not include identification information that may identify the document and/or any portions thereof.

Each document may have a predetermined type, e.g., agreement types, legal document types, non-legal document types, and any combinations thereof. Moreover, the current subject matter may be configured to receive and/or ingest an electronic document that may be represented in any desired format (e.g., .pdf, .docx, etc.), where documents may be stored in a single or a unified database and/or storage location. The documents may include, for instance, text, graphics, images, tables, audio, video, computing code (e.g., source code, etc.) and/or any other type of media.

In some embodiments, upon receipt, retrieval, etc. of the electronic documents, the current subject matter may be configured to select a machine learning (ML) model (e.g., from a plurality of machine learning models) based on the type of the document that is to be processed. For example, one model may be used for processing of lease agreements, while another model may be used for processing of master service agreements, etc. Alternatively, or in addition, a single model may be used to process all documents. The ML models may include at least one of the following: a large language model, at least another generative AI model, and any combination thereof. The generative AI models may be part of the current subject matter system and/or be one or more third party models (e.g., ChatGPT, Bard, DALL-E, Midjourney, DeepMind, etc.). In some embodiments, the model may be provided with specific types of electronic documents, specific document portions of the electronic document, the electronic documents themselves, and/or any other information to assess a structure of the document(s) and their respective portions. For example, the generative AI model may be provided with the sales agreement and asked to determine where each clause of the agreement (e.g., termination, law of the agreement, sales terms, etc.) are located and identify specific relationships between clauses.

Alternatively, or in addition, the model may be provided with multiple documents (same or different types) and may be asked to retrieve specific portions of the agreements and determine them to be representative of a particular clause. The models may determine that a particular language of a clause (e.g., termination clause) is standard across several sales agreements. In some embodiments, the ML model(s) may be asked to extract document portions from each electronic document that they have been provided with. The analysis/extractions may be made in accordance with the predetermined document type of each electronic document.

As stated above, the ML model(s) may be used to define relationship(s) between document portions (e.g., two or more) that the model(s) have determined/extracted. The relationship(s) may be determined based on analyzing content of each document portion in the document portions. Once relationship is determined, the current subject matter may be configured to associate the document portions based on the relationship. In some embodiments, to define relationship(s) between nodes, the current subject matter may be configured to execute a semantic searching of the document portions (e.g., using an ML model (same or different from the one that initially processed the documents) to determine the content of each document portion. The content of each document portion may be used to a label for each document portion and assign each generated label to a node in the document graph structure that has the corresponding document portion.

Once analysis of the electronic documents is complete, the current subject matter may be configured to generate a document graph structure. The document graph structure may include a plurality of nodes, where each node may include at least one document portion and may be connected to another node in accordance with the determined relationship between document portions included in these nodes. The graph structure may be stored in at least one storage location.

In some embodiments, document portion(s) included in each node in the document graph structure may be represented by at least one vector embedding, which may be generated by ML model(s) (same or different than other ML model(s) used herein) based on the document portion. The vector embeddings may be used to assist in handling of queries seeking information about documents. For example, upon receipt of a query (e.g., "find all termination clauses in lease agreements"), the current subject matter may be configured to generate one or more search vectors (e.g., a word level vector, a sentence level vector, a paragraph level vector, and any combination thereof) and use the search vectors to search the plurality of vector embeddings in the document graph structure. Upon finding one or more semantic similarities between the vector embeddings and the search vectors, a response to the query may be generated. In some embodiments, the query may be any type of query, including, for example, but not limited to, a natural language representation query.

The present disclosure will now be described with reference to the attached drawing figures, wherein like reference numerals are used to refer to like elements throughout, and wherein the illustrated structures and devices are not necessarily drawn to scale. As utilized herein, terms "component," "system," "interface," and the like are intended to refer to a computer-related entity, hardware, software (e.g., in execution), and/or firmware. For example, a component can be a processor (e.g., a microprocessor, a controller, or other processing device), a process running on a processor, a controller, an object, an executable, a program, a storage device, a computer, a tablet PC and/or a user equipment (e.g., mobile phone, etc.) with a processing device. By way of illustration, an application running on a server and the server can also be a component. One or more components can reside within a process, and a component can be localized on one computer and/or distributed between two or more computers. A set of elements or a set of other components can be described herein, in which the term "set" can be interpreted as "one or more."

Further, these components can execute from various computer readable storage media having various data structures stored thereon such as with a module, for example. The components can communicate via local and/or remote processes such as in accordance with a signal having one or more data packets (e.g., data from one component interacting with another component in a local system, distributed system, and/or across a network, such as, the Internet, a local area network, a wide area network, or similar network with other systems via the signal).

As another example, a component can be an apparatus with specific functionality provided by mechanical parts operated by electric or electronic circuitry, in which the electric or electronic circuitry can be operated by a software application, or a firmware application executed by one or more processors. The one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

Use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description and the claims, such terms are intended to be inclusive in a manner similar to the term "comprising." Additionally, in situations wherein one or more numbered items are discussed (e.g., a "first X", a "second X", etc.), in general the one or more numbered items may be distinct, or they may be the same, although in some situations the context may indicate that they are distinct or that they are the same.

As used herein, the term "circuitry" may refer to, be part of, or include a circuit, an integrated circuit (IC), a monolithic IC, a discrete circuit, a hybrid integrated circuit (HIC), an Application Specific Integrated Circuit (ASIC), an electronic circuit, a logic circuit, a microcircuit, a hybrid circuit, a microchip, a chip, a chiplet, a chipset, a multi-chip module (MCM), a semiconductor die, a system on a chip (SoC), a processor (shared, dedicated, or group), a processor circuit, a processing circuit, or associated memory (shared, dedicated, or group) operably coupled to the circuitry that execute one or more software or firmware programs, a combinational logic circuit, or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

FIG. 1 illustrates an embodiment of a system 100. The system 100 may be suitable for implementing one or more embodiments as described herein. In one embodiment, for example, the system 100 may comprise an electronic document management platform (EDMP) suitable for managing a collection of electronic documents. An example of an EDMP includes a product or technology offered by DocuSign®, Inc., located in San Francisco, California ("DocuSign"). DocuSign is a company that provides electronic signature technology and digital transaction management services for facilitating electronic exchanges of contracts and signed documents. An example of a DocuSign product is a DocuSign Agreement Cloud that is a framework for generating, managing, signing and storing electronic documents on different devices. It may be appreciated that the system 100 may be implemented using other EDMA, technologies and products as well. For example, the system 100 may be implemented as an online signature system, online document creation and management system, an online workflow management system, a multi-party communication and interaction platform, a social networking system, a marketplace and financial transaction management system, a customer record management system, and other digital transaction management platforms. Embodiments are not limited in this context.

The system 100 may implement an EDMP as a cloud computing system. Cloud computing is a model for providing on-demand access to a shared pool of computing resources, such as servers, storage, applications, and services, over the Internet. Instead of maintaining their own physical servers and infrastructure, companies can rent or lease computing resources from a cloud service provider. In a cloud computing system, the computing resources are hosted in data centers, which are typically distributed across multiple geographic locations. These data centers are designed to provide high availability, scalability, and reliability, and are connected by a network infrastructure that allows users to access the resources they need. Some examples of cloud computing services include Infrastructure-as-a-Service (IaaS), Platform-as-a-Service (PaaS), and Software-as-a-Service (SaaS).

The system 100 may implement various search tools and algorithms designed to search for information within an electronic document or across a collection of electronic documents. Within the context of a cloud computing system, the system 100 may implement a cloud search service accessible to users via a web interface or web portal front-end server system. A cloud search service is a managed service that allows developers and businesses to add search capabilities to their applications or websites without the need to build and maintain their own search infrastructure. Cloud search services typically provide powerful search capabilities, such as faceted search, full-text search, and auto-complete suggestions, while also offering features like scalability, availability, and reliability. A cloud search service typically operates in a distributed manner, with indexing and search nodes located across multiple data centers for high availability and faster query responses. These services typically offer application program interfaces (APIs) that allow developers to easily integrate search functionality into their applications or websites. One major advantage of cloud search services is that they are designed to handle large-scale data sets and provide powerful search capabilities that can be difficult to achieve with traditional search engines. Cloud search services can also provide advanced features, such as machine learning-powered search, natural language processing, and personalized recommendations, which can help improve the user experience and make search more efficient. Some examples of popular cloud search services include Amazon CloudSearch, Elasticsearch, and Azure Search. These services are typically offered on a pay-as-you-go basis, allowing businesses to pay only for the resources they use, making them an affordable option for businesses of all sizes.

In general, the system 100 may allow users to generate, revise and electronically sign electronic documents. When implemented as a large-scale cloud computing service, the system 100 may allow entities and organization to amass a significant number of electronic documents, including both signed electronic documents and unsigned electronic documents. As such, the system 100 may need to manage a large collection of electronic documents for different entities, a task that is sometimes referred to as contract lifecycle management (CLM). An overview of the workflows and processes used to support CLM operations, including searching and summarizing search results, is described in more detail below.

As depicted in FIG. 1, the system 100 may comprise a server device 102 communicatively coupled to a set of client devices 112 via a network 114. The server device 102 may also be communicatively coupled to a set of client devices 116 via a network 118. The client devices 112 may be associated with a set of clients 134. The client devices 116 may be associated with a set of clients 136. In one network topology, the server device 102 may represent any server device, such as a server blade in a server rack as part of a cloud computing architecture, while the client devices 112 and the client devices 116 may represent any client device, such as a smart wearable (e.g., a smart watch), a smart phone, a tablet computer, a laptop computer, a desktop computer, a mobile device, and so forth. The server device 102 may be coupled to a local or remote data store 126 to store document records 138. It may be appreciated that the system 100 may have more or less devices than shown in FIG. 1 with a different network topology as needed for a given implementation. Embodiments are not limited in this context.

Figure 22:
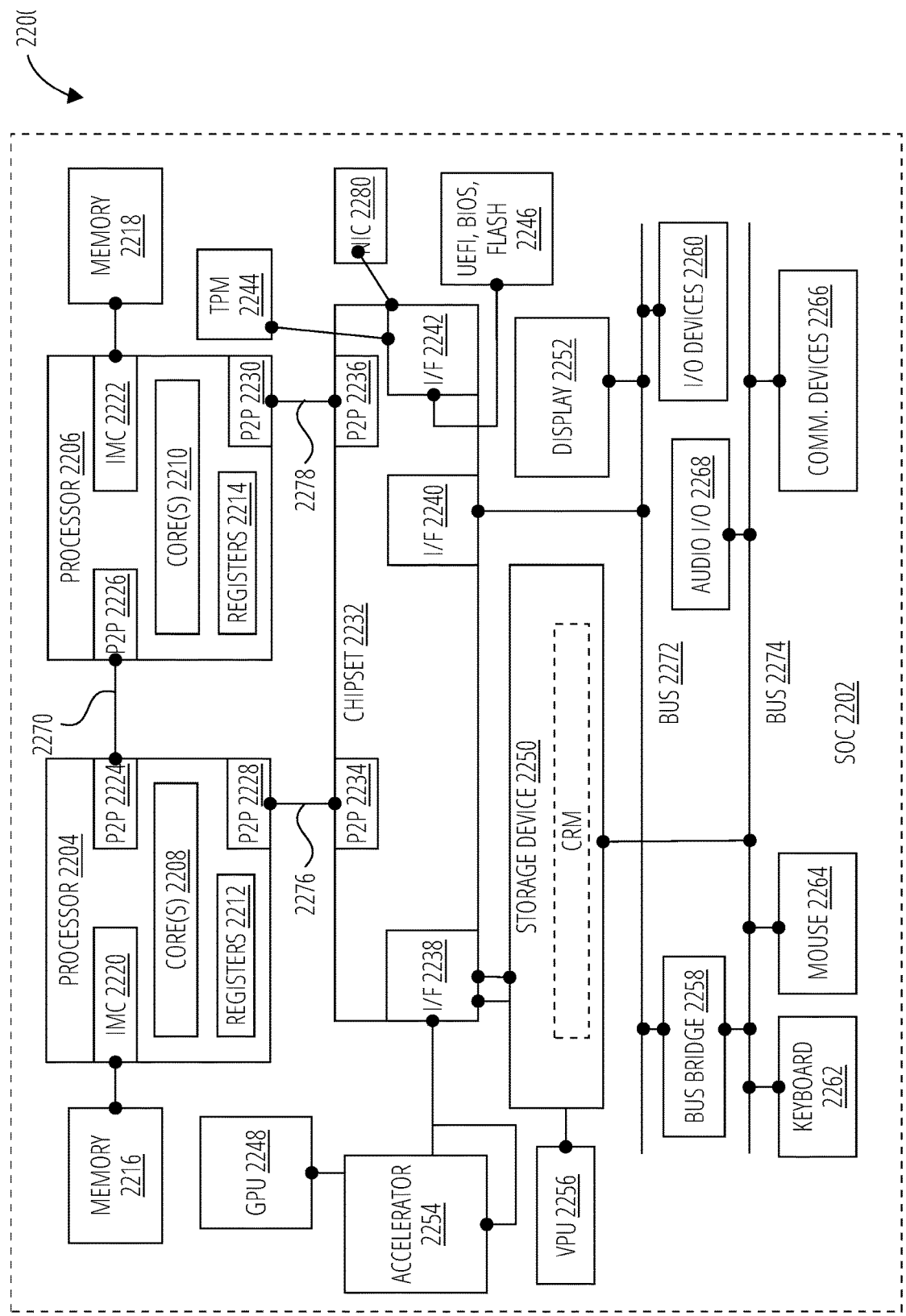
FIG. 22 illustrates a computing architecture, according to some embodiments of the current subject matter.

In various embodiments, the server device 102 may comprise various hardware elements, such as a processing circuitry 104, a memory 106, a network interface 108, and a set of platform components 110. The client devices 112 and/or the client devices 116 may include similar hardware elements as those depicted for the server device 102. The server device 102, client devices 112, and client devices 116, and associated hardware elements, are described in more detail with reference to a computing architecture 2200 as depicted in FIG. 22.

Figure 23:
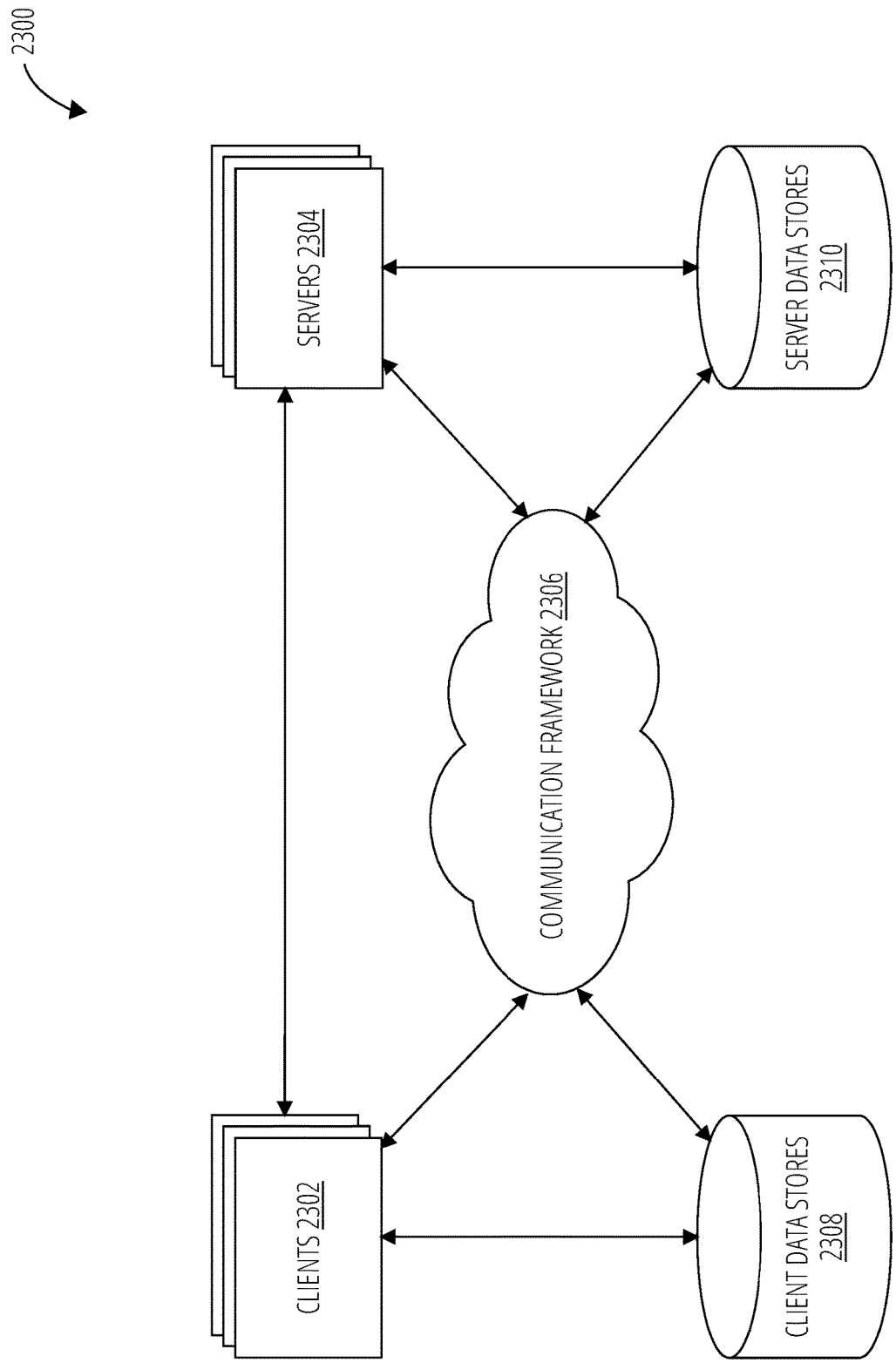
FIG. 23 illustrates a communications architecture, according to some embodiments of the current subject matter.

In various embodiments, the server devices 102, 112 and/or 116 may communicate various types of electronic information, including control, data and/or content information, via one or both network 114, network 118. The network 114 and the network 118, and associated hardware elements, are described in more detail with reference to a communications architecture 2300 as depicted in FIG. 23.

The memory 106 may store a set of software components, such as computer executable instructions, that when executed by the processing circuitry 104, causes the processing circuitry 104 to implement various operations for an electronic document management platform. As depicted in FIG. 1, for example, the memory 106 may comprise a document manager 120, a signature manager 122, and a document graph engine 150, among other software elements.

The document manager 120 may generally manage a collection of electronic documents stored as document records 138 in the data store 126. The document manager 120 may receive as input a document container 128 for an electronic document. A document container 128 is a file format that allows multiple data types to be embedded into a single file, sometimes referred to as a "wrapper" or "metafile." The document container 128 can include, among other types of information, an electronic document 142 and metadata for the electronic document 142.

A document container 128 may include an electronic document 142. The electronic document 142 may comprise any electronic multimedia content intended to be used in an electronic form. The electronic document 142 may comprise an electronic file having any given file format. Examples of file formats may include, without limitation, Adobe portable document format (PDF), Microsoft Word, PowerPoint, Excel, text files (.txt, .rtf), and so forth. In one embodiment, for example, the electronic document 142 may comprise a PDF created from a Microsoft Word file with one or more workflows developed by Adobe Systems Incorporated, an American multi-national computer software company headquartered in San Jose, California. Embodiments are not limited to this example.

In addition to the electronic document 142, the document container 128 may also include metadata for the electronic document 142. In one embodiment, the metadata may comprise signature tag marker element (STME) information 132 for the electronic document 142. The STME information 130 may comprise one or more STME 132, which are graphical user interface (GUI) elements superimposed on the electronic document 142. The GUI elements may comprise textual elements, visual elements, auditory elements, tactile elements, and so forth. In one embodiment, for example, the STME information 130 and STME 132 may be implemented as text tags, such as DocuSign anchor text, Adobe® Acrobat Sign® text tags, and so forth. Text tags are specially formatted text that can be placed anywhere within the content of an electronic document specifying the location, size, type of fields such as signature and initial fields, checkboxes, radio buttons, and form fields; and advanced optional field processing rules. Text tags can also be used when creating PDFs with form fields. Text tags may be converted into signature form fields when the document is sent for signature or uploaded. Text tags can be placed in any document type such as PDF, Microsoft Word, PowerPoint, Excel, and text files (.txt, .rtf). Text tags offer a flexible mechanism for setting up document templates that allow positioning signature and initial fields, collecting data from multiple parties within an agreement, defining validation rules for the collected data, and adding qualifying conditions. Once a document is correctly set up with text tags it can be used as a template when sending documents for signatures ensuring that the data collected for agreements is consistent and valid throughout the organization.

In one embodiment, the STME 132 may be utilized for receiving signing information, such as GUI placeholders for approval, checkbox, date signed, signature, social security number, organizational title, and other custom tags in association with the GUI elements contained in the electronic document 142. A client 134 may have used the client device 112 and/or the server device 102 to position one or more signature tag markers over the electronic document 142 with tools, applications, and workflows developed by DocuSign or Adobe. For instance, assume the electronic document 142 is a commercial lease associated with STME 132 designed for receiving signing information to memorialize an agreement between a landlord and tenant to lease a parcel of commercial property. In this example, the signing information may include a signature, title, date signed, and other GUI elements.

The document manager 120 may process a document container 128 to generate a document image 140. The document image 140 is a unified or standard file format for an electronic document used by a given EDMP implemented by the system 100. For instance, the system 100 may standardize use of a document image 140 having an Adobe portable document format (PDF), which is typically denoted by a ".pdf" file extension. If the electronic document 142 in the document container 128 is in a non-PDF format, such as a Microsoft Word ".doc" or ".docx" file format, the document manager 120 may convert or transform the file format for the electronic document into the PDF file format. Further, if the document container 128 includes an electronic document 142 stored in an electronic file having a PDF format suitable for rendering on a screen size typically associated with a larger form factor device, such as a monitor for a desktop computer, the document manager 120 may transform the electronic document 142 into a PDF format suitable for rendering on a screen size associated with a smaller form factor device, such as a touch screen for a smart phone. The document manager 120 may transform the electronic document 142 to ensure that it adheres to regulatory requirements for electronic signatures, such as a "what you see is what you sign" (WYSIWYS) property, for example.

The signature manager 122 may generally manage signing operations for an electronic document, such as the document image 140. The signature manager 122 may manage an electronic signature process to send the document image 140 to signers, obtaining electronic signatures, verifying electronic signatures, and recording and storing the electronically signed document image 140. For instance, the signature manager 122 may communicate a document image 140 over the network 118 to one or more client devices 116 for rendering the document image 140. A client 136 may electronically sign the document image 140 and send the signed document image 140 to the server device 102 for verification, recordation, and storage.

Figure 5:
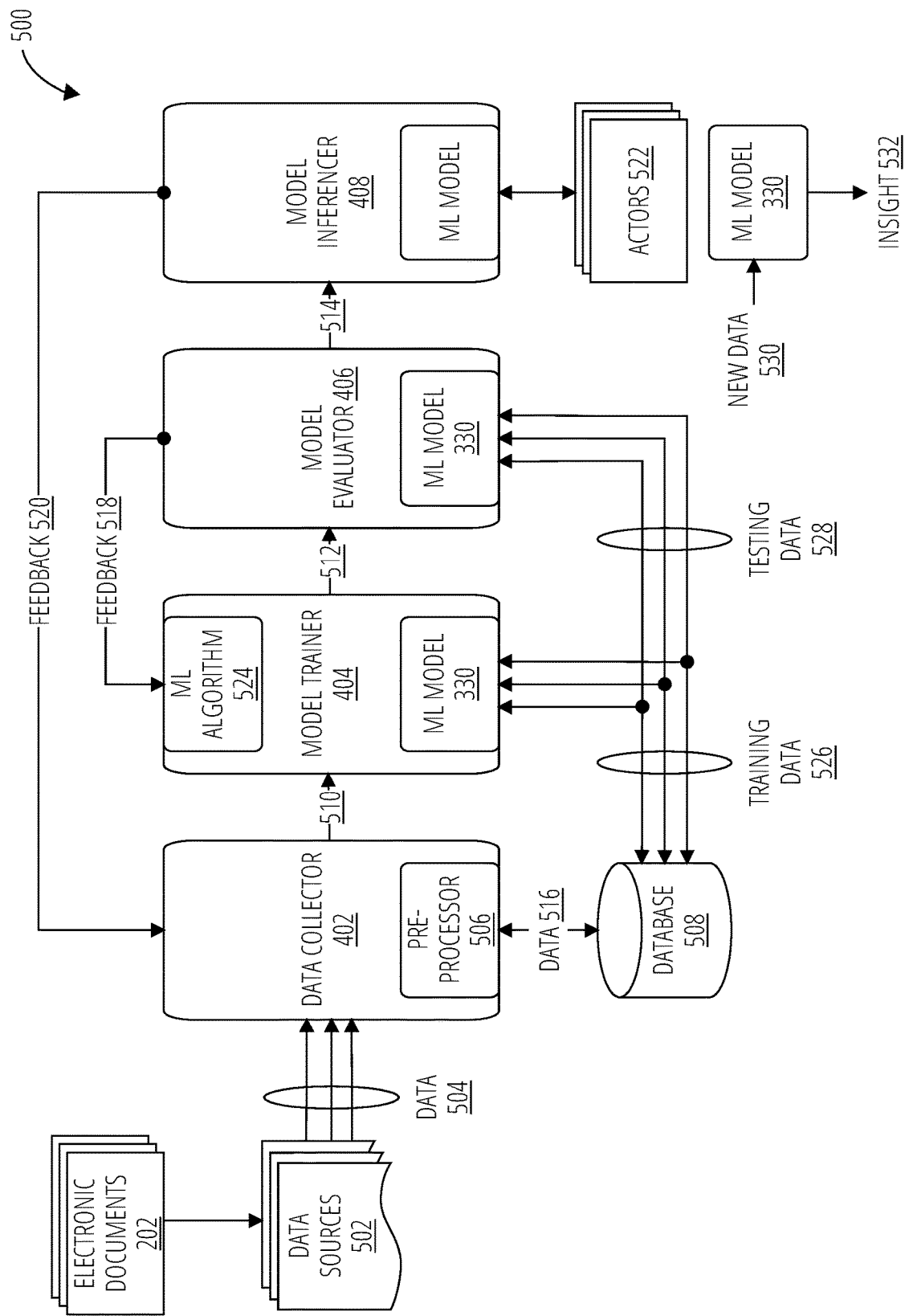
FIG. 5 illustrates an artificial intelligence architecture, according to some embodiments of the current subject matter.

The document graph engine 150 may generally manage artificial intelligence (AI) and machine learning (ML) agents to assist in various operational tasks for the ED MP of the system 100. The document graph engine 150, and associated software elements, are described in more detail with reference to an artificial intelligence architecture 500 as depicted in FIG. 5. The document graph engine 150, and associated hardware elements, are described in more detail with reference to a computing architecture 2200 as depicted in FIG. 22.

In general operation, assume the server device 102 receives a document container 128 from a client device 112 over the network 114. The server device 102 processes the document container 128 and makes any necessary modifications or transforms as previously described to generate the document image 140. The document image 140 may have a file format of an Adobe PDF denoted by a ".pdf" file extension. The server device 102 sends the document image 140 to a client device 116 over the network 118. The client device 116 renders the document image 140 with the STME 132 in preparation for electronic signing operations to sign the document image 140.

The document image 140 may further be associated with STME information 130 including one or more STME 132 that were positioned over the document image 140 by the client device 112 and/or the server device 102. The STME 132 may be utilized for receiving signing information (e.g., approval, checkbox, date signed, signature, social security number, organizational title, etc.) in association with the GUI elements contained in the document image 140. For instance, a client 134 may use the client device 112 and/or the server device 102 to position the STME 132 over the electronic documents 718 with tools, applications, and workflows developed by DocuSign. For example, the electronic documents 718 may be a commercial lease that is associated with one or more or more STME 132 for receiving signing information to memorialize an agreement between a landlord and tenant to lease a parcel of commercial property. For example, the signing information may include a signature, title, date signed, and other GUI elements.

Broadly, a technological process for signing electronic documents may operate as follows. A client 134 may use a client device 112 to upload the document container 128, over the network 114, to the server device 102. The document manager 120, at the server device 102, receives and processes the document container 128. The document manager 120 may confirm or transform the electronic document 142 as a document image 140 that is rendered at a client device 116 to display the original PDF image including multiple and varied visual elements. The document manager 120 may generate the visual elements based on separate and distinct input including the STME information 130 and the STME 132 contained in the document container 128. In one embodiment, the PDF input in the form of the electronic document 142 may be received from and generated by one or more workflows developed by Adobe Systems Incorporated. The STME 132 input may be received from and generated by workflows developed by DocuSign. Accordingly, the PDF and the STME 132 are separate and distinct input as they are generated by different workflows provided by different providers.

The document manager 120 may generate the document image 140 for rendering visual elements in the form of text images, table images, STME images and other types of visual elements. The original PDF image information may be generated from the document container 128 including original documents elements included in the electronic document 142 of the document container 128 and the STME information 130 including the STME 132. Other visual elements for rendering images may include an illustration image, a graphic image, a header image, a footer image, a photograph image, and so forth.

The signature manager 122 may communicate the document image 140 over the network 118 to one or more client devices 116 for rendering the document image 140. The client devices 116 may be associated with clients 136, some of which may be signatories or signers targeted for electronically signing the document image 140 from the client 134 of the client device 112. The client device 112 may have utilized various work flows to identify the signers and associated network addresses (e.g., email address, short message service, multimedia message service, chat message, social message, etc.). For example, the client 134 may utilize workflows to identify multiple parties to the lease including bankers, landlord, and tenant. Further, the client 134 may utilize workflows to identify network addresses (e.g., email address) for each of the signers. The signature manager 122 may further be configured by the client 134 whether to communicate the document image 140 in series or parallel. For example, the signature manager 122 may utilize a workflow to configure communication of the document image 140 in series to obtain the signature of the first party before communicating the document image 140, including the signature of the first party, to a second party to obtain the signature of the second party before communicating the document image 140, including the signature of the first and second party to a third party, and so forth. Further for example, the client 134 may utilize workflows to configure communication of the document image 140 in parallel to multiple parties including the first party, second party, third party, and so forth, to obtain the signatures of each of the parties irrespective of any temporal order of their signatures.

The signature manager 122 may communicate the document image 140 to the one or more parties associated with the client devices 116 in a page format. Communicating in page format, by the signature manager 122, ensures that entire pages of the document image 140 are rendered on the client devices 116 throughout the signing process. The page format is utilized by the signature manager 122 to address potential legal requirements for binding a signer. The signature manager 122 utilizes the page format because a signer is only bound to a legal document that the signer is intended to be bound. To satisfy the legal requirement of intent, the signature manager 122 generates PDF image information for rendering the document image 140 to the one or more parties with a "what you see is what you sign" (WYSIWYS) property. The WYSIWYS property ensures the semantic interpretation of a digitally signed message is not changed, either by accident or by intent. If the WYSIWYS property is ignored, a digital signature may not be enforceable at law. The WYSIWYS property recognizes that, unlike a paper document, a digital document is not bound by its medium of presentation (e.g., layout, font, font size, etc.) and a medium of presentation may change the semantic interpretation of its content. Accordingly, the signature manager 122 anticipates a possible requirement to show intent in a legal proceeding by generating original PDF image information for rendering the document image 140 in page format. The signature manager 122 presents the document image 140 on a screen of a display device in the same way the signature manager 122 prints the document image 140 on the paper of a printing device.

As previously described, the document manager 120 may process a document container 128 to generate a document image 140 in a standard file format used by the system 100, such as an Adobe PDF, for example. Additionally, or alternatively, the document manager 120 may also implement processes and workflows to prepare an electronic document 142 stored in the document container 128. For instance, assume a client 134 uses the client device 112 to prepare an electronic document 142 suitable for receiving an electronic signature, such as the lease agreement in the previous example. The client 134 may use the client device 112 to locally or remotely access document management tools, features, processes and workflows provided by the document manager 120 of the server device 102. The client 134 may prepare the electronic document 142 as a brand new originally written document, a modification of a previous electronic document, or from a document template with predefined information content. Once prepared, the signature manager 122 may implement electronic signature (e-sign) tools, features, processes and workflows provided by the signature manager 122 of the server device 102 to facilitate electronic signing of the electronic document 142.

In some embodiments, the document graph engine 150 may be configured to use one or more ML model(s) to extract a plurality of document portions (e.g., agreement clauses, etc.) from electronic documents that may have retrieved and/or received from various document sources. Each document may have a predetermined type (e.g., agreement, legal document, non-legal document, etc.). The ML model(s) may include at least one of the following: a large language model, at least one generative artificial intelligence model, and any combination thereof. In some embodiments, the document graph engine 150 may use semantic similarity searching techniques to determine content of one or more document portions extracted from the plurality of documents.

Further, the electronic documents processed by the document graph engine 150 may include labeled and/or unlabeled electronic documents (e.g., documents stored in electronic format, e.g., .docx, .pdf, .html, etc.). The labeled and/or unlabeled may be obtained from a unified database and/or storage location that may store all types of documents and/or documents stored in all types of formats. Labeled documents may be documents that may have been previously analyzed (either manually and/or using a machine learning model) and labeled. Labels may include any type of labels, identifiers, metadata, and/or any other identification may be assigned to the portions indicating content of each specific document portion (e.g., "termination label" may be assigned to a termination clause of the lease agreement, etc.). Alternatively, or in addition, the labels may identify the entire document, any summary/ies of the document and/or any of its portions. The labels may be stored together with the documents in a storage location. The labels may be stored in any desired fashion. Unlabeled document may be documents that may be stored in any public and/or private storage locations, databases, etc. For example, the documents may be stored in one or more government databases (e.g., SEC-EDGAR, etc.), non-governmental databases, third party publicly accessible databases, member-access based databases, etc. The unlabeled documents may or may not have been parsed, analyzed, etc. The documents in such storage locations may or may not include identification information that may identify the document and/or any portions thereof. In some embodiments, the document graph engine 150 may be configured to analyze the documents and generate/assign labels to each document portion that it determines and/or extracts, etc. from electronic documents.

The document graph engine 150 may be configured to use ML model(s) to determine a relationship between document portions that it has extracted. To do so, the engine 150 may be configured to use the ML model(s) to analyze content of each document portion and ascertain relationship between them. For example, in an agreement, a term clause stating, "The term of this agreement is year(s)." and renewal clause stating "The term of this agreement is renewable for the same time period upon written agreement by the parties" may be determined to be related. If the document graph engine 150 determines that document portions are related, it may associate such document portions based on the determined relationship.

Using the document portions and the relationships, the document graph engine 150 may generate (e.g., using ML model(s)), a document graph structure. The document graph structure may include a plurality of nodes, where each node may include at least one vector embedding that may represent at least one document portion in that node. Moreover, in the document graph structure, each node may be connected to another node in accordance with the relationship between document portions included in the nodes. The document graph engine 150 may also store the generated document graph structure in at least one storage location.

In some embodiments, the document graph engine 150 may be configured to process one or more queries seeking information contained in the document graph structure. The queries may be graph queries, natural language queries, and/or any other type of queries. Once the document graph engine 150 receives a query for retrieval of information from the plurality of electronic documents, it may generate one or more search vectors and generate a response by identifying one or more vector embeddings to be semantically similar to one or more search vectors, where vector embeddings may be connected to other vector embeddings in accordance with the defined relationships between document portions.

The document graph structure generated by the document graph engine 150 may provide a more flexible way to store data. It may allow data to be stored as an interconnected network rather than being restricted to a predefined traditional tabular format. For example, agreement or contract data is highly interconnected both within the agreement but also across a plurality of agreements, e.g., the value of a term in one agreement clause may have an impact on possible values in other agreement(s)'s clauses. The document graph engine 150 may be configured to generate a document graph structure based on the document portions (e.g., clauses in agreements) and any connections between the document portions (e.g., in the same or other electronic documents) to streamline the contracting process and make the data easily available to its users.

Further, it should be noted that queries may be received in any desired format, such as for example, a natural language representation of a human language, such as English, French, Spanish, Korean, etc. In some embodiments, the document graph engine 150 may access a generative AI remotely on another server device. In the latter scenario, the document graph engine 150 may send a natural language generation (NLG) request to a generative AI model implemented on another device over a network. The generative AI model may comprise a machine learning model that implements a large language model (LLM) to support natural language processing (NLP) operations, such as natural language understanding (NLU), natural language generation (NLG), and other NLP operations. In some embodiments, any search results that are generated by the document graph engine 150 may include one or more candidate document vectors that may be matching the modified vector. The document graph engine 150 may provide the results of the search and/or the candidate document vectors to a user via a graphical user interface (GUI) on a client device.

Figure 2:
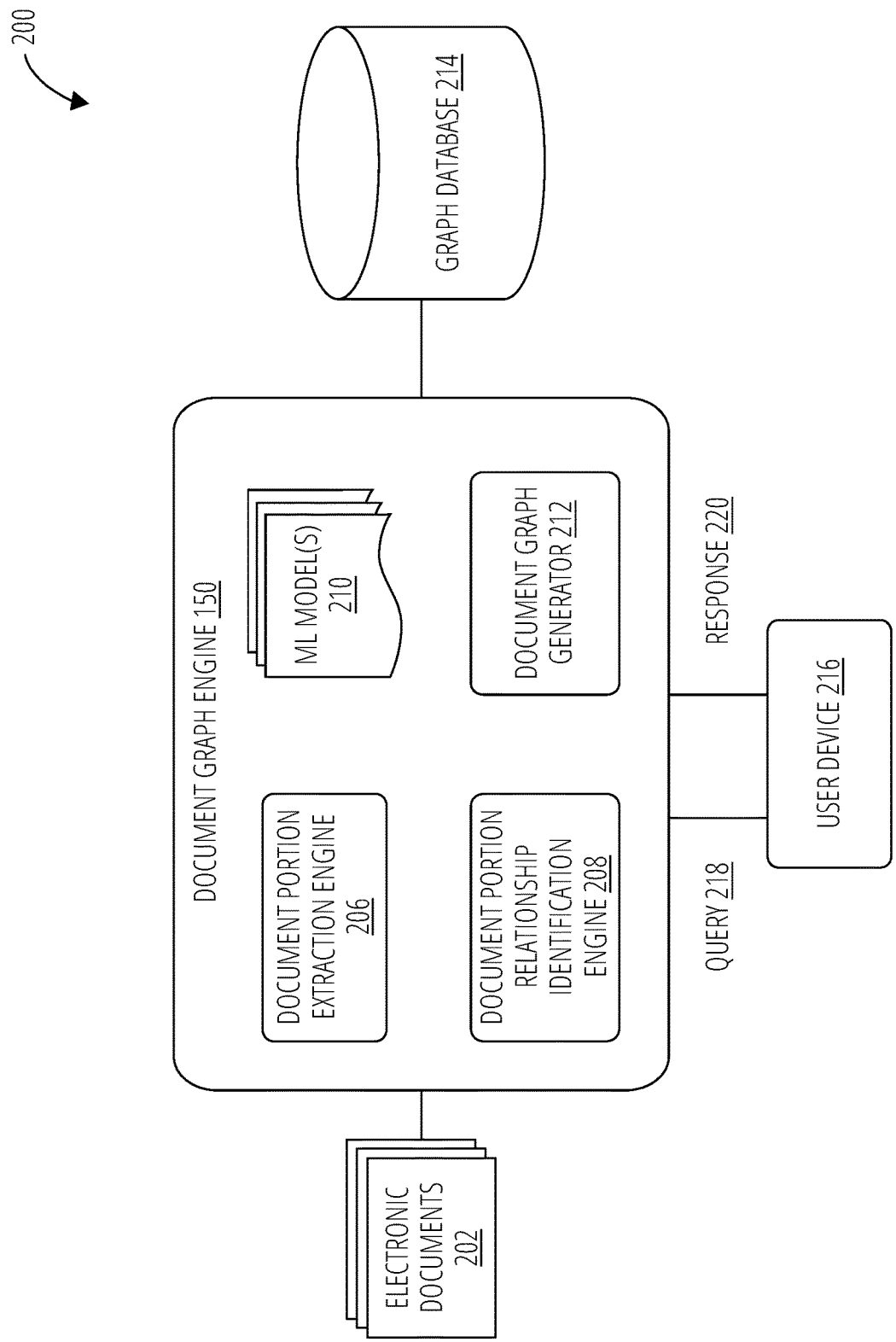
FIG. 2 is an example of system illustrating operation of the document graph engine, according to some embodiments of the current subject matter.

FIG. 2 is an example of system 200 illustrating operation of the document graph engine 150, according to some embodiments of the current subject matter. The engine 150 may include a document portion extraction engine 206, a document portion relationship identification engine 208, and a document portion relationship identification engine 208. The document graph engine 150 may also implement and/or one or more ML model(s) 210 for generation of one or more document graphs. One or more graph database 214 may be communicatively coupled to the document graph engine 150 and/or be part of the engine 150 and may store one or more document graphs generated by the engine 150. Further, one or more user devices 216 may be communicatively coupled to the document graph engine 150 and may issue one or more queries 218 to the engine 150, such as, for example for retrieval of one or more document portions (e.g., clauses in an agreement) and receive one or more responses 220 in response to the queries 218.

One or more components of the system 200 shown in FIG. 2 may be communicatively coupled using one or more communications networks. The communications networks may include one or more of the following: a wired network, a wireless network, a metropolitan area network ("MAN"), a local area network ("LAN"), a wide area network ("WAN"), a virtual local area network ("VLAN"), an internet, an extranet, an intranet, and/or any other type of network and/or any combination thereof.

Further, one or more components of the system 200 may include any combination of hardware and/or software. In some embodiments, one or more components of the system may be disposed on one or more computing devices, such as, server(s), database(s), personal computer(s), laptop(s), cellular telephone(s), smartphone(s), tablet computer(s), virtual reality devices, and/or any other computing devices and/or any combination thereof. In some example embodiments, one or more components of the system may be disposed on a single computing device and/or may be part of a single communications network. Alternatively, or in addition to, such devices may be separately located from one another. A device may be a computing processor, a memory, a software functionality, a routine, a procedure, a call, and/or any combination thereof that may be configured to execute a particular function associated with interface and/or document certification processes disclosed herein.

In some embodiments, one or more components of the system 200 may include network-enabled computers. As referred to herein, a network-enabled computer may include, but is not limited to a computer device, or communications device including, e.g., a server, a network appliance, a personal computer, a workstation, a phone, a smartphone, a handheld PC, a personal digital assistant, a thin client, a fat client, an Internet browser, or other device. One or more components of the system also may be mobile computing devices, for example, an iPhone, iPod, iPad from Apple® and/or any other suitable device running Apple's iOS® operating system, any device running Microsoft's Windows®. Mobile operating system, any device running Google's Android® operating system, and/or any other suitable mobile computing device, such as a smartphone, a tablet, or like wearable mobile device.

One or more components of the system 200 may include a processor and a memory, and it is understood that the processing circuitry may contain additional components, including processors, memories, error and parity/CRC checkers, data encoders, anti-collision algorithms, controllers, command decoders, security primitives and tamper-proofing hardware, as necessary to perform the interface and/or document certification functions described herein. One or more components of the system may further include one or more displays and/or one or more input devices. The displays may be any type of devices for presenting visual information such as a computer monitor, a flat panel display, and a mobile device screen, including liquid crystal displays, light-emitting diode displays, plasma panels, and cathode ray tube displays. The input devices may include any device for entering information into the user's device that is available and supported by the user's device, such as a touch-screen, keyboard, mouse, cursor-control device, touch-screen, microphone, digital camera, video recorder or camcorder. These devices may be used to enter information and interact with the software and other devices described herein.

In some example embodiments, one or more components of the system 200 may execute one or more applications, such as software applications, that enable, for example, network communications with one or more components of system and transmit and/or receive data.

One or more components of the system 200 may include and/or be in communication with one or more servers via one or more networks and may operate as a respective front-end to back-end pair with one or more servers. One or more components of the system may transmit, for example from a mobile device application (e.g., executing on one or more user devices (e.g., user devices 216, components, etc.), one or more requests to one or more servers. The requests may be associated with retrieving data from servers (e.g., retrieving one or more electronic documents and/or document portions and/or document graphs from the graph database 214). The servers may receive the requests from the components of the system. Based on the requests, servers may be configured to retrieve the requested data from one or more storage locations. Based on receipt of the requested data from the databases, the servers may be configured to transmit the received data to one or more components of the system, where the received data may be responsive to one or more requests.

The system 200 may include one or more networks, such as, for example, networks that may be communicatively coupling the engine 150 and/or any other computing components. In some embodiments, networks may be one or more of a wireless network, a wired network or any combination of wireless network and wired network and may be configured to connect the components of the system and/or the components of the system to one or more servers. For example, the networks may include one or more of a fiber optics network, a passive optical network, a cable network, an Internet network, a satellite network, a wireless local area network (LAN), a metropolitan area network (MAN), a wide area network (WAN), a virtual local area network (VLAN), an extranet, an intranet, a Global System for Mobile Communication, a Personal Communication Service, a Personal Area Network, Wireless Application Protocol, Multimedia Messaging Service, Enhanced Messaging Service, Short Message Service, Time Division Multiplexing based systems, Code Division Multiple Access based systems, D-AMPS, Wi-Fi, Fixed Wireless Data, IEEE 802.11b, 802.15.1, 802.11n and 802.11g, Bluetooth, NFC, Radio Frequency Identification (RFID), Wi-Fi, and/or any other type of network and/or any combination thereof.

In addition, the networks may include, without limitation, telephone lines, fiber optics, IEEE Ethernet 802.3, a wide area network, a wireless personal area network, a LAN, or a global network such as the Internet. Further, the networks may support an Internet network, a wireless communication network, a cellular network, or the like, or any combination thereof. The networks may further include one network, or any number of the exemplary types of networks mentioned above, operating as a stand-alone network or in cooperation with each other. The networks may utilize one or more protocols of one or more network elements to which they are communicatively coupled. The networks may translate to or from other protocols to one or more protocols of network devices. The networks may include a plurality of interconnected networks, such as, for example, the Internet, a service provider's network, a cable television network, corporate networks, such as credit card association networks, and home networks.

The system 200 may include one or more servers, which may include one or more processors that may be coupled to memory. Servers may be configured as a central system, server or platform to control and call various data at different times to execute a plurality of workflow actions. Servers may be configured to connect to the one or more databases. Servers may be incorporated into and/or communicatively coupled to at least one of the components of the system.

Further, one or more components of the system 200 may be configured to execute one or more actions using one or more containers. In some embodiments, each action may be executed using its own container. A container may refer to a standard unit of software that may be configured to include the code that may be needed to execute the action along with all its dependencies. This may allow execution of actions to run quickly and reliably.

In some embodiments, the document graph engine 150 may be configured to receive and/or retrieve one or more electronic documents 202 for processing. Electronic documents 202 may be configured to be stored in one or more private databases, access to which might not be publicly available (e.g., internal company databases, specific user access databases, etc.). The electronic documents 202 stored in these databases may be organized in a predetermined fashion, which may allow ease of access to the electronic documents and/or any portions thereof. For example, electronic documents stored in these databases may be labeled, searchable, and/or otherwise, easily identifiable. The documents may be stored in a particular electronic format (e.g., PDF, .docx, etc.).

Alternatively, or in addition, electronic documents 202 may be configured to be public non-government databases, government databases (e.g., SEC-EDGAR, etc.), etc. that may store various electronic documents, such as, for instance, legal documents (e.g., commercial contracts, lease agreements, public disclosures (e.g., 10k statements, 5k statements, quarterly reports, etc.). The electronic documents 202 stored in these databases may be identified using various identifiers, which may allow location of these documents in the databases, however, contents of electronic documents stored therein might not be parsed and/or specifically identified. For example, a review of the entire electronic document (e.g., 10k statement of a company stored in SEC-EDGAR database) may need to be performed to identify a particular section (e.g., a section related to compensation of executives for the company).

Further, the documents may be any type of documents, such as, for example, agreements, applications, websites, video files, audio files, text files, images, graphics, tables, spreadsheets, computer programs, etc. The documents may be in any desired format, e.g., .pdf, .docx, .xls, and/or any other type of format. The documents may also have any desired size. Moreover, the documents may be organized in any desired fashion. In some examples, documents may be nested within other documents (e.g., one document embedded in another document); one document may be linked to another document, etc.

Once the documents 202 are received by the document graph engine 150, the document portion extraction engine 206 may be configured to analyze the documents 202 and extract various portions of document(s) from the electronic document(s). For example, the engine 206 may be configured to determine a type (e.g., lease agreement) of the received documents 202 and identify a particular machine learning model 210 for processing that type of documents. The engine 206 may then provide instructions to the selected model 210 and request it to analyze the electronic document (the selected model 210 may receive instructions along with a copy of the document from engine 206) and extract specific document portions. Alternatively, or in addition, the engine 206 may select and/or use any model 210 for analyzing the document. Moreover, one model 210 may be used to process all types of documents.

For instance, when analyzing master service agreements, the engine 206 may instruct the ML model(s) 210 to find and retrieve specific clauses related to termination, governing law, liabilities, etc. The engine 206 may also be configured to instruct the ML model(s) 210 to identify clauses in different master service agreements that may be similar to one another. A semantic similarity analysis may be used to identify clauses with a particular document as well as across documents. As can be understood, more than one electronic document may be processed simultaneously by the engine 150. In some embodiments, similarity of clauses may be defined by one or more thresholds, where threshold may be defined by a predetermined number of words that may be similar to one another. For example, a termination clause of "A term of this master services agreement is one year." and a termination clause of "This master services agreement shall have a duration of one year" may be considered to be semantically similar. One or both clauses or a combination of the clauses may be set as a standard master services agreement termination clause that may be applicable to all master services agreements and/or all master services agreements of a particular type (e.g., retail master services agreements).

Once document portions are extracted from the electronic documents by the ML model(s) 210, the engine 206 may, optionally, label each document portion using one or more identifiers and/or any other metadata. For example, a termination clause in master services agreements may be labeled using a label "termination"; a governing law clause may be labeled using a label "governing law." As can be understood, any labels, identifiers, etc. may be used to identify extracted document portions. The document portions may also be stored in the graph database 214.

The ML model(s) 210 may include any type of machine learning models, generative artificial intelligence (AI) models and/or any other models. The models 210 may be part of the engine 150 and/or be one or more third party models (e.g., ChatGPT, Bard, DALL-E, Midjourney, DeepMind, etc.) and may be accessed by the engine 150.

In some embodiments, the engine 150's document portion relationship identification engine 208 may be configured to analyze the extracted document portions and determine one or more relationships between. The document portion relationship identification engine 208 may likewise use one or more ML model(s) 210 to identify and determine such relationship(s). A semantic similarity search may be executed to identify specific relationships. In the master services agreement example, a relationship may be identified as a result of a determination that the agreement references or includes a reference to a specific party, where the relationship may be labeled with an INCLUDES identifier and/or metadata. Alternatively, or in addition, the identified relationship may be more complex, and may be identified through analysis of clauses. For example, it may be determined that, in the master services agreement, a termination clause has a relationship (e.g., REQUIRE relationship) with a governing law clause, where specific provisions of the governing law may have an effect on how termination in the termination clause may be executed. Moreover, relationships between document portions may be determined within a particular document and/or across several documents. For example, a termination clause of a master services agreement may be related and/or connected to a governing law clause in another master services agreement and/or another type of agreement (e.g., a lease agreement). As can be understood, any other ways of determining relationships between portions of documents are possible.

In some embodiments, relationships between clauses may be determined based on a specific structure of documents. For example, it may be determined that a governing law clause may need to follow termination clause (e.g., using relationship FOLLOW) in a master services agreement. To ascertain a structure of an electronic document, the engine 208 may provide the electronic document(s) 202 to the ML model(s) 210 and request it to analyze the document(s) and determine their structure. Instructions to the ML model(s) 210 may describe the electronic document (e.g., a master services agreement, etc.) and request it to generate its structure. Alternatively, or in addition, the ML model(s) 210 may analyze the electronic document(s) 202 and recognize their sections, elements (e.g., clauses, addendums, etc.), etc. For instance, the determined structure may include a root heading (e.g., "Parties"), which may list parties to the agreement, one or more sub-headings under the root heading corresponding to sections of the master services agreement (e.g., "Whereas", "Description of Services", etc.), as well as further sub-sub-sub headings. As can be understood, the structure may have any desired form, such as for, example, but not limited to, a node-like structure, a linked list, and/or any other type of structure (e.g., simple graphs, directed graphs, undirected graphs, weighted graphs, adjacency matrices, adjacency lists, adjacency sets, etc.). The document structure may be stored in the graph database 214 along with extracted document portions.

In determining relationships between various document portions of one or more documents, the engine 208 may cluster and/or group document portions into one or more groups based on various factors, functions, etc. For example, in a sales agreement, portions (e.g., provisions, sections, paragraphs, sentences, etc.) related to termination of the agreement (which may be located in different section of the agreement) may be grouped together in the structural representation of the document. Document portions related to pricing terms may also be grouped under the same document portion in the structural representation. In some embodiments, document portions may be grouped based on a position of each document portion in the electronic document, a type of each document portion in the electronic document, etc. and/or any combinations thereof.

Figure 12:
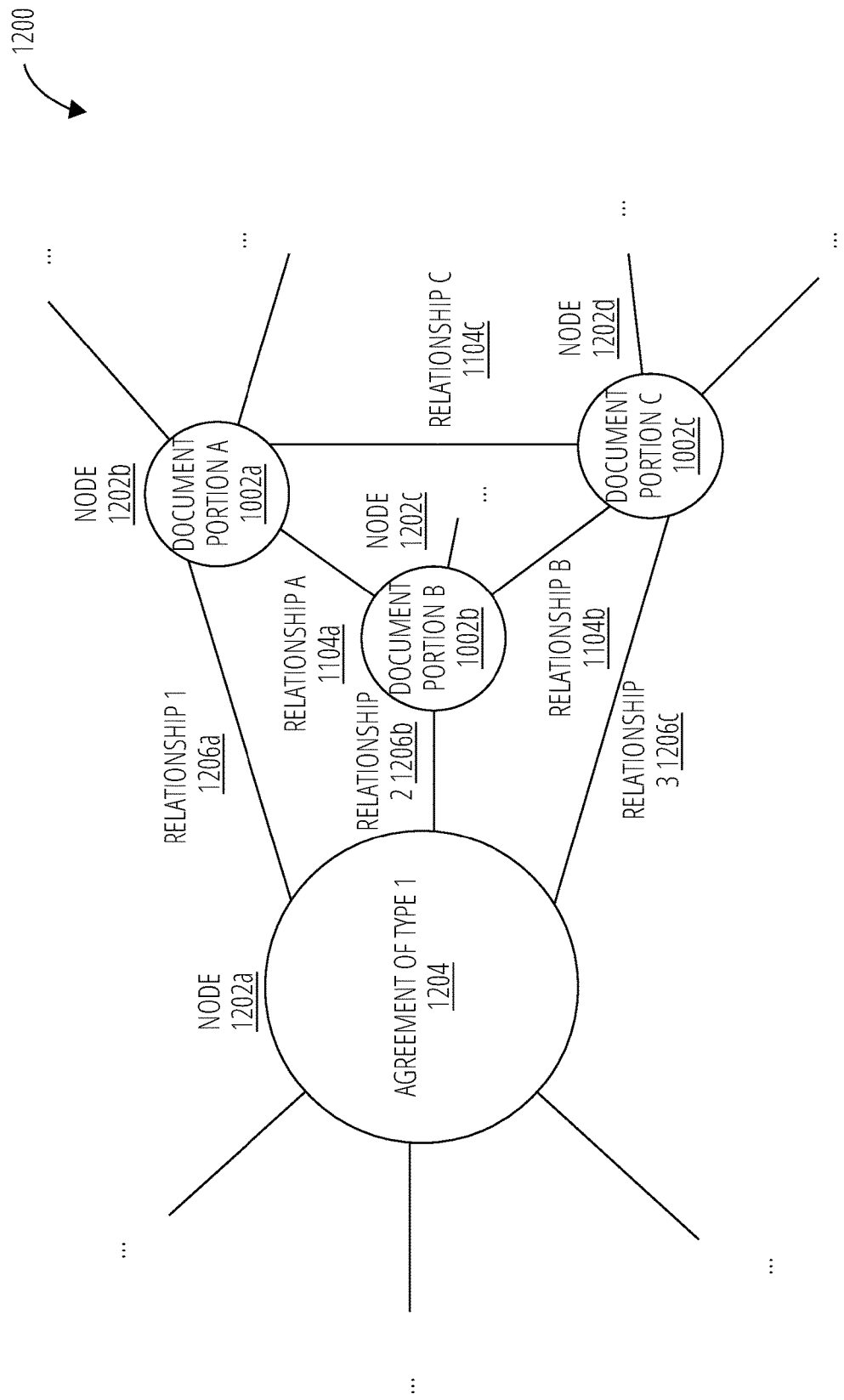
FIG. 12 illustrates an example document graph, according to some embodiments of the current subject matter.
Figure 13:
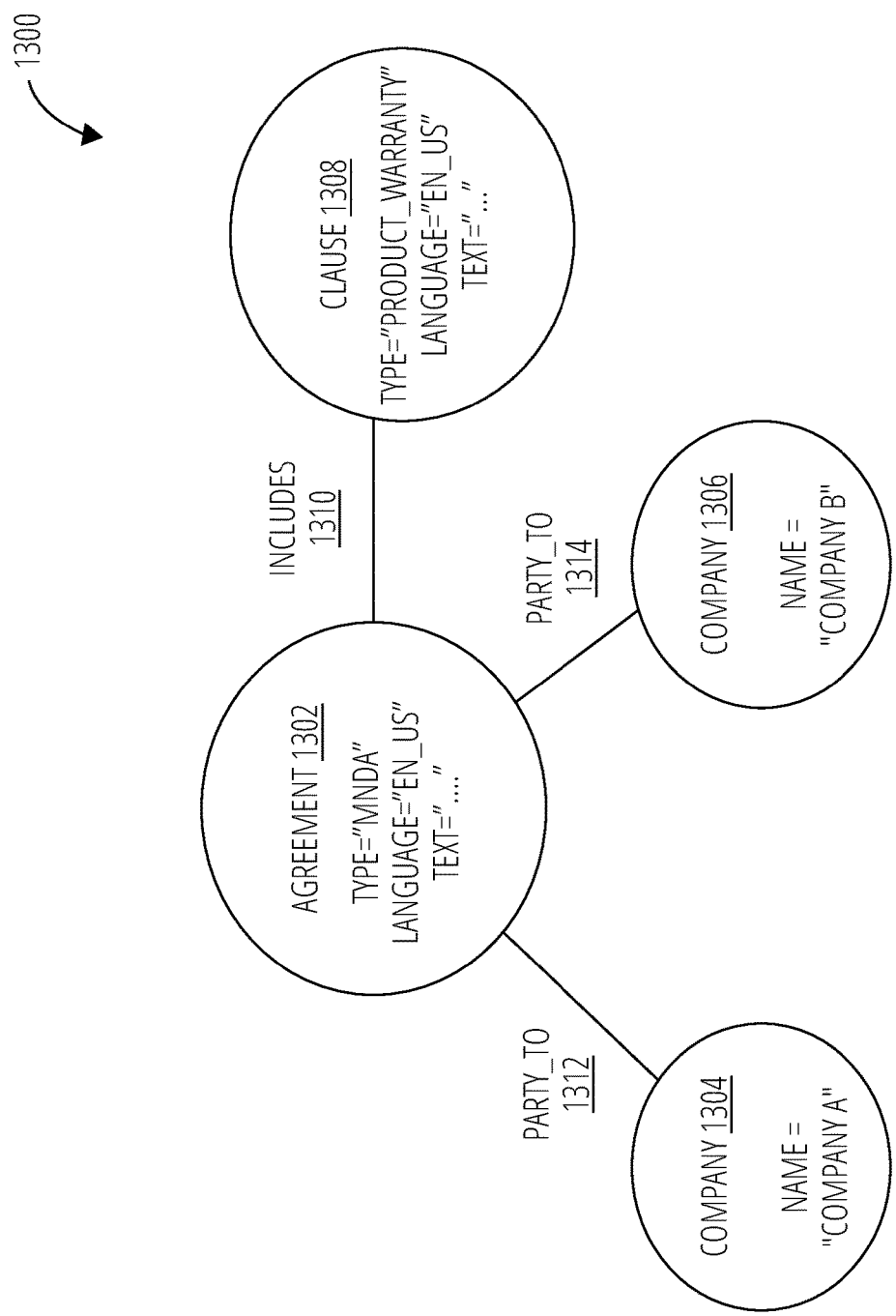
FIG. 13 illustrates another example document graph, according to some embodiments of the current subject matter.

Once the document portions have been extracted by the document portion extraction engine 206 and relationships between portions have been identified by the document portion relationship identification engine 208, the document graph generator 212 may be configured to generate a document graph (e.g., document graph document graph 1200 as shown in FIG. 12 or document graph 1300 as shown in FIG. 13). The document graph may be in any desired form, e.g., a tree, a node-like structure, a linked list, and/or any other form (e.g., simple graphs, directed graphs, undirected graphs, weighted graphs, adjacency matrices, adjacency lists, adjacency sets, etc.).

In some embodiments, the document graph may include one or more nodes that may be connected to other nodes using edges. The nodes may be representative of the extracted document portions and the edges may represent identified relationships between the document portions. In some embodiments, the document graph generator 212 (and/or the document portion extraction engine 206 and/or document portion relationship identification engine 208) may be configured to generate one or more vector embeddings to represent one or more document portions stored on the nodes of the document graph. Similarly, one or more vector embeddings may also be generated for the relationships between the document portions. The generated vector embeddings may be used to execute one or more searches in response to queries 218 that may be received from user device 216 so that a response 220 to the query 218 may be provided to the user device 216. The document graph generated by the document graph generator 212 may be stored in the graph database 214 along with document portions, extracted by the document portion extraction engine 206 and/or any relationships, as identified by the document portion relationship identification engine 208.

The query 218, as received by the document graph engine 150, may be transmitted in any desired format. For example, the query may be in a natural language representation of a human language (e.g., English, French, Spanish, Korean, etc.) and/or in any other representation and/or language (e.g., SQL, Java, etc.). In some embodiments, to process the query, the engine 150 may use one or more ML model(s) 210 (e.g., a generative (AI) model, a large language model (LLM), etc.) that may be configured to execute natural language processing (NLP) operations, such as natural language understanding (0), natural language generation (NLG), and other NLP operations. Once the query is processed by the generative AI model, it may be sent to the document graph engine 150, and in particular to its document graph generator 212 for further processing.

The query may seek information contained in one or more electronic documents 202. For example, the query may request information related to termination clauses in master services agreements executed in the State of California. The engine 150 may be configured to execute a search across the graph database 214 to retrieve relevant information. To retrieve requested information, the document graph generator 212 may use the stored document graphs and/or generate one or more document graphs for the purposes of responding to the query. The retrieved information may include specific clauses, sentences, words, paragraphs, portions of agreements, entire agreements, etc.

In some example embodiments, upon receiving the query 218, the engine 150 may extract one or more search terms from the query 218, e.g., "master services agreement", "termination", "California", etc. The search terms may then be used to generate one or more search vectors. The search vectors may be representations of the search terms. The search vectors may be generated using one or more encoders (e.g., machine learning models, such as, KNN, k-nearest neighbor, etc.) and may include contextualized embeddings, which include a vector representation of one or more words having various contextual information for such words. For example, the embedding may include a word level vector, a sentence level vector, a paragraph level vector, and/or any combination thereof. The search sectors may then be used by the engine 150 to conduct a search of the graph database 214. In particular, the search vectors may be compared to document vector embeddings stored in the nodes and/or edges of document graphs generated by the document graph generator 212. Upon determining a match, the engine 150 may be configured to retrieve document portions represented by the matching document vector embeddings and present them to the user in the response 220. The document graph engine 150 may present the response 220 to a user via a graphical user interface (GUI) on the user device 216.

Figure 3:
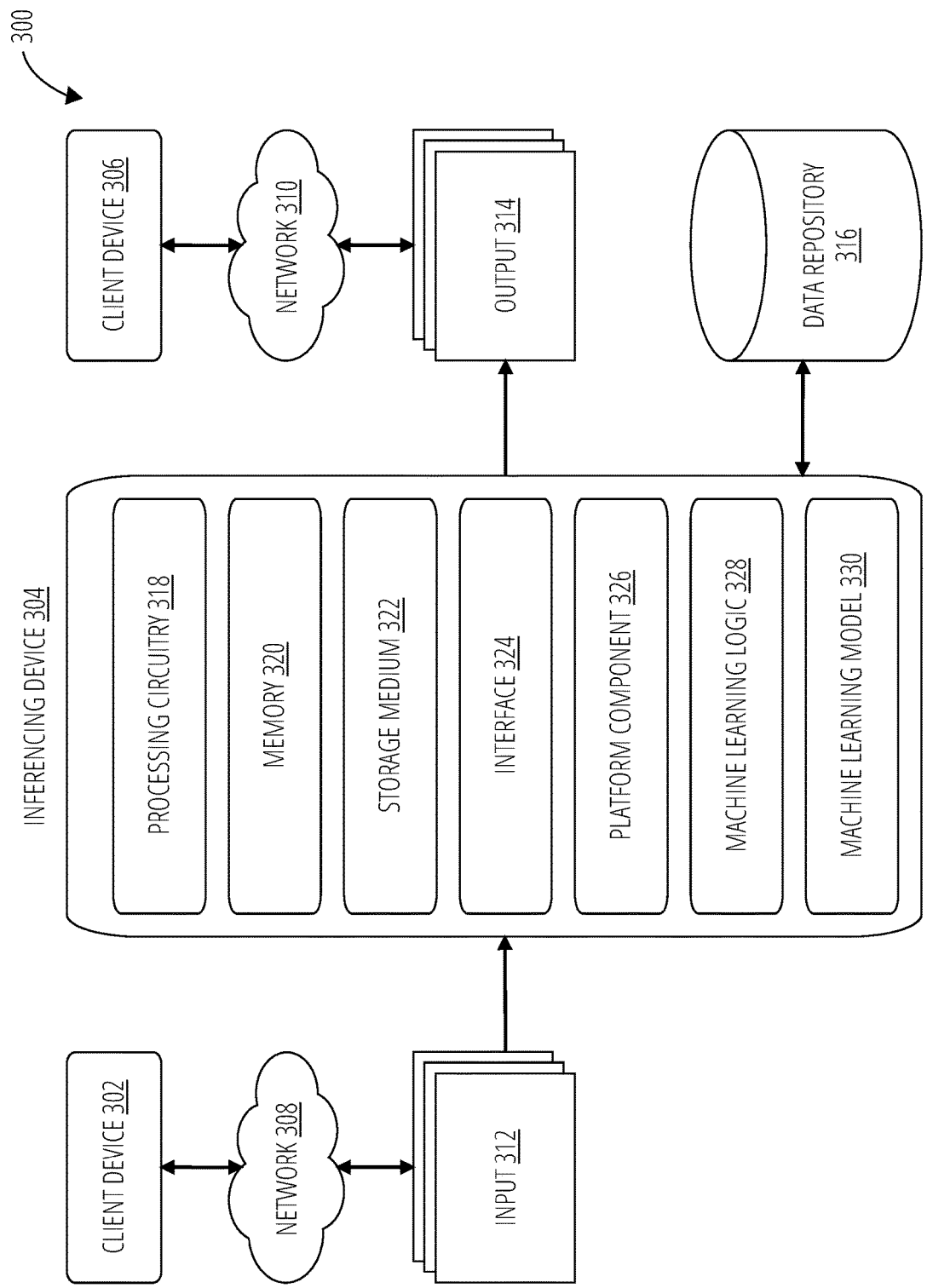
FIG. 3 illustrates an example of an AI/ML system that may be used for generating one or more portions of electronic documents based on a structure of the document, etc., according to some embodiments of the current subject matter.

FIG. 3 illustrates an example of an AI/ML system 300 that may be used for generating one or more portions of electronic documents 202 based on a structure of the document, etc., according to some embodiments of the current subject matter. The system 300 may include a set of M devices, where M is any positive integer. As shown in FIG. 3, the system 300 may include three devices (M=3), such as a client device 302, an inferencing device 304, and a client device 306. The inferencing device 304 may communicate information with the client device 302 and the client device 306 over a network 308 and a network 310, respectively. The information may include input 312 from the client device 302 and output 314 to the client device 306, or vice-versa. In some embodiments, the input 312 and the output 314 may be communicated between the same client device 302 or client device 306. In another alternative, the input 312 and the output 314 may be stored in a data repository 316. Alternatively, or in addition, the input 312 and the output 314 are communicated via a platform component 326 of the inferencing device 304, such as an input/output (I/O) device (e.g., a touchscreen, a microphone, a speaker, etc.).

As shown in FIG. 3, the inferencing device 304 may include a processing circuitry 318, a memory 320, a storage medium 322, an interface 324, a platform component 326, ML logic 328, and an ML model 330. In some embodiments, the inferencing device 304 may include other components and/or devices as well. Examples for software elements and hardware elements of the inferencing device 304 are described in more detail with reference to a computing architecture 2200 as depicted in FIG. 22. Embodiments are not limited to these examples.

The inferencing device 304 may generally be arranged to receive an input 312, process the input 312 via one or more AI/ML techniques, and send an output 314. The inferencing device 304 may receive the input 312 from the client device 302 via the network 308, the client device 306 via the network 310, the platform component 326 (e.g., a touchscreen as a text command or microphone as a voice command), the memory 320, the storage medium 322 or the data repository 316. The inferencing device 304 may send the output 314 to the client device 302 via the network 308, the client device 306 via the network 310, the platform component 326 (e.g., a touchscreen to present text, graphic or video information or speaker to reproduce audio information), the memory 320, the storage medium 322 or the data repository 316. Examples for the software elements and hardware elements of the network 308 and the network 310 are described in more detail with reference to a communications architecture 2300 as depicted in FIG. 23. Embodiments are not limited to these examples.

The inferencing device 304 may include ML logic 328 and an ML model 330 to implement various AI/ML techniques for various AI/ML tasks. The ML logic 328 may receive the input 312, and process the input 312 using the ML model 330. The ML model 330 may perform inferencing operations to generate an inference for a specific task from the input 312. In some embodiments, the inference is part of the output 314. The output 314 may be used by the client device 302, the inferencing device 304, or the client device 306 to perform subsequent actions in response to the output 314.

In some embodiments, the ML model 330 may be a trained ML model 330 using a set of training operations. An example of training operations to train the ML model 330 is described with reference to FIG. 4.

Figure 4:
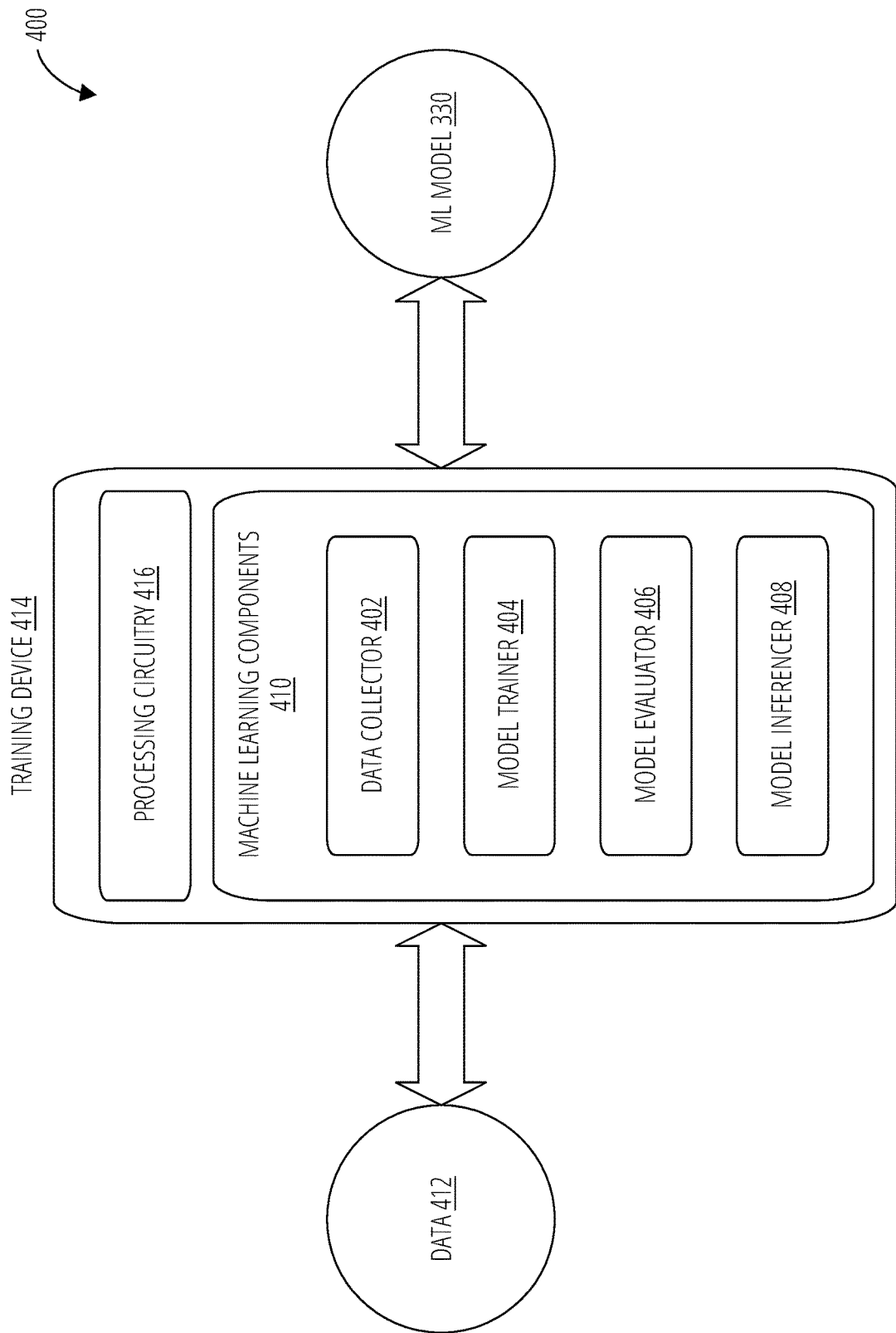
FIG. 4 illustrates an example apparatus that may include a training device suitable to generate a trained ML model for the inferencing device of the system shown in FIG. 3.

FIG. 4 illustrates an example apparatus 400 that may include a training device 412 suitable to generate a trained ML model 330 for the inferencing device 304 of the system 300. As shown in FIG. 4, the training device 412 may include a processing circuitry 414 and a set of ML components 408 to support various AI/ML techniques, such as a data collector 402, a model trainer 402, a model evaluator 404 and a model inferencer 406.

In general, the data collector 402 may collect data 410 from one or more data sources to use as training data for the ML model 330. The data collector 402 may collect different types of data 410, such as, text information, audio information, image information, video information, graphic information, and so forth. The model trainer 404 may receive as input the collected data and uses a portion of the collected data as test data for an AI/ML algorithm to train the ML model 330. The model evaluator 406 may evaluate and improve the trained ML model 330 using a portion of the collected data as test data to test the ML model 330. The model evaluator 406 may also use feedback information from the deployed ML model 330. The model inferencer 408 may implement the trained ML model 330 to receive as input new unseen data, generate one or more inferences on the new data, and output a result such as an alert, a recommendation or other post-solution activity.

An exemplary AI/ML architecture for the ML components 408 is described in more detail with reference to FIG. 5.

FIG. 5 illustrates an artificial intelligence architecture 500 suitable for use by the document graph engine 150 of the server device 102. The artificial intelligence architecture 500 is an example of a system suitable for implementing various artificial intelligence (AI) techniques and/or machine learning (ML) techniques to perform various document management tasks on behalf of the various devices of the system 100.

AI is a science and technology based on principles of cognitive science, computer science and other related disciplines, which deals with the creation of intelligent machines that work and react like humans. AI is used to develop systems that can perform tasks that require human intelligence such as recognizing speech, vision and making decisions. AI can be seen as the ability for a machine or computer to think and learn, rather than just following instructions. ML is a subset of AI that uses algorithms to enable machines to learn from existing data and generate insights or predictions from that data. ML algorithms are used to optimize machine performance in various tasks such as classifying, clustering and forecasting. ML algorithms are used to create ML models that can accurately predict outcomes.

In general, the artificial intelligence architecture 500 may include various machine or computer components (e.g., circuit, processor circuit, memory, network interfaces, compute platforms, input/output (I/O) devices, etc.) for an AI/ML system that are designed to work together to create a pipeline that can take in raw data, process it, train an ML model 330, evaluate performance of the trained ML model 330, and deploy the tested ML model 330 in a production environment, and continuously monitor and maintain it.

The ML model 330 is a mathematical construct used to predict outcomes based on a set of input data. The ML model 330 is trained using large volumes of training data 526, and it can recognize patterns and trends in the training data 526 to make accurate predictions. The ML model 330 may be derived from an ML algorithm 524 (e.g., a neural network, decision tree, support vector machine, etc.). A data set is fed into the ML algorithm 524 which trains an ML model 330 to "learn" a function that produces mappings between a set of inputs and a set of outputs with a reasonably high accuracy. Given a sufficiently large enough set of inputs and outputs, the ML algorithm 524 finds the function for you. And this function may even be able to produce the correct output for input that it has not seen during training. The programmer (who has now earned the snazzy title of "data scientist") prepares the mappings, selects and tunes the machine learning algorithm, and evaluates the resulting model's performance. Once the model is sufficiently accurate on test data, it can be deployed for production use.

The ML algorithm 524 may comprise any ML algorithm suitable for a given AI task. Examples of ML algorithms may include supervised algorithms, unsupervised algorithms, or semi-supervised algorithms.

A supervised algorithm is a type of machine learning algorithm that uses labeled data to train a machine learning model. In supervised learning, the machine learning algorithm is given a set of input data and corresponding output data, which are used to train the model to make predictions or classifications. The input data is also known as the features, and the output data is known as the target or label. The goal of a supervised algorithm is to learn the relationship between the input features and the target labels, so that it can make accurate predictions or classifications for new, unseen data. Examples of supervised learning algorithms include: (1) linear regression which is a regression algorithm used to predict continuous numeric values, such as stock prices or temperature; (2) logistic regression which is a classification algorithm used to predict binary outcomes, such as whether a customer will purchase or not purchase a product; (3) decision tree which is a classification algorithm used to predict categorical outcomes by creating a decision tree based on the input features; or (4) random forest which is an ensemble algorithm that combines multiple decision trees to make more accurate predictions.

An unsupervised algorithm is a type of machine learning algorithm that is used to find patterns and relationships in a dataset without the need for labeled data. Unlike supervised learning, where the algorithm is provided with labeled training data and learns to make predictions based on that data, unsupervised learning works with unlabeled data and seeks to identify underlying structures or patterns. Unsupervised learning algorithms use a variety of techniques to discover patterns in the data, such as clustering, anomaly detection, and dimensionality reduction. Clustering algorithms group similar data points together, while anomaly detection algorithms identify unusual or unexpected data points. Dimensionality reduction algorithms are used to reduce the number of features in a dataset, making it easier to analyze and visualize. Unsupervised learning has many applications, such as in data mining, pattern recognition, and recommendation systems. It is particularly useful for tasks where labeled data is scarce or difficult to obtain, and where the goal is to gain insights and understanding from the data itself rather than to make predictions based on it.

Semi-supervised learning is a type of machine learning algorithm that combines both labeled and unlabeled data to improve the accuracy of predictions or classifications. In this approach, the algorithm is trained on a small amount of labeled data and a much larger amount of unlabeled data. The main idea behind semi-supervised learning is that labeled data is often scarce and expensive to obtain, whereas unlabeled data is abundant and easy to collect. By leveraging both types of data, semi-supervised learning can achieve higher accuracy and better generalization than either supervised or unsupervised learning alone. In semi-supervised learning, the algorithm first uses the labeled data to learn the underlying structure of the problem. It then uses this knowledge to identify patterns and relationships in the unlabeled data, and to make predictions or classifications based on these patterns. Semi-supervised learning has many applications, such as in speech recognition, natural language processing, and computer vision. It is particularly useful for tasks where labeled data is expensive or time-consuming to obtain, and where the goal is to improve the accuracy of predictions or classifications by leveraging large amounts of unlabeled data.

The ML algorithm 524 of the artificial intelligence architecture 500 may be implemented using various types of ML algorithms including supervised algorithms, unsupervised algorithms, semi-supervised algorithms, or a combination thereof. A few examples of ML algorithms include support vector machine (SVM), random forests, naive Bayes, K-means clustering, neural networks, and so forth. A SVM is an algorithm that can be used for both classification and regression problems. It works by finding an optimal hyperplane that maximizes the margin between the two classes. Random forests is a type of decision tree algorithm that is used to make predictions based on a set of randomly selected features. Naive Bayes is a probabilistic classifier that makes predictions based on the probability of certain events occurring. K-Means Clustering is an unsupervised learning algorithm that groups data points into clusters. Neural networks is a type of machine learning algorithm that is designed to mimic the behavior of neurons in the human brain. Other examples of ML algorithms include a support vector machine (SVM) algorithm, a random forest algorithm, a naive Bayes algorithm, a K-means clustering algorithm, a neural network algorithm, an artificial neural network (ANN) algorithm, a convolutional neural network (CNN) algorithm, a recurrent neural network (RNN) algorithm, a long short-term memory (LSTM) algorithm, a deep learning algorithm, a decision tree learning algorithm, a regression analysis algorithm, a Bayesian network algorithm, a genetic algorithm, a federated learning algorithm, a distributed artificial intelligence algorithm, and so forth. Embodiments are not limited in this context.

As depicted in FIG. 5, the artificial intelligence architecture 500 includes a set of data sources 502 to source data 504 for the artificial intelligence architecture 500. Data sources 502 may comprise any device capable of generating, processing, storing or managing data 504 suitable for a ML system. Examples of data sources 502 include without limitation databases, web scraping, sensors and Internet of Things (IoT) devices, image and video cameras, audio devices, text generators, publicly available databases, private databases, and many other data sources 502. The data sources 502 may be remote from the artificial intelligence architecture 500 and accessed via a network, local to the artificial intelligence architecture 500 and accessed via a network interface, or may be a combination of local and remote data sources 502.

The data sources 502 may source different types of data 504. For instance, the data 504 may comprise structured data from relational databases, such as customer profiles, transaction histories, or product inventories. The data 504 may comprise unstructured data from websites such as customer reviews, news articles, social media posts, or product specifications. The data 504 may comprise data from temperature sensors, motion detectors, and smart home appliances. The data 504 may comprise image data from medical images, security footage, or satellite images. The data 504 may comprise audio data from speech recognition, music recognition, or call centers. The data 504 may comprise text data from emails, chat logs, customer feedback, news articles or social media posts. The data 504 may comprise publicly available datasets such as those from government agencies, academic institutions, or research organizations. These are just a few examples of the many sources of data that can be used for ML systems. It is important to note that the quality and quantity of the data is critical for the success of a machine learning project. In one embodiment, for example, the data sources 502 may include the document records 138 managed by the system 100.

The data 504 can be in different formats such as structured, unstructured or semi-structured data. Structured data refers to data that is organized in a specific format or schema, such as tables or spreadsheets. Structured data has a well-defined set of rules that dictate how the data should be organized and represented, including the data types and relationships between data elements. Unstructured data refers to any data that does not have a predefined or organized format or schema. Unlike structured data, which is organized in a specific way, unstructured data can take various forms, such as text, images, audio, or video. Unstructured data can come from a variety of sources, including social media, emails, sensor data, and website content. Semi-structured data is a type of data that does not fit neatly into the traditional categories of structured and unstructured data. It has some structure but does not conform to the rigid structure of a traditional relational database. Semi-structured data is characterized by the presence of tags or metadata that provide some structure and context for the data.

The data sources 502 may be communicatively coupled to a data collector 402. The data collector 402 gathers relevant data 504 from the data sources 502. Once collected, the data collector 402 may use a pre-processor 506 to make the data 504 suitable for analysis. This involves data cleaning, transformation, and feature engineering. For instance, an electronic document 142 may be converted to text information, and the text information may be converted to word vectors. Data preprocessing is a critical step in ML as it directly impacts the accuracy and effectiveness of the model. The pre-processor 506 may receive the data 504 as input, process the data 504, and output pre-processed data 516 for storage in a database 508. The database 508 may comprise a hard drive, solid state storage, and/or random-access memory.

The data collector 402 may be communicatively coupled to a model trainer 404. The model trainer 404 performs AI/ML model training, validation, and testing which may generate model performance metrics as part of the model testing procedure. The model trainer 404 may receive the pre-processed data 516 as input 510 or via the database 508. The model trainer 404 may implement a suitable ML algorithm 524 to train an ML model 330 on a set of training data 526 from the pre-processed data 516. The training process involves feeding the pre-processed data 516 into the ML algorithm 524 to produce or optimize an ML model 330. The training process adjusts its parameters until it achieves an initial level of satisfactory performance.

The model trainer 404 may be communicatively coupled to a model evaluator 406. After an ML model 330 is trained, the ML model 330 needs to be evaluated to assess its performance. This is done using various metrics such as accuracy, precision, recall, and F1 score. The model trainer 404 may output the ML model 330, which is received as input 510 or from the database 508. The model evaluator 406 receives the ML model 330 as input 512, and it initiates an evaluation process to measure performance of the ML model 330. The evaluation process may include providing feedback 518 to the model trainer 404, so that it may re-train the ML model 330 to improve performance in an iterative manner.

The model evaluator 406 may be communicatively coupled to a model inferencer 408. The model inferencer 408 provides AI/ML model inference output (e.g., predictions or decisions). Once the ML model 330 is trained and evaluated, it can be deployed in a production environment where it can be used to make predictions on new data. The model inferencer 408 receives the evaluated ML model 330 as input 514. The model inferencer 408 may use the evaluated ML model 330 to produce insights or predictions on real data, which is deployed as a final production ML model 330. The inference output of the ML model 330 is use case specific. The model inferencer 408 may also perform model monitoring and maintenance, which involves continuously monitoring performance of the search model 1406 in the production environment and making any necessary updates or modifications to maintain its accuracy and effectiveness. The model inferencer 408 may provide feedback 518 to the data collector 402 to train or re-train the ML model 330. The feedback 518 may include model performance feedback information, which may be used for monitoring and improving performance of the ML model 330.

The model inferencer 408 may be implemented by various actors 522 in the artificial intelligence architecture 500, including the document graph engine 150 of the server device 102, for example. The actors 522 may use the deployed ML model 330 on new data to make inferences or predictions for a given task and output an insight 532. The actors 522 may actually implement the model inferencer 408 locally or may remotely receive outputs from the model inferencer 408 in a distributed computing manner. The actors 522 may trigger actions directed to other entities or to itself. The actors 522 may provide feedback 520 to the data collector 402 via the model inferencer 408. The feedback 520 may comprise data needed to derive training data, inference data or to monitor the performance of the ML model 330 and its impact to the network through updating of key performance indicators (KPIs) and performance counters.

As previously described with reference to FIGS. 1, 2, the systems 100, 200 may implement some or all of the artificial intelligence architecture 500 to support various use cases and solutions for various AI/ML tasks suitable for supporting or automating document management operations. In various embodiments, the artificial intelligence architecture 500 may be implemented by the document graph engine 150 of the server device 102 for the systems 100, 200. In one embodiment, for example, the document graph engine 150 may implement the artificial intelligence architecture 500 to train and deploy an ML model 330 as a neural network, as described in more detail with reference to FIG. 6. It may be appreciated that other use cases and solutions for AI/ML are possible as well, and embodiments are not limited in this context.

Figure 6:
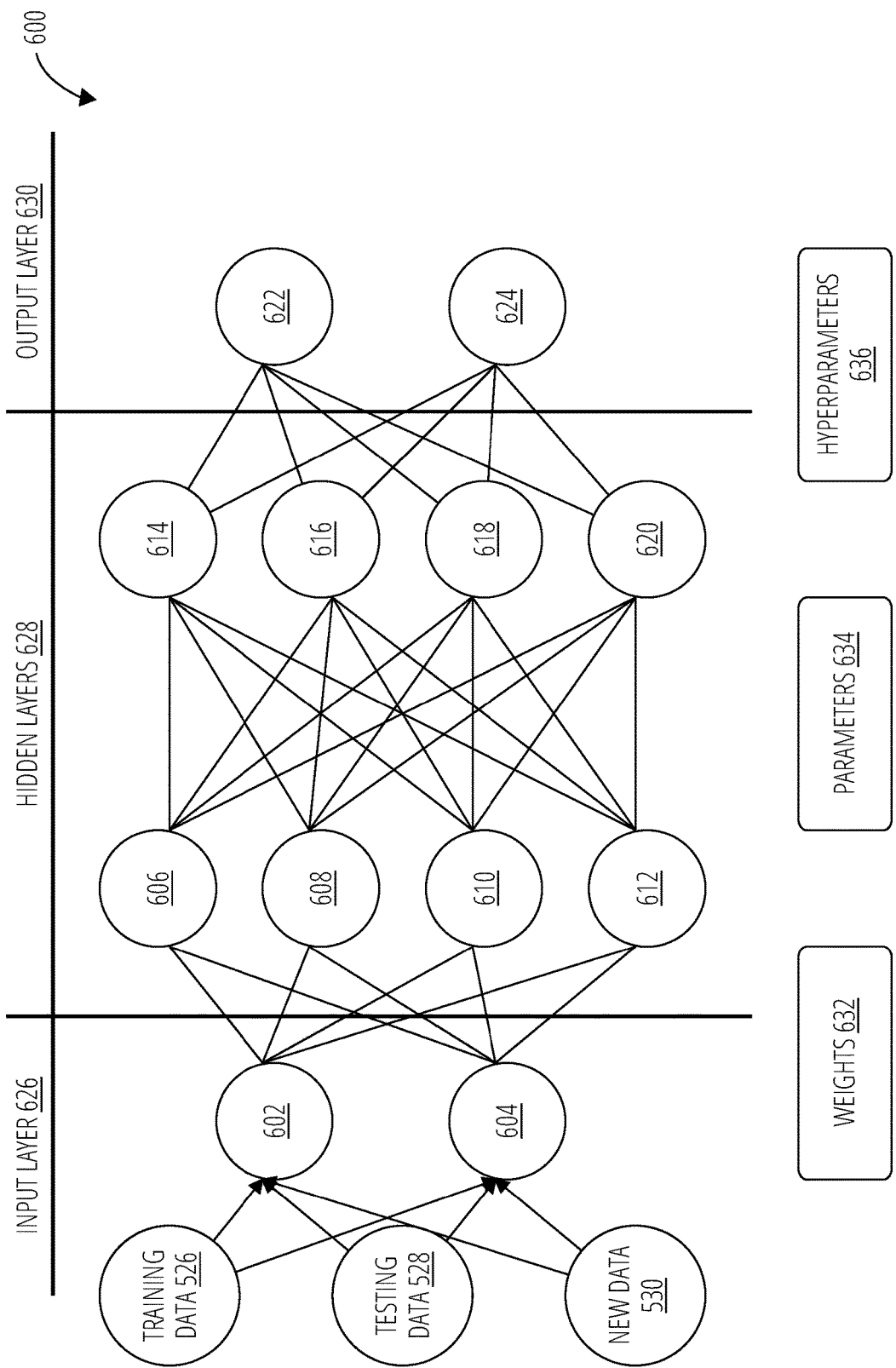
FIG. 6 illustrates an artificial neural network, according to some embodiments of the current subject matter.

FIG. 6 illustrates an embodiment of an artificial neural network 600. Neural networks, also known as artificial neural networks (ANNs) or simulated neural networks (SNNs), are a subset of machine learning and are at the core of deep learning algorithms. Their name and structure are inspired by the human brain, mimicking the way that biological neurons signal to one another.

Artificial neural network 600 comprises multiple node layers, containing an input layer 626, one or more hidden layers 628, and an output layer 630. Each layer may comprise one or more nodes, such as nodes 602 to 624. As depicted in FIG. 6, for example, the input layer 626 has nodes 602, 604. The artificial neural network 600 has two hidden layers 628, with a first hidden layer having nodes 606, 608, 610 and 612, and a second hidden layer having nodes 614, 616, 618 and 620. The artificial neural network 600 has an output layer 630 with nodes 622, 624. Each node 602 to 424 may comprise a processing element (PE), or artificial neuron, which connects to another and has an associated weight and threshold. If the output of any individual node is above the specified threshold value, that node is activated, sending data to the next layer of the network. Otherwise, no data is passed along to the next layer of the network.

In general, artificial neural network 600 relies on training data 526 to learn and improve accuracy over time. However, once the artificial neural network 600 is fine-tuned for accuracy, and tested on testing data 528, the artificial neural network 600 is ready to classify and cluster new data 530 at a high velocity. Tasks in speech recognition or image recognition can take minutes versus hours when compared to the manual identification by human experts.

Each individual node 602 to 424 is a linear regression model, composed of input data, weights, a bias (or threshold), and an output. The linear regression model may have a formula similar to Equation (1), as follows:

$$\Sigma w_i x_i + \text{bias} = w1 \times 1 + w2 \times 2 + w3 \times 3 + \text{bias output} = f(x) = 1 \text{ if } \Sigma w1 \times 1 + b \geq 0; 0 \text{ if} \Sigma w1 \times 1 + b < 0 \quad \text{EQUATION (1)}$$

Once an input layer 626 is determined, a set of weights 632 are assigned. The weights 632 help determine the importance of any given variable, with larger ones contributing more significantly to the output compared to other inputs. All inputs are then multiplied by their respective weights and then summed. Afterward, the output is passed through an activation function, which determines the output. If that output exceeds a given threshold, it "fires" (or activates) the node, passing data to the next layer in the network. This results in the output of one node becoming in the input of the next node. The process of passing data from one layer to the next layer defines the artificial neural network 600 as a feedforward network.

In one embodiment, the artificial neural network 600 leverages sigmoid neurons, which are distinguished by having values between 0 and 1. Since the artificial neural network 600 behaves similarly to a decision tree, cascading data from one node to another, having x values between 0 and 1 will reduce the impact of any given change of a single variable on the output of any given node, and subsequently, the output of the artificial neural network 600.

The artificial neural network 600 may have many practical use cases, like image recognition, speech recognition, text recognition or classification. The artificial neural network 600 may leverage supervised learning, or labeled datasets, to train the algorithm. As the model is trained, its accuracy may be measured using a cost (or loss) function. This is also commonly referred to as the mean squared error (MSE). An example of a cost function is shown in Equation (2), as follows:

$$\text{Cost Function} = MSE = \frac{1}{2m}\sum_{i=1}^{m}(\hat{y}_i - y_i)^2 \to \text{MIN} \quad \text{EQUATION (2)}$$

Where i represents the index of the sample, y-hat is the predicted outcome, y is the actual value, and m is the number of samples.

Ultimately, the goal is to minimize the cost function to ensure correctness of fit for any given observation. As the model adjusts its weights and bias, it uses the cost function and reinforcement learning to reach the point of convergence, or the local minimum. The process in which the algorithm adjusts its weights is through gradient descent, allowing the model to determine the direction to take to reduce errors (or minimize the cost function). With each training example, the parameters 634 of the model adjust to gradually converge at the minimum.

In one embodiment, the artificial neural network 600 is feedforward, meaning it flows in one direction only, from input to output. However, the artificial neural network 600 may also be trained through backpropagation; that is, move in the opposite direction from output to input. Backpropagation allows calculation and attribution of errors associated with each neuron 602 to 424, thereby allowing adjustment to fit the parameters 634 of the model(s) appropriately.

The artificial neural network 600 may be implemented as different neural networks depending on a given task. Neural networks can be classified into different types, which are used for different purposes. The artificial neural network 600 may be implemented as a feedforward neural network, or multi-layer perceptrons (MLPs), comprised of an input layer 626, hidden layers 628, and an output layer 630. While these neural networks are also commonly referred to as MLPs, they are actually comprised of sigmoid neurons, not perceptrons, as most real-world problems are nonlinear. Trained data 504 usually is fed into these models to train them, and they are the foundation for computer vision, natural language processing, and other neural networks. The artificial neural network 600 may also be implemented as a convolutional neural network (CNN). A CNN is similar to feedforward networks, but usually utilized for image recognition, pattern recognition, and/or computer vision. These networks harness principles from linear algebra, particularly matrix multiplication, to identify patterns within an image. The artificial neural network 600 may further be implemented as a recurrent neural network (RNN). A RNN is identified by feedback loops. The RNN learning algorithms are primarily leveraged when using time-series data to make predictions about future outcomes, such as stock market predictions or sales forecasting. The artificial neural network 600 may be implemented as any type of neural network suitable for a given EDMP of system 100, and the MLP, CNN, and RNN are merely a few examples. Embodiments are not limited in this context.

The artificial neural network 600 may have a set of associated parameters 634. There are a number of different parameters that must be decided upon when designing a neural network. Among these parameters are the number of layers, the number of neurons per layer, the number of training iterations, and so forth. Some of the more important parameters in terms of training and network capacity are a number of hidden neurons parameter, a learning rate parameter, a momentum parameter, a training type parameter, an Epoch parameter, a minimum error parameter, and so forth. The artificial neural network 600 may have other parameters 634 as well. Embodiments are not limited in this context.

In some cases, the artificial neural network 600 may also be implemented as a deep learning neural network. The term deep learning neural network refers to a depth of layers in a given neural network. A neural network that has more than three layers-which would be inclusive of the inputs and the output—can be considered a deep learning algorithm. A neural network that only has two or three layers, however, may be referred to as a basic neural network. A deep learning neural network may tune and optimize one or more hyperparameters 636. A hyperparameter is a parameter whose values are set before starting the model training process. Deep learning models, including convolutional neural network (CNN) and recurrent neural network (RNN) models can have anywhere from a few hyperparameters to a few hundred hyperparameters. The values specified for these hyperparameters can impact the model learning rate and other regulations during the training process as well as final model performance. A deep learning neural network may use hyperparameter optimization algorithms to automatically optimize models. The algorithms used include Random Search, Tree-structured Parzen Estimator (TPE) and Bayesian optimization based on the Gaussian process. These algorithms are combined with a distributed training engine for quick parallel searching of the optimal hyperparameter values.

Figure 7:
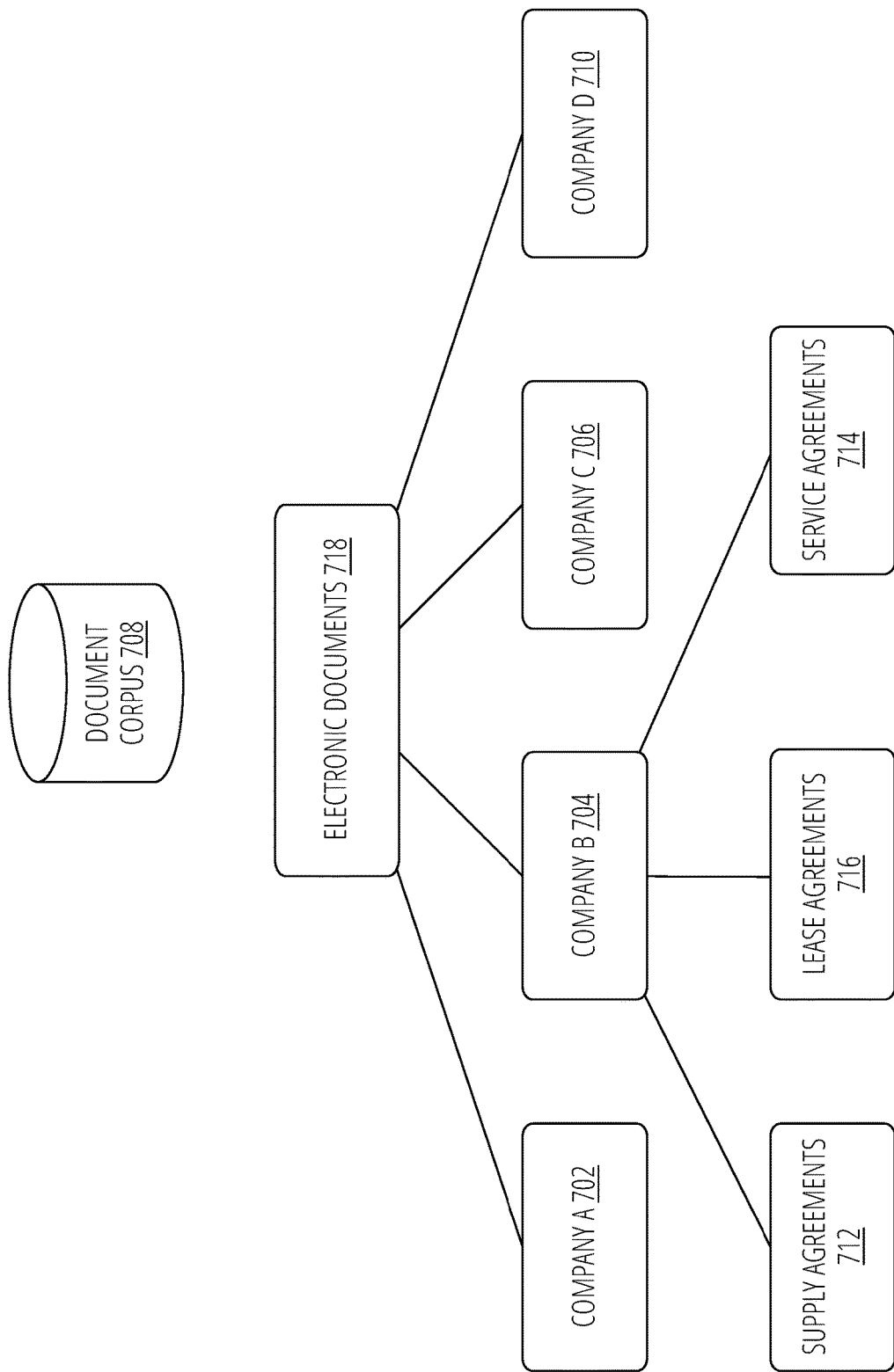
FIG. 7 illustrates a document corpus, according to some embodiments of the current subject matter.

FIG. 7 illustrates an example of a document corpus 708 (which may be stored in the source(s) storing electronic documents 202) suitable for use by the document graph engine 150 of the server device 102. In general, a document corpus is a large and structured collection of electronic documents, such as text documents, which are typically used for natural language processing (NLP) tasks such as text classification, sentiment analysis, topic modeling, and information retrieval. A corpus can include a variety of document types such as web pages, books, news articles, social media posts, scientific papers, and more. The corpus may be created for a specific domain or purpose, and it may be annotated with metadata or labels to facilitate analysis. Document corpora are commonly used in research and industry to train machine learning models and to develop NLP applications.

As depicted in FIG. 7, the document corpus 708 may include information from electronic documents 718 derived from the document records 138 stored in the data store 126 (e.g., similar to the source(s) storing electronic documents 202). The electronic documents 718 may include any electronic document having metadata such as STME 132 suitable for receiving an electronic signature, including both signed electronic documents or unsigned electronic documents. Different sets of the electronic documents 718 of the document corpus 708 may be associated with different entities. For example, a first set of electronic documents 718 is associated with a company A 702. A second set of electronic documents 718 is associated with a company B 704. A third set of electronic documents 718 is associated with a company C 706. A fourth set of electronic documents 718 is associated with a company D 710. Although some embodiments discuss the document corpus 708 having electronic documents 718, it may be appreciated that the document corpus 708 may have unsigned electronic document as well, which may be mined using the AI/ML techniques described herein. Embodiments are not limited in this context.

Each set of electronic documents 718 associated with a defined entity may include one or more subsets of the electronic documents 718 categorized by document type. For instance, the second set of electronic documents 718 associated with company B 704 may have a first subset of electronic documents 718 with a document type for supply agreements 712, a second subset of electronic documents 718 with a document type for lease agreements 716, and a third subset of electronic documents 718 with a document type for service agreements 714. In one embodiment, the sets and subsets of electronic documents 718 may be identified using labels manually assigned by a human operator, such as metadata added to a document record for a signed electronic document created in a document management system, or feedback from a user of the system 100 or the system 200 during a document generation process. In one embodiment, the sets and subsets of electronic documents 718 may be unlabeled. In such cases, the document graph engine 150 may use the search model 1406 to identify a defined entity or a document type for a defined entity.

Figure 8:
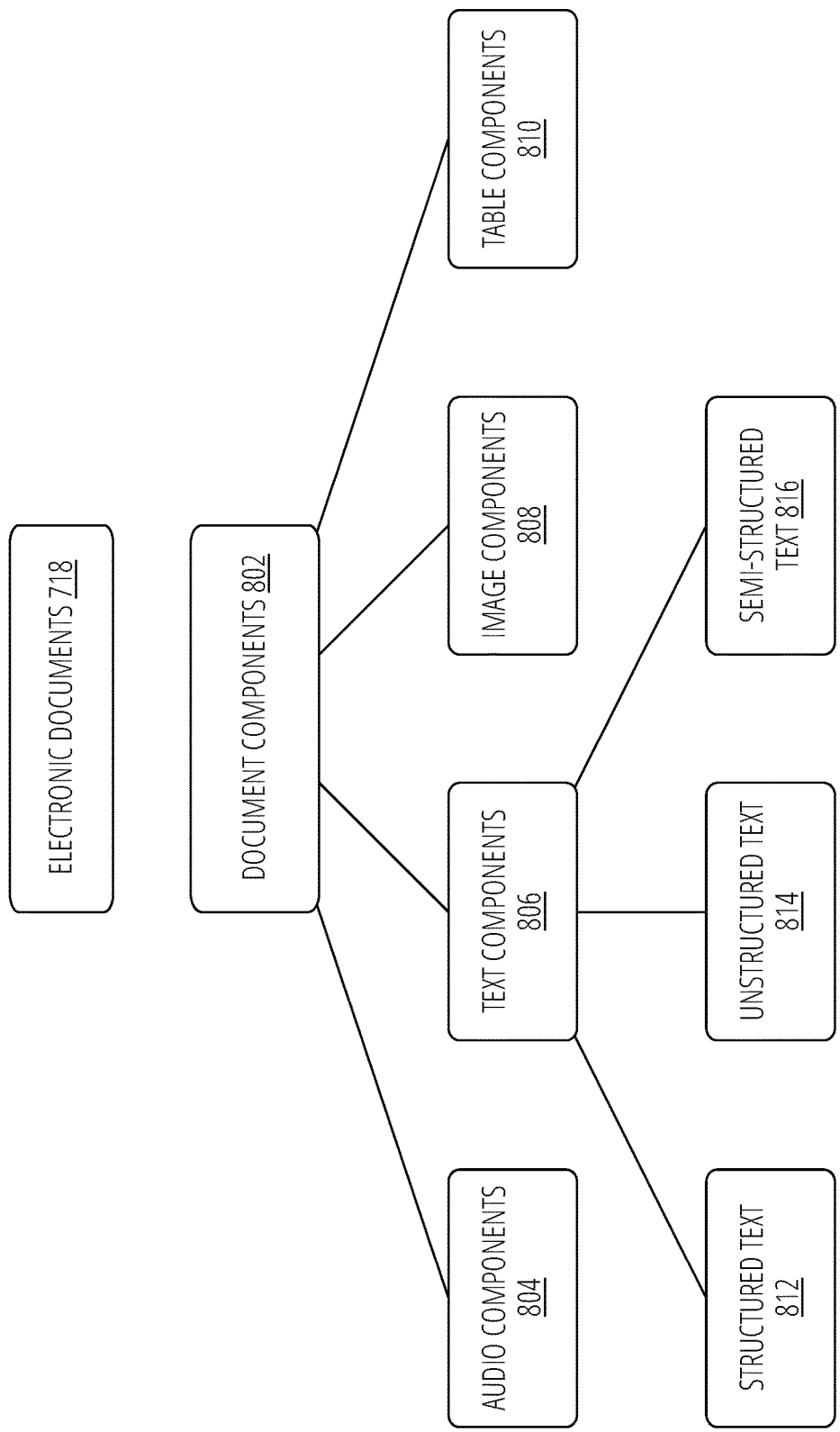
FIG. 8 illustrates electronic documents, according to some embodiments of the current subject matter.

FIG. 8 illustrates an example of an electronic document 718. An electronic document 718 may include different information types that collectively form a set of document components 802 for the electronic document 718. The document components 802 may comprise, for example, one or more audio components 804, text components 806, image components 808, or table components 810. Each document component 802 may comprise different content types. For example, the text components 806 may comprise structured text 812, unstructured text 814, or semi-structured text 816.

Structured text 812 refers to text information that is organized in a specific format or schema, such as words, sentences, paragraphs, sections, clauses, and so forth. Structured text 812 has a well-defined set of rules that dictate how the data should be organized and represented, including the data types and relationships between data elements.

Unstructured text 814 refers to text information that does not have a predefined or organized format or schema. Unlike structured text 812, which is organized in a specific way, unstructured text 814 can take various forms, such as text information stored in a table, spreadsheet, figures, equations, header, footer, filename, metadata, and so forth.

Semi-structured text 816 is text information that does not fit neatly into the traditional categories of structured and unstructured data. It has some structure but does not conform to the rigid structure of a specific format or schema. Semi-structured data is characterized by the presence of context tags or metadata that provide some structure and context for the text information, such as a caption or description of a figure, name of a table, labels for equations, and so forth.

Figure 9:
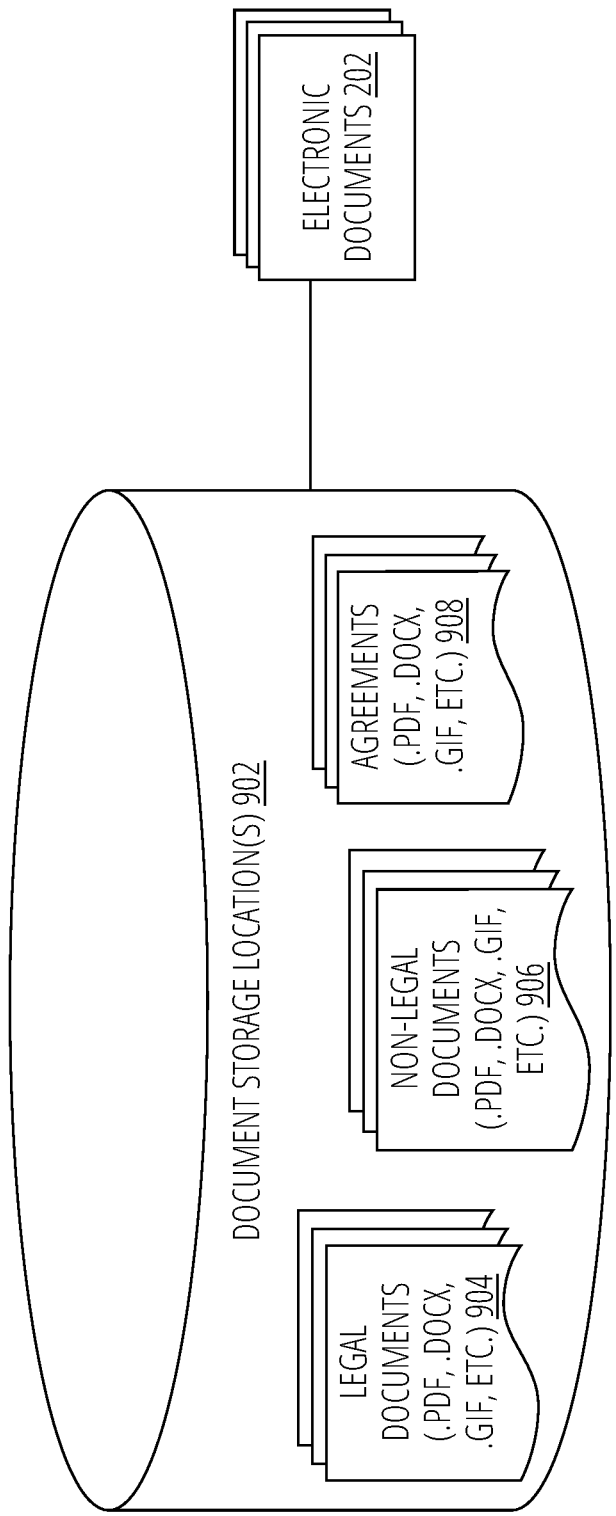
FIG. 9 illustrates an example of document storage location(s) that may be used as a source for the electronic documents, according to some embodiments of the current subject matter.

FIG. 9 illustrates an example of document storage location(s) 902 that may be used as a source for the electronic documents 202, according to some embodiments of the current subject matter. The document storage location(s) 902 may be a single database, repository, etc. and/or multiple databases, repositories, etc. The document storage location(s) 902 may be configured to store any type of documents, data, information, files, etc.

The documents may be any type of documents, such as, for example, agreements, applications, websites, video files, audio files, text files, images, graphics, tables, spreadsheets, computer programs, etc. For example, as shown in FIG. 9, the document storage location(s) 902 may store one or more legal documents 904, non-legal documents 906, and/or agreements 908. Any of the documents 904, 906, and/or 908 may be in any desired format, e.g., .pdf, .docx, .xls, and/or any other type of format. The documents may also have any desired size. Moreover, the documents may be organized in any desired fashion. In some examples, documents may be nested within other documents (e.g., one document embedded in another document); one document may be linked to another document, etc. As such, the document storage location(s) 902 may be a unified data storage location that may store any type, any size, any format, etc. documents, data, information, etc.

In some embodiments, the documents stored in the document storage location(s) 902 may be structured, unstructured, and/or semi-structured. Moreover, the documents may be labeled and/or unlabeled. For example, one or more documents stored in the document storage location(s) 902 may have been processed by one or more ML model(s) 210 to generate one or more structures for the documents and/or labels that may be assigned to one or more portions of the documents.

The documents stored in document storage location(s) 902 may be queried, searched, and/or retrieved by and/or provided to the document graph engine 150 as electronic documents 202. For example, the document graph engine 150 may retrieve all master services agreements from the document storage location(s) 902 for the purposes of analyzing them and generating a document graph of such master services agreements. The document graph engine 150 may then use the generated agreement graph to respond to various queries from user devices 216.

Figure 10:
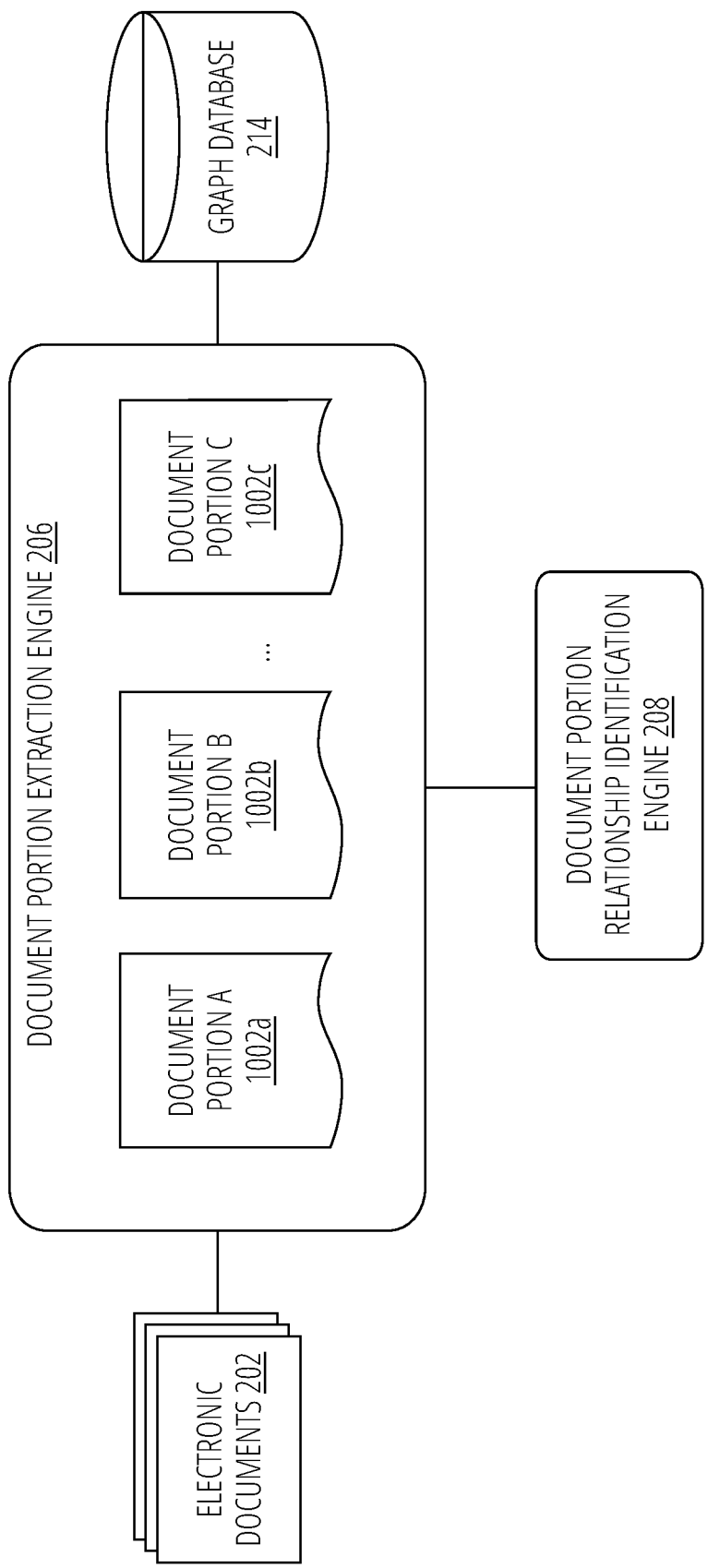
FIG. 10 illustrates an example of the document portion extraction engine, according to some embodiments of the current subject matter.

FIG. 10 illustrates an example of the document portion extraction engine 206, according to some embodiments of the current subject matter. The engine 206 may be configured to receive one or more electronic documents 202 for processing. The document portion extraction engine 206 may then analyze the received documents 202 and determine types of the documents (e.g., lease agreements, master services agreements, etc.).

In some embodiments, using the determined type (e.g., lease agreement) of the received documents 202, the document portion extraction engine 206 may identify and use one or more ML model(s) 210 for processing of documents of a specific type. Alternatively, or in addition, the engine 206 may select and/or use any model 210 for analyzing the document. Moreover, one model 210 may be used to process all types of documents.

The engine 206 may use the ML model(s) 210 for analyzing (e.g., upon providing appropriate instructions and/or one or more documents 202) and extracting one or more document portions A, B, . . . , C 1002a, 1002b, . . . 1002c. For example, the document portion A 1002a may be a termination clause of an agreement (e.g., "A term of this agreement is one year."); the document portion B 1002b may be governing law clause of the same agreement (e.g., "This agreement shall be interpreted under the laws of the State of California"); and the document portion C 1002c may be property description clause of the agreement (e.g., "The property is located at 123 Main Street."). The document portions 1002 may belong to the same document, and/or different documents of the same type of documents, and/or different documents of different types.

In some embodiments, the engine 206 may instruct the ML model(s) 210 to find and retrieve particular document portions 1002a, 1002b, 1002c. For example, the engine 206 may instruct the ML model(s) 210 to find clauses related to termination, governing law, liabilities, etc. Identification of clauses and/or similar clauses may be executed using a semantic similarity analysis (either within the same document and/or across documents). As stated above, similarity of clauses may be determined using one or more thresholds (e.g., a predetermined number of words that may be similar to one another). For instance, a governing law clause of "This agreement shall be subject to the laws of the State of California." and a governing law clause of "This master services agreement shall be interpreted under the laws of the State of California" may be considered to be semantically similar. Similarity of clauses may be used to determine a particular standard clause for a particular type of agreement (e.g., master services agreement).

Once document portions are extracted from the electronic documents by the ML model(s) 210, the engine 206 may, optionally, label each document portion using one or more identifiers and/or any other metadata. Moreover, the extracted document portions may also be stored in the graph database 214. Additionally, or alternatively, the document portions may be provided to the document portion relationship identification engine 208 for determination of relationships between document portions, as shown in FIG. 11.

Figure 11:
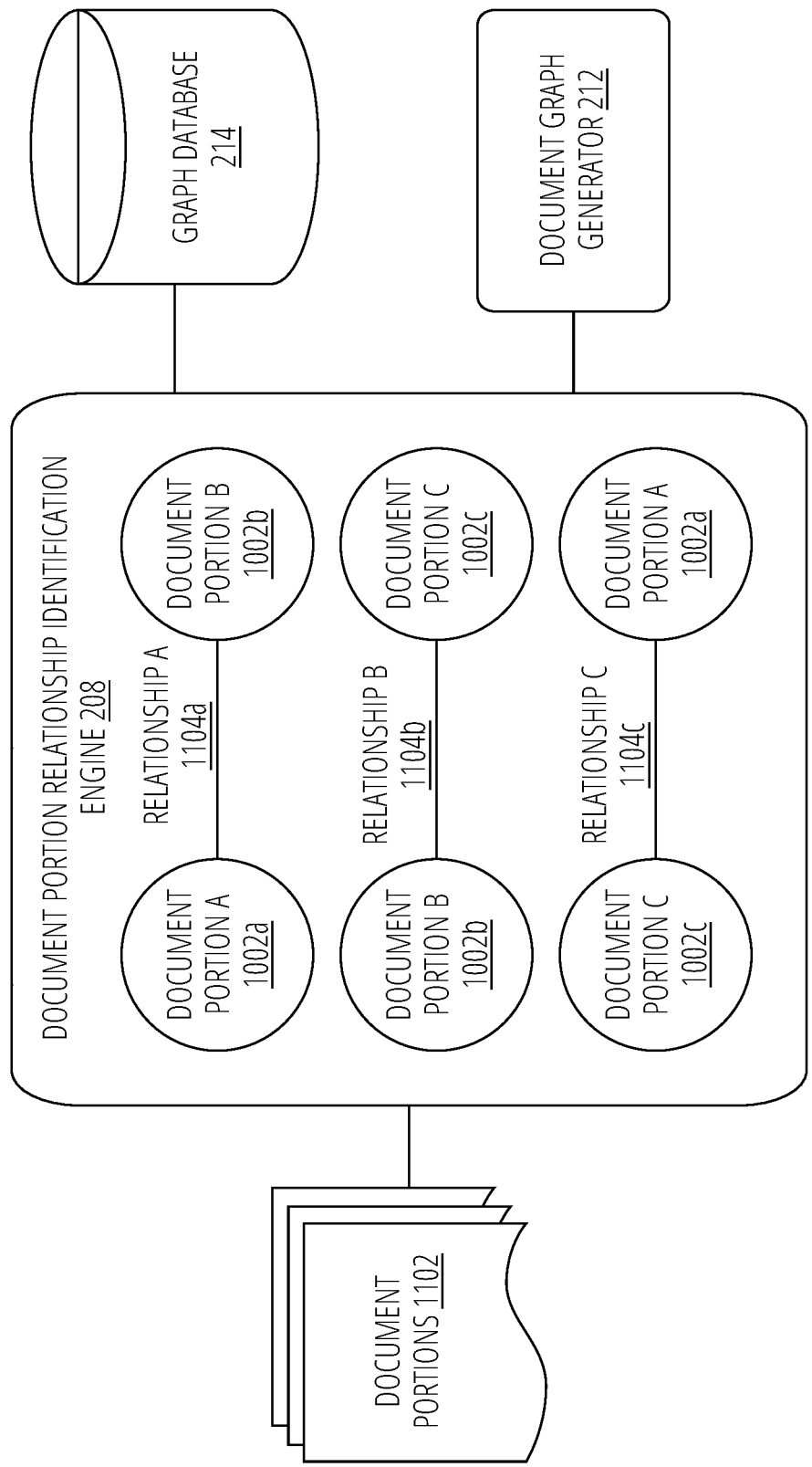
FIG. 11 illustrates an example of the document portion relationship identification engine, according to some embodiments of the current subject matter.

FIG. 11 illustrates an example of the document portion relationship identification engine 208, according to some embodiments of the current subject matter. The document portion relationship identification engine 208 may be configured to receive one or more document portions 1102 (e.g., document portions 1002a, 1002b, . . . 1002c, as shown in FIG. 10). Alternatively, or in addition, the document portion relationship identification engine 208 may be configured to process electronic documents 202 and determine one or more document portions contained within electronic documents 202 rather than receiving them from the document portion extraction engine 206. The document portion relationship identification engine 208 may then use the document portions 1102 to ascertain relationships between the document portions. The relationships may be identified using various identifiers, metadata, keywords, etc., which may be stored as code, data, etc.

In some embodiments, to determine relationships between document portions, the document portion relationship identification engine 208 may select and/or use one or more ML model(s) 210 to identify and determine relationship(s) between document portions 1102. The document portion relationship identification engine 208 may execute a semantic similarity search to identify such relationships. Some non-limiting examples of relationships may, using the master services agreement example, include INCLUDE (e.g., an agreement includes a particular clause), PARTY_TO (e.g., a particular entity is a party to the agreement), REQUIRE (e.g., enforceability of a clause requires validity of another clause in the agreement), FOLLOW (e.g., one clause follows another clause), etc. In some embodiments, relationships between document portions may be determined within a particular document of a particular type (e.g., a lease agreement), and/or across several documents of the same type (e.g., master services agreements), and/or across several documents of different types (e.g., lease agreements and master services agreements). Any way of determining relationships between portions of documents is possible.

As shown in FIG. 11, the document portion relationship identification engine 208 may determine that document portion A 1002a may be related to document portion B 1002b using relationship A 1104a; document portion B 1002b may be related to document portion C 1002c using relationship B 1104b; and document portion C 1002c may be related to document portion A 1002a using relationship C 1104c. Each of the relationships 1104 may be the same type of relationship (e.g., INCLUDE) and/or different relationships (e.g., INCLUDE and FOLLOW). The determined relationships may be stored by the document portion relationship identification engine 208 in the graph database 214 and/or provided to the document graph generator 212 for generation of one or more document graphs, as for example is shown in FIGS. 12 and 13.

FIG. 12 illustrates an example document graph 1200, according to some embodiments of the current subject matter. The document graph 1200 may include one or more nodes 1202 (a, b, c, d . . . ) connected using one or more relationships 1104.

For example, the node 1202a may include agreement of type 1 1204 (e.g., lease agreement) and may be considered as a root node of the document graph 1200, one which other nodes 1202 depend. In particular, the node 1202a may include data, information, metadata, etc., which may correspond to the agreement (e.g., lease agreement). Moreover, node 1202a may include one or more vector embeddings that may be generated by the document graph generator 212 (and/or any other component of the document graph engine 150) using one or more ML model(s) 210.

The node 1202b may include data, information, metadata, etc., which may correspond to the document portion A 1002a (e.g., termination clause of the lease agreement). Similarly, the node 1202b may include one or more vector embeddings that may be generated by the document graph generator 212 (and/or any other component of the document graph engine 150) using one or more ML model(s) 210, where the vector embeddings may specifically relate to the termination clause of the lease agreement.

The node 1202c may include data, information, metadata, etc., which may correspond to the document portion B 1002b (e.g., governing law clause of the lease agreement). Again, the node 1202c may include one or more vector embeddings that may be generated by the document graph generator 212 (and/or any other component of the document graph engine 150) using one or more ML model(s) 210. The vector embeddings contained in node 1202c may specifically relate to the governing law clause of the lease agreement.

The node 1202d may include data, information, metadata, etc., which may correspond to the document portion C 1002c (e.g., property description clause of the lease agreement). The node 1202c may be represented by one or more vector embeddings generated by the document graph generator 212 (and/or any other component of the document graph engine 150) using one or more ML model(s) 210. The vector embeddings contained in node 1202d may specifically relate to the property description clause of the lease agreement. As can be understood, the current subject matter is not limited to the examples set forth herein.

As stated above, the nodes 1202 may be connected using various relationships 1206. For example, the node 1202a may be connected to the node 1202b using relationship 1 1206a; node 1202a may be connected to node 1202b using relationship 2 1206b; node 1202b may be connected to node 1202d using relationship 3 1206c; node 1202b may be connected to node 1202c using relationship A 1104a; node 1202c may be connected to node 1202d using relationship B 1104b; and node 1202d may be connected to node 1202b using relationship C 1104c; etc. The relationship 1 1206a may be an INCLUDES relationship, where the agreement in node 1202a may include the document portion A 1002a in node 1202b. Similarly, the relationship 2 1206b and node 1202c may likewise be INCLUDE(S) relationships indicating that the lease agreement includes the governing law clauses and the property description clauses. However, the relationship A 1104a, relationship B 1104b, and relationship C 1104c may be of different types. For example, the relationship A 1104a may be a REQUIRE(S) relationship, where a termination clause in a lease agreement may require a specific governing law for its interpretation. The relationship B 1104b may be RELATE(S) relationship, whereby location of the property may be relevant and/or related to the law using which the lease agreement in node 1202a may be interpreted. Lastly, relationship C 1104c may define a relationship indicating how lease agreement in node 1202a may be termination with regard to the property identified by document portion C 1002c in node 1202d. As can be understood, the nodes 1202 may be connected to other nodes using any other relationships.

In some embodiments, the relationships 1104 may also be generated by the document graph generator 212 (and/or any other components of document graph engine 150) and stored as vector embeddings and/or any other data, which may, for example, be used to trigger retrieval of data from different nodes of the document graph 1200 in response to a query. The document graph generator 212 may also store document graph 1200 in the graph database 214.

FIG. 13 illustrates another example document graph 1300, according to some embodiments of the current subject matter. The document graph 1300 may include one or more nodes connected using one or more relationships.

For example, a root node of the document graph 1300 may include agreement 1302. The agreement may be of a specific type (e.g., master non-disclosure agreement (MNDA)). It may also be written in a particular language (e.g., US English). The node containing agreement 1302 may also include the text of the agreement and/or any other text. The agreement 1302 node may be connected using INCLUDES 1310 relationship to the clause 1308 node. The clause 1308 may be a product warranty clause, which may be written in US English, where the node includes the text of the clause 1308. Further, the agreement 1302 node may be connected using PARTY_TO 1312 relationship to the node including information about company 1304, e.g., Company A that is party to MNDA, and using PARTY_TO 1314 relationship to the node including information about company 1306, e.g., Company B that is also party to MNDA in the agreement 1302 node.

In some embodiments, document graphs (e.g., document graph 1200 and/or document graph 1300) generated by the document graph generator 212 may be stored as data models in the graph database 214. In agreements, the data models may capture agreement-related information, such as, for example, companies, individuals, eSignature envelopes, agreements, documents, amendments, clauses, document templates, clause templates, data model concepts and their properties, orchestrations workflows used to create agreements and their workflow steps, connectors used, comments and redlines on documents, right and obligations, forms, etc. For example, the graph database 214 (which may also be a unified database) and/or the document graph engine 150 may be used to determine whether the user of the user device 216 is using one or more document templates that may reference various document portions (e.g., clauses in agreements), and/or is using document templates that do not explicitly reference document portions (e.g., clauses in agreements), where the document portions may be hard-coded into the template, and/or is uploading an electronic document in a particular format (e.g., .docx, .pdf, etc.) but it is unclear whether it was generated using a template, etc. The document graph engine 150 and/or graph database 214 may be configured to provide a standardized way of storing data related to electronic documents by organizing the data into one or more agreement graphs.

The graph database 214, as shown in FIG. 2, may be configured to continuously process and store real-world agreement data, as it changes over time. Further, the graph database 214 may support execution of real-world queries (e.g., queries 218) over electronic document data, where the queries may include structured queries over nodes, structured queries that follow paths through nodes via relationships, textual similarity queries using vector embeddings, and/or any other types of queries. The graph database 214 may also store various results and/or extractions of operations executed by one or more components of the document graph engine 150, including the ML model(s) 210. It may also use stored information to supplement operations of the document graph engine 150 and the ML model(s) 210.

For instance, document graph generator 212 may be configured to inject various contexts into queries (e.g., queries 218 (e.g., natural language queries, graph queries, etc.) submitted by user devices 216, as shown in FIG. 2), which may aid the document graph engine 150 in generating a response 220 in a natural language response. The contexts may include various combinations of a direct lookup for specific values, vector similarity search results, and/or any other contexts. For example, the document graph engine 150 may supplement queries 218 in the following example, non-limiting ways.

user device 216: Please provide our Mutual NDA for use in Germany engine 150: I can provide you with a template for a Mutual Non-Disclosure Agreement (NDA) that you can use in Germany.

Mutual Non-Disclosure Agreement (NDA)

This Mutual Non-Disclosure Agreement (the "Agreement") is made and entered into as of [Date], (the "Effective Date"), by and between:

1. Disclosing Party: [Your Company Name], a company organized and existing under the laws of [Your Country], with its principal place of business at [Your Address] ("Disclosing Party").

Another non-limiting example of the operation of the document graph engine 150 may include the following.

user device 216: Does agreement XYZ contradict or conflict with any existing terms I have with Microsoft?

engine 150: Potentially the privacy obligations in your existing MSA with Microsoft are in conflict with the privacy obligations in agreement XYZ.

user device 216: What active agreements would be affected by the proposed change to GDPR and what would the impact have?

engine 150: You currently have 128 agreements that contain GDPR related clauses. These agreements should be reviewed. Would you like me to help with that review now?

In some embodiments, the document graphs may be used to extract document portions (clauses) related to various electronic documents (e.g., agreements). For example, a document graph may be used to extract and classify the following as a "Compensation and Payment" clause to an agreement:

"Compensation and Payment. A. CITY shall pay FIRST PARTY an all-inclusive fee that shall not exceed the amount as described in Exhibit A Scope of Services-Hourly Rates. All payments shall be inclusive of all indirect and direct charges to the Project incurred by FIRST PARTY. The CITY reserves the right to withhold payment if the City determines that the quantity or quality of the work performed is unacceptable. B. FIRST PARTY's fee for the services as set forth herein shall be considered as full compensation for all indirect and direct personnel, materials, supplies and equipment, and services incurred by FIRST PARTY and used in carrying out or completing the work. C. Payments shall be monthly for the invoice amount or such other amount as approved by CITY. As each payment is due, the FIRST PARTY shall submit a statement describing the services performed to CITY. This statement shall include, at a minimum, the project title, agreement number, the title(s) of personnel performing work, hours spent, payment rate, and a listing of all reimbursable costs. CITY shall have the discretion to approve the invoice and the work completed statement. Payment shall be for the invoice amount or such other amount as approved by CITY. D. Payments are due upon receipt of written invoices. CITY shall have the right to receive, upon request, documentation substantiating charges billed to CITY. CITY shall have the right to perform an audit of the FIRST PARTY's relevant records pertaining to the charges."

In some embodiments, the document graphs may also be used to provide various analytics. For example, the document graphs may be used to determine how templates for specific agreements are being used, which clauses are used more often than others and/or whether such clauses should be considered and/or determined as standard clauses, etc. As can be understood, any other way of using document graphs are possible.

Figure 14:
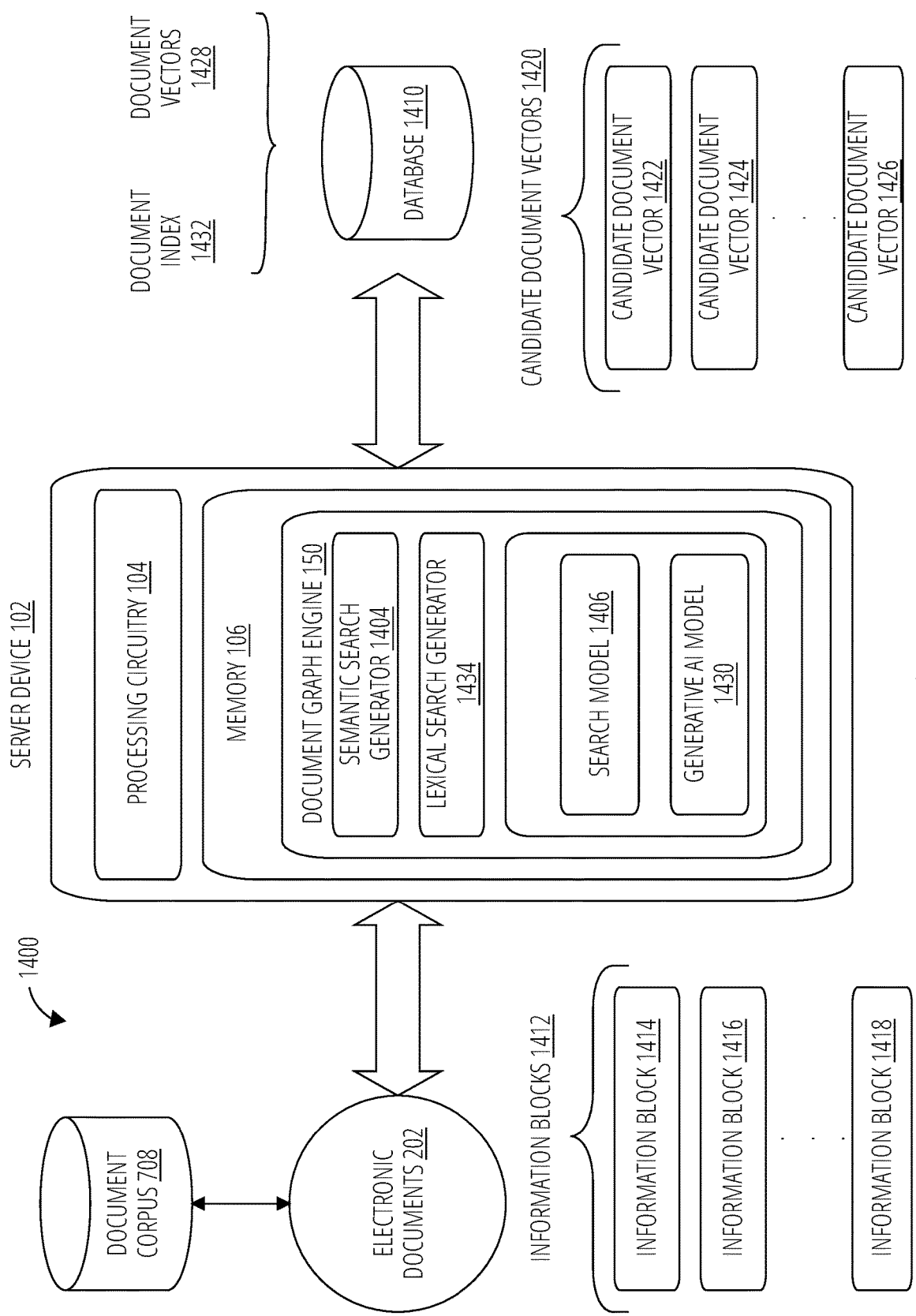
FIG. 14 illustrates an apparatus, according to some embodiments of the current subject matter.

FIG. 14 illustrates an apparatus 1400. The apparatus 1400 may comprise an example implementation for the server device 102. The server device 102 may have access to a collection of electronic documents from a document corpus 708, including a representative electronic documents 202. The server device 102 may also have access to a set of document vectors 1428 stored in a database 1410. The document vectors 1428 may be contextualized embeddings of document content from the collection of electronic documents of the document corpus 708, such as the electronic documents 202, for example. The document vectors 1428 may be indexed and stored as a document index 1432 to facilitate search and retrieval operations.

In some cases, the document vectors 1428 may include or make reference to text components 806 for an electronic documents 202. Alternatively, the text components 806 may be encoded into a different format other than a vector, such as text strings, for example. This may allow formation of a search index suitable for lexical searching, such as by lexical search generator 1434.

The document corpus 708 may store one or more electronic documents, such as, electronic documents 202. Examples for the electronic documents 202 may include document images 140, signed electronic documents 142 or unsigned electronic documents stored in the form of document records 138. In some embodiments, the document corpus 708 may be proprietary and confidential in nature and associated with a particular defined entity, such as an individual, a business, a business unit, a company, an organization, an enterprise, or other defined legal or business structure.

The server device 102 may implement a document graph engine 150. The document graph engine 150 may implement various tools and algorithms to perform lexical searching, semantic searching, or a combination of both, such as for the purposes of identifying specific document portions, structures of documents, generation of templates, etc. In one embodiment, for example, the document graph engine 150 may implement a semantic search generator 1404 to perform semantic searches for a user. In one embodiment, for example, the document graph engine 150 may optionally implement a lexical search generator 1434 to perform lexical searches for a user. The document graph engine 150 may use the lexical search generator 1434 to perform lexical searching in response to query 218 from the user device 216. The document graph engine 150 may use the semantic search generator 1404 to perform semantic searching in response to the query 218. In some embodiments, the document graph engine 150 may use the lexical search generator 1434 to generate a first set of lexical response 220, and the semantic search generator 1404 to iterate over the first set of lexical response 220 to generate a second set of semantic response 220. Embodiments are not limited in this context.

As depicted in FIG. 14, the document graph engine 150 may implement the model inferencer 408, as described with reference to FIG. 5, locally as part of the server device 102. Additionally, or alternatively, the model inferencer 408 may be implemented on a device separate from the server device 102. In the latter case, the document graph engine 150 may access inferencing services provided by the model inferencer 408 remotely via a network or a set of application program interfaces (APIs).

The model inferencer 408 may implement various machine learning models trained and managed in accordance with the artificial intelligence architecture 500, such as ML model 330, for example. In one embodiment, the ML model 330 may comprise a search model 1406 trained to transform document content contained within an electronic documents 202 into semantically searchable document content. For example, the search model 1406 may implement an artificial neural network 600, such as a recurrent neural network (RNN) for an Embeddings from Language Models (ELMo), Bidirectional Encoder Representations from Transformers (BERT), a BERT variant, and so forth. In one embodiment, the ML model 330 may comprise a generative AI model 1430 to implement generative AI techniques to assist in summarizing some or all of the search results in a natural language such as a human language for better readability and understanding by a human reader. For example, the generative AI model 1430 may implement a language model such as a generative pre-trained transformer (GPT) language model, among others. It may be appreciated that the model inferencer 408 may implement other types of ML model 330 to support search operations as desired for a given set of design constraints, such as search speed, size of data sets, number of electronic documents, compute resources, memory resources, network resources, device resources, and so forth. Embodiments are not limited in this context.

The document graph engine 150 may use the ML models of the model inferencer 408 to perform AI/ML inferencing operations in an offline phase and/or an online phase. The document graph engine 150 may encode or transform a set of electronic documents 202 to create a set of contextualized embeddings (e.g., sentence embeddings) representative of information or document content contained within each electronic documents 202. The document graph engine 150 may also perform query enhancement and information retrieval operations on the contextualized embeddings for each electronic documents 202. For instance, the document graph engine 150 may receive a query 218, encode it to a contextualized embedding in real-time, and leverage vector search to retrieve response 220 with semantically similar document content within electronic documents 202. The document graph engine 150 may prepare a prompt with both the user device 216 and some or all of the response 220 (e.g., the top k sections) from the electronic documents 202. The server device 102 may surface the response 220 in a graphical user interface (GUI) of a client device, such as client devices 112 or client devices 116.

In some embodiments, the document graph engine 150 may encode a set of electronic documents 202 to create a set of contextualized embeddings (e.g., sentence embeddings) for document content within each electronic documents 202. A contextualized embedding refers to a type of word representation in natural language processing that takes into account the context in which a word appears. Unlike traditional static word embeddings, which represent each word with a fixed vector, contextualized embeddings vary depending on the specific context in which the word is used. Contextualized embeddings are typically generated by training deep neural networks, such as recurrent neural networks (RNNs) or transformers, on large amounts of text data. These models learn to produce a unique embedding for each occurrence of a word in a sentence, taking into account the surrounding words and the overall meaning of the sentence. Contextualized embeddings have proven to be highly effective in a wide range of natural language processing tasks, including text classification, question answering, and machine translation, among others. Popular examples of contextualized embeddings include Embeddings from Language Models (ELMo), Bidirectional Encoder Representations from Transformers (BERT), a generative pre-trained transformer (GPT) language model, transformer-XL, among others.

A general example illustrates the concept of contextualized embeddings. Consider the word "bank", which can have multiple meanings depending on the context. In the sentence "I deposited my paycheck at the bank", the word "bank" refers to a financial institution. But in the sentence "I went for a walk along the bank of the river", the word "bank" refers to the edge of a body of water. A contextualized embedding would take into account the different meanings of "bank" in these two sentences and produce different embeddings for each occurrence of the word. This would allow downstream natural language processing models to better understand the meaning of the word in context and make more accurate predictions.

A format of a contextualized embedding depends on the specific model used to generate it. In general, contextualized embeddings are represented as high-dimensional vectors of real numbers, where each dimension corresponds to a particular feature or aspect of the word's context. For example, the Embeddings from Language Models (ELMo) model generates contextualized embeddings as a concatenation of the output from multiple layers of a bidirectional Long Short-Term Memory (LSTM) network. Each LSTM layer captures information about the word's context at a different level of granularity, and the final contextualized embedding is a weighted combination of the embeddings from all the layers. On the other hand, Bidirectional Encoder Representations from Transformers (BERT) generates contextualized embeddings using a multi-layer transformer network. In this case, the contextualized embedding for a word is a fixed-length vector that represents the entire sequence of words in the input sentence, with the specific position of the word encoded as a positional embedding. The exact format of a contextualized embedding can also vary depending on the specific downstream task for which it is being used. For example, a classification model may take the entire contextualized embedding as input, while a sequence labeling model may use only a subset of the dimensions corresponding to the specific position of the word in the input sequence.

In some embodiments, the model is fine-tuned to support search tasks performed by the document graph engine 150, such as encoding a set of electronic documents 202. The model may be trained on the electronic documents 202 stored in the document corpus 708, which may be specifically associated with a defined entity, such as a customer or client of the system 100 or system 200. Consequently, the search model 1406 and the generative AI model 1430 are trained on confidential and proprietary information associated with a defined entity in order to perform custom and highly specialized inferencing operations and tasks for the defined entity.

The search model 1406 may implement an encoder to encode a sequence of sentences within a document or an entire document. However, the encoder encodes each token (e.g., a word or subword) in the input sequence independently and produces a separate contextualized embedding for each token. Therefore, to encode an entire document or a sequence of sentences within a document, the search model 1406 needs to aggregate the embeddings of individual tokens in a meaningful way. One way to aggregate the embeddings is to take the mean or the maximum of the embeddings across all tokens in the sequence. This can be useful for tasks such as document content classification or sentiment analysis, where the search model 1406 assigns a label or score to a portion of a document or the entire document based on its content. Another way to aggregate the embeddings is to use an attention mechanism to weight the importance of each token based on its relevance to the task at hand. This can be useful for tasks such as question answering or summarization, where the search model 1406 is tuned to focus on the most informative parts of the input sequence. There are also more sophisticated ways to aggregate the embeddings, such as hierarchical pooling or recurrent neural networks, that take into account the structure of the document or sequence. The specific aggregation method depends on the task and the characteristics of the input data and may require some experimentation to find the most effective approach. Embodiments are not limited in this context.

In some embodiments, the document graph engine 150 may encode a set of electronic documents 202 to create a set of contextualized embeddings (e.g., sentence embeddings) for information or document content contained within each electronic documents 202. As depicted in FIG. 14, electronic documents 202 may include a set of N information blocks 1412, where N is any positive integer. FIG. 14 depicts an example set of Ninformation blocks 1412 that includes an information block 1414, an information block 1416 and an information block 1418 (i.e., N=3). Each of the information blocks 1412 may include a defined amount of textual information of any feature size suitable for a given token, such as an n-gram, a word, a sentence, a phrase, a paragraph, a section, and so forth. It may be appreciated that N=3 is by way of example and not limitation. The document graph engine 150 may use the search model 1406 to encode the information blocks 1412 into corresponding contextualized embeddings depicted as a set of M document vectors 1428, where M represents any positive integer.

The document graph engine 150 may store the document vectors 1428 in a database 1410 and index the document vectors 1428 into a searchable document index 1432. The document index 1432 allows for rapid retrieval of relevant document vectors 1428 by the document graph engine 150 during the online search phase. The document index 1432 may include any data structure that stores these embeddings in a way that allows for efficient retrieval. For example, the document index 1432 may be implemented as a hash table or a tree structure to index the embeddings by the words or phrases they represent.

The document graph engine 150 may further receive a query 218, encode it to a contextualized embedding in real-time, enhance it with knowledge obtained from term-centric (e.g., based on query search terms) generated document graph and leverage vector search to retrieve response 220 with semantically similar document content within an electronic documents 202. The query 218 may include any free form text in a natural language representation of a human language. The document graph engine 150 may use the search model 1406 to generate a contextualized embedding for the query 218 to form a search vector. As previously discussed, a contextualized embedding may include a vector representation of a sequence of words in the user device 216 that includes contextual information for the sequence of words.

The document graph engine 150 may search a document index 1432 of contextualized embeddings for the electronic documents 202 with the search vector, which is itself a contextualized embedding of the same type as those stored in the document index 1432. Each contextualized embedding may include a vector representation of a sequence of words in the electronic document that includes contextual information for the sequence of words. The search process may produce a set of response 220. The response 220 may include a set of P candidate document vectors 1420, where P is any positive integer. The response 220 may include candidate document vectors 1420 that are semantically similar to the search vector of the query 218. FIG. 14 depicts an example set of P candidate document vectors 1420 that includes a candidate document vector 1422, a candidate document vector 1424 and a candidate document vector 1426 (i.e., P=3). It may be appreciated that P=3 is by way of example and not limitation.

In some embodiments, as with the document vectors 1428, the candidate document vectors 1420 may include or make reference to text components 806 for an electronic documents 202. Alternatively, the text components 806 may be encoded into a different format other than a vector, such as text strings, for example.

More particularly, to search for content within an electronic documents 202 using contextualized embeddings, the document graph engine 150 uses the search model 1406 to encode the electronic documents 202 during the offline phase. The search model 1406 implements an encoder to generate a sequence of contextualized embeddings, one for each token in the electronic documents 202. In some embodiments, for example, the search model 1406 may generate sentence-level contextualized embeddings. Similarly, the document graph engine 150 may use the search model 1406 to encode a query 218 to generate a contextualized embedding for the query 218 in a manner similar to generating the document vectors of the electronic documents 202. The search model 1406 can then aggregate the embeddings of the document tokens using an attention mechanism to weight the importance of each token based on its relevance to the query.

Alternatively, or in addition, the search model 1406 can use a pre-built search engine or information retrieval system that leverages contextualized embeddings to perform content-based search within a document. These systems typically use more advanced techniques for encoding, aggregating, and ranking embeddings to optimize search performance and accuracy.

One example of a pre-built search engine that uses contextualized embeddings for content-based search is Elasticsearch. Elasticsearch is an open-source search engine that provides a distributed, scalable, and efficient search and analytics platform. It uses the concept of inverted indices to enable fast full-text search and supports a wide range of search queries and aggregations. Elasticsearch also provides a plugin called Elasticsearch Vector Scoring, which enables the use of dense vector embeddings for similarity search. This plugin can be used to index and search documents based on their dense vector embeddings, which can be generated using BERT or other contextualized embedding models. To use Elasticsearch for content-based search with dense vectors, the search model 1406 indexes the documents and their embeddings using the Elasticsearch Vector Scoring plugin. The document graph engine 150 can then search for similar documents by specifying a query embedding and using the cosine similarity as the similarity metric. Elasticsearch will return the top matching documents based on their similarity scores. Elasticsearch also provides various options for customizing the indexing, searching, and scoring of the embeddings, as well as integrating with other natural language processing tools and frameworks.

Another example of a pre-built engine that uses contextualized embeddings for content-based search is Azure Cognitive Search made by Microsoft® Corporation. Azure Cognitive Search utilizes semantic search, which is a collection of query-related capabilities that bring semantic relevance and language understanding to search results. Semantic search is a collection of features that improve the quality of search results. When enabled by the document graph engine 150, such as a cloud search service, semantic search extends the query execution pipeline in two ways. First, it adds secondary ranking over an initial result set, promoting the most semantically relevant results to the top of the list. For instance, the document graph engine 150 may use the lexical search generator 1434 to perform a lexical full-text search to produce and rank a first set of response 220. The document graph engine 150 may then use the semantic search generator 1404 to perform a semantic search that does a semantic re-ranking, which uses the context or semantic meaning of a query 218 to compute a new relevance score over the first set of response 220. Second, it extracts and returns captions and answers in the response, which the document graph engine 150 can render on a search page to improve user search experience. The semantic search generator 1404 extracts sentences and phrases from an electronic documents 202 that best summarize the content, with highlights over key passages for easy scanning. Captions that summarize a result are useful when individual content fields are too dense for the results page. Highlighted text can be used to elevate the most relevant terms and phrases so that users can quickly determine why a match was considered relevant. The semantic search generator 1404 may also provide semantic answers, which is an optional and additional substructure returned from a semantic query. It provides a direct answer to a query that looks like a question.

In some embodiments, the semantic search generator 1404 may implement Azure Cognitive Search to perform semantic searching and perform semantic ranking. Semantic ranking looks for context and relatedness among terms, elevating matches that make more sense given the query 218. Language understanding finds summarizations or captions and answers within document content and includes them in the response, which can then be rendered on a search results page for a more productive search experience. Pre-trained models are used for summarization and ranking. To maintain the fast performance that users expect from search, semantic summarization and ranking are applied to a set number of results, such as the top 50 results, as scored by the default scoring algorithm. Using those results as the document corpus, semantic ranking re-scores those results based on the semantic strength of the match.

The semantic search generator 1404 may use a particular order of operations. Components of the semantic search generator 1404 extend the existing query execution pipeline in both directions. If the search model 1406 enables spelling correction, the speller corrects typos at query onset, before terms reach the search engine. Query execution proceeds as usual, with term parsing, analysis, and scans over the inverted indexes. The search model 1406 retrieves documents using token matching and scores the results using a default scoring algorithm. Scores are calculated based on the degree of linguistic similarity between query terms and matching terms in the index. If defined, scoring profiles are also applied at this stage. Results are then passed to the semantic search subsystem.

In the preparation step, the document corpus returned from the initial result set is analyzed at the sentence and paragraph level to find passages that summarize each document. In contrast with keyword search, this step uses machine reading and comprehension to evaluate the content. Through this stage of content processing, a semantic query returns captions and answers.

To formulate them, semantic search uses language representation to extract and highlight key passages that best summarize a result. If the search query is a question—and answers are requested—the response will also include a text passage that best answers the question, as expressed by the search query. For both captions and answers, existing text is used in the formulation. The semantic models typically do not compose new sentences or phrases from the available content, nor does it apply logic to arrive at new conclusions. In one embodiment, the system does not return content that does not already exist. Results are then re-scored based on the conceptual similarity of query terms. To use semantic capabilities in queries, the search model 1406 may optionally need to make small modifications to the query 218, such as adding an information field with a parameter indicating a type of search, such as "lexical" or "semantic". However, no extra configuration or reindexing is typically required.

Figure 15:
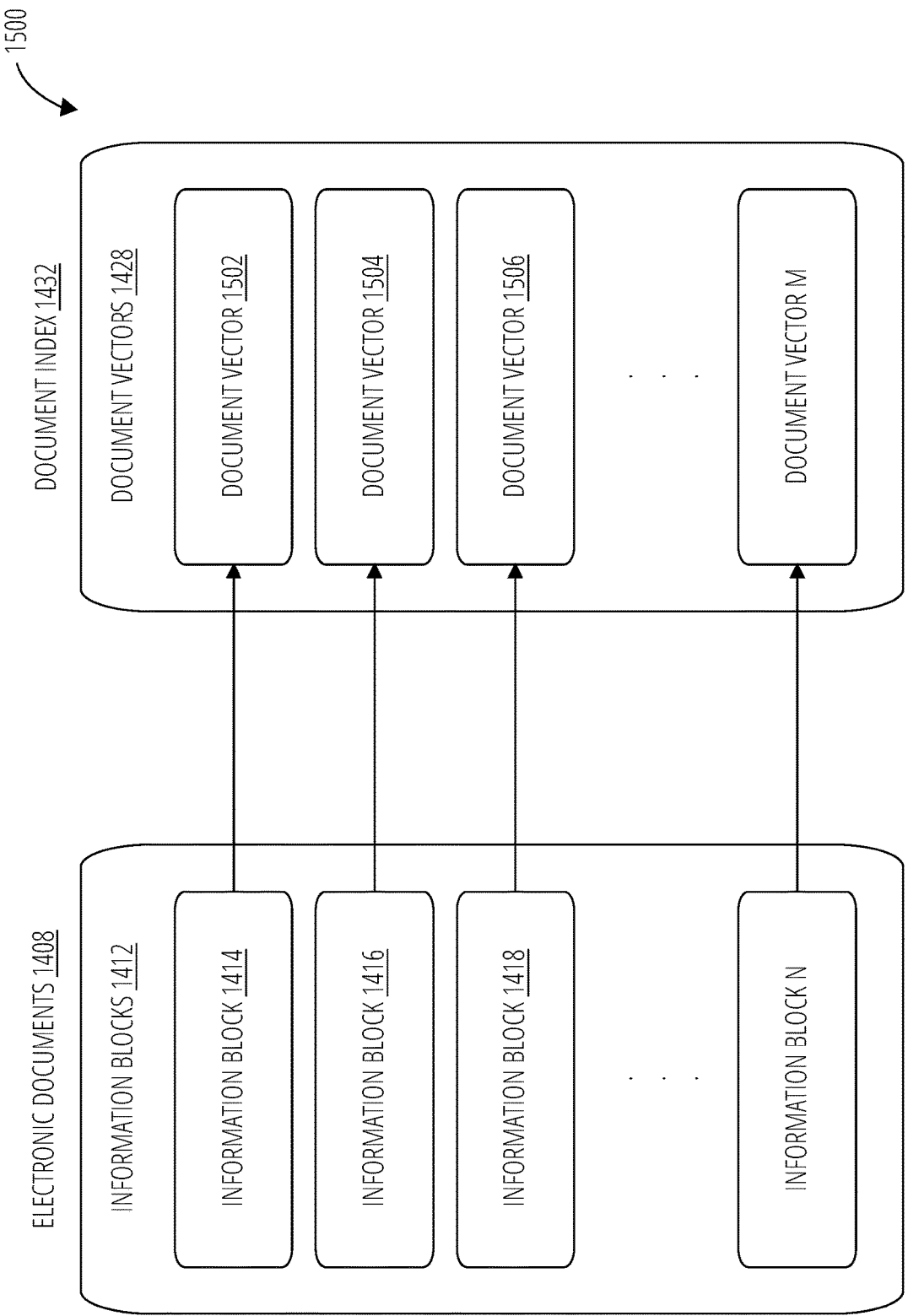
FIG. 15 illustrates an operating environment, according to some embodiments of the current subject matter.

FIG. 15 illustrates an operating environment 1500. The operating environment 1500 illustrates an example of encoding an electronic documents 202 into a set of document vectors 1428.

As previously discussed, the document graph engine 150 may encode a set of electronic documents 202 to create a set of contextualized embeddings (e.g., sentence embeddings) for information or document content contained within each electronic documents 202. As depicted in FIG. 15, an electronic documents 202 may comprise a set of N information blocks 1412, where N is any positive integer. FIG. 14 depicts an example set of N information blocks 1412 that includes an information block 1414, an information block 1416 and an information block 1418 (i.e., N=3). Each of the information blocks 1412 may comprise a defined amount of textual information of any feature size suitable for a given token, such as an n-gram, a word, a sentence, a phrase, a paragraph, a section, and so forth. It may be appreciated that N=3 is by way of example and not limitation.

The document graph engine 150 may use the search model 1406 to encode the information blocks 1412 into corresponding contextualized embeddings depicted as a set of M document vectors 1428, where M represents any positive integer. As depicted in FIG. 15, the document graph engine 150 may use the search model 1406 to encode the information block 1414 into a document vector 1502, the information block 1416 into a document vector 1504, the information block 1418 into the document vector 1506, and the information block N into the document vector M.

One or more of the information blocks 1412 and/or the document vectors 1428 may optionally include block labels assigned using a machine learning model, such as a classifier. A block label may represent a type or content type for information or data contained within each of the information blocks 1412, such as a semantic meaning, a standard clause, a provision, customer data, buyer information, seller information, product information, service information, licensing information, financial information, cost information, revenue information, profit information, sales information, purchase information, accounting information, milestone information, representations and warranties information, term limits, choice of controlling law, legal clauses, or any other information that is contained within an electronic document and useful for a given entity. Embodiments are not limited in this context.

Figure 16:
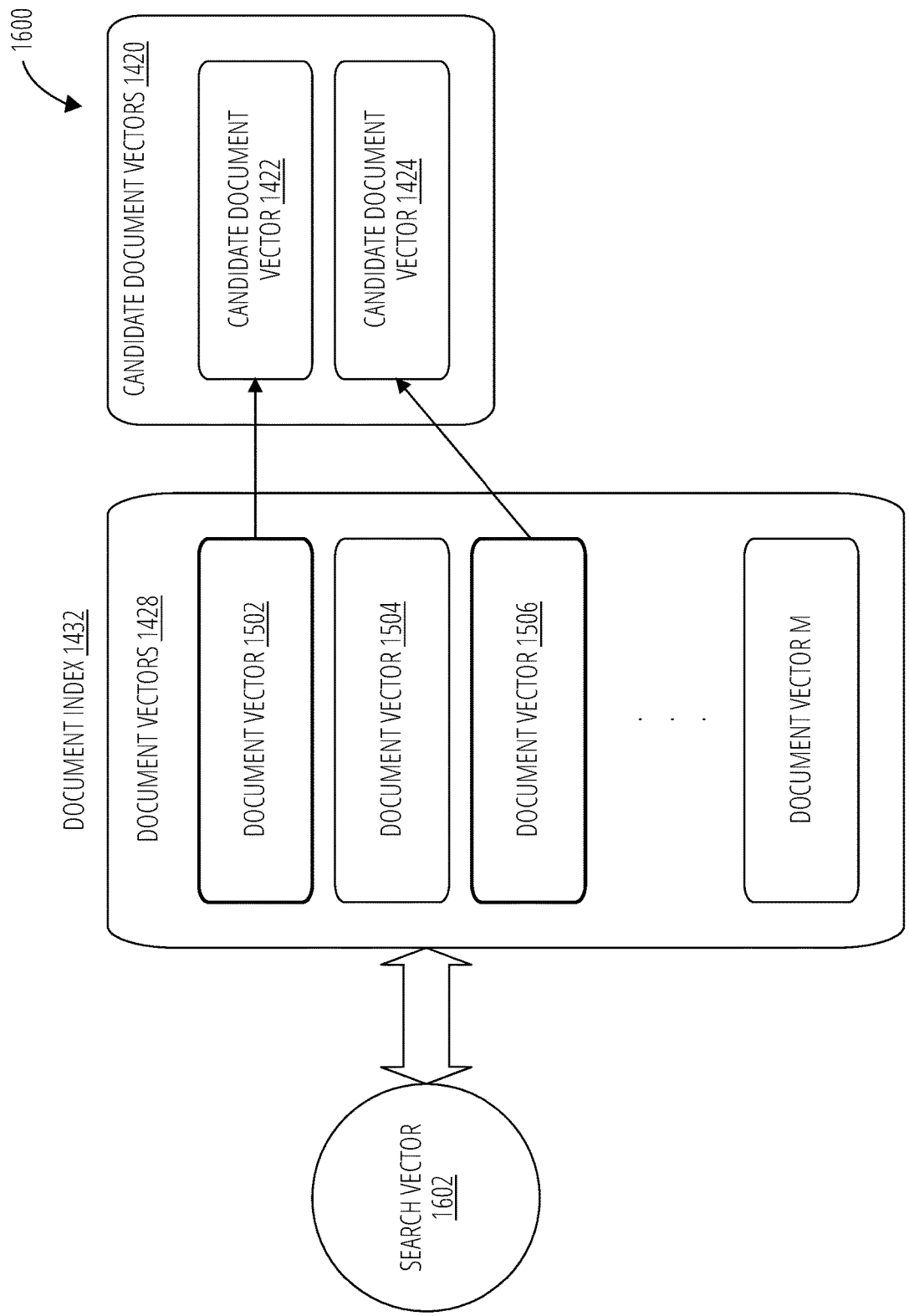
FIG. 16 illustrates an operating environment, according to some embodiments of the current subject matter.

FIG. 16 illustrates an operating environment 1600. The operating environment 1600 illustrates an example of the document graph engine 150 performing a semantic search of the document vectors 1428 to find a set of candidate document vectors 1420 relevant to the query 218.

For search retrieval, the document graph engine 150 may receive a query 218 to search for information within electronic documents by a cloud search service, such as an electronic document management system of system 100 or system 200. The query 218 may include any free form text in a natural language representation of a human language. The document graph engine 150 may use the search model 1406 to generate a contextualized embedding for the query 218 to form a search vector 1602.

As shown in FIG. 16, the document graph engine 150 may search a document index 1432 of contextualized embeddings for the electronic documents 202 with the search vector 1602, which is itself a contextualized embedding of the same type as those stored in the document index 1432. The search process may produce a set of responses 220. The responses 220 may include a set of candidate document vectors 1420 from the set of document vectors 1428. The responses 220 may include candidate document vectors 1420 from the set of document vectors 1428 that are semantically similar to the search vector 1602 of the query 218. FIG. 16 depicts an example set of two candidate document vectors 1420 (P=2) that includes a candidate document vector 1422 and a candidate document vector 1424 corresponding to the document vector 1502 and the document vector 1506, respectively, of the document index 1432.

Figure 17:
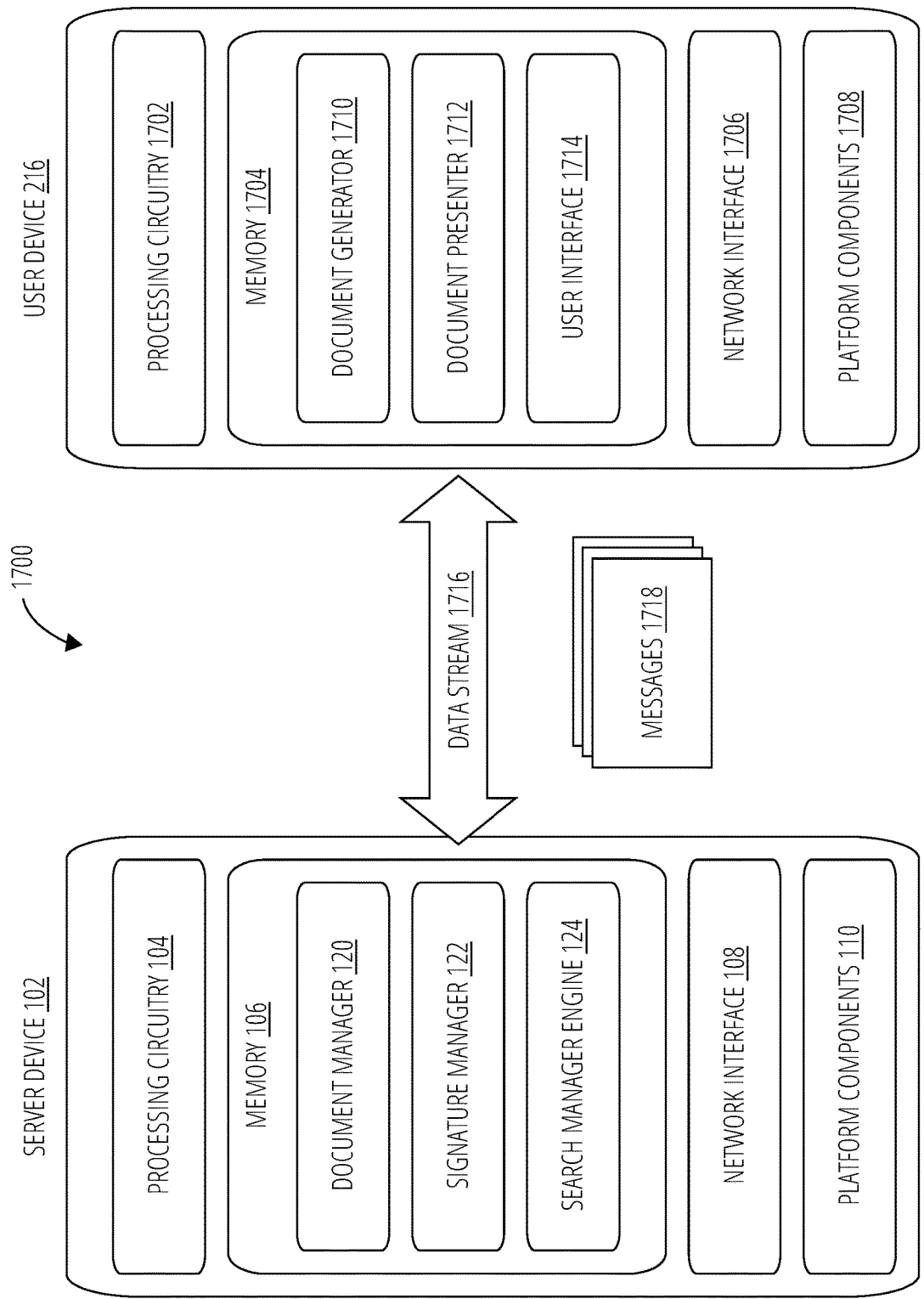
FIG. 17 illustrates a distributed system, according to some embodiments of the current subject matter.

FIG. 17 illustrates a distributed system 1700. The distributed system 1700 may implement the server device 102 communicating a data stream 1716 to a user device 216. The client user device 216 may comprise processing circuitry 1702 communicatively coupled to a memory 1704. The memory 1704 may store instructions that when executed by the processing circuitry 1702 may cause the processing circuitry 1702 to perform operations for a document generator 1710, a document presenter 1712 and a user interface 1714. A user may interact with the user device 216 via the user interface 1714 to generate an electronic document 142 using the document manager 120 of the server device 102. Control and media information to coordinate generation of the electronic document 142 may be transported by one or more messages 1718 over the data stream 1716 via the network interface 1706 over a wired or wireless communication medium. The user may interact with the user device 216 via the user interface 1714 to render or present an electronic document 142 on an input/output (I/O) device of the platform components 1708, such as touch screen of the user device 216, to perform various operations on an electronic document 142, such as generate the electronic document 142, present the electronic document 142, attach an electronic signature to the electronic document 142, and so forth.

Figure 18:
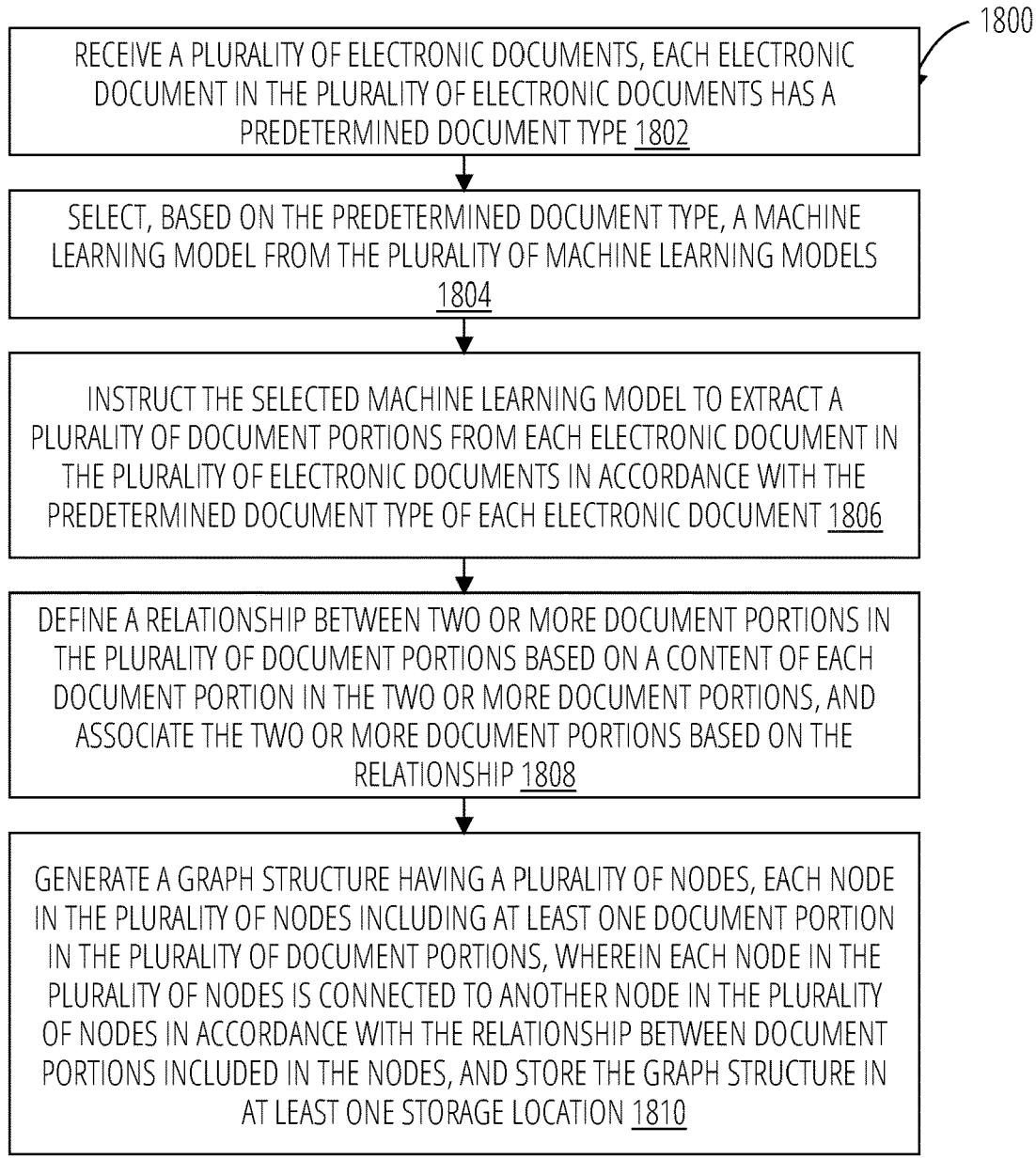
FIG. 18 illustrates an example process for generating a document graph, according to some embodiments of the current subject matter.

FIG. 18 illustrates an example process 1800 for generating a document graph (e.g., document graph 1200 and/or document graph 1300), according to some embodiments of the current subject matter. The process 1800 may be executed by the system 100 shown in FIG. 1, and in particular, the document structure and clause extraction engine 150, as shown in FIG. 2.

At 1802, the document graph engine 150 may receive a plurality of electronic documents (e.g., electronic documents 202). Each electronic document may have a predetermined document type (e.g., a legal document, a non-legal document, an agreement, etc.).

At 1804, the engine 150 may select, based on the predetermined document type, a machine learning model from a plurality of machine learning models (e.g., ML model(s) 210) and instruct the selected machine learning model to extract a plurality of document portions (e.g., document portions 1002) from each electronic document in accordance with the predetermined document type of each electronic document, at 1806.

At 1808, the engine 150 may define a relationship (e.g., relationships 1104) between two or more document portions based on a content of each document portion in the document portions, and associate the document portions based on the relationship, as for example, is shown in FIG. 11.

At 1810, the document graph engine 150 may generate a graph structure (e.g., document graph 1200 and/or document graph 1300) having a plurality of nodes (e.g., nodes 1202). Each node may include at least one document portion and may be connected to another node in accordance with the relationship between document portions included in the nodes. The graph structure may be stored the graph structure in at least one storage location, e.g., graph database 214.

Figure 19:
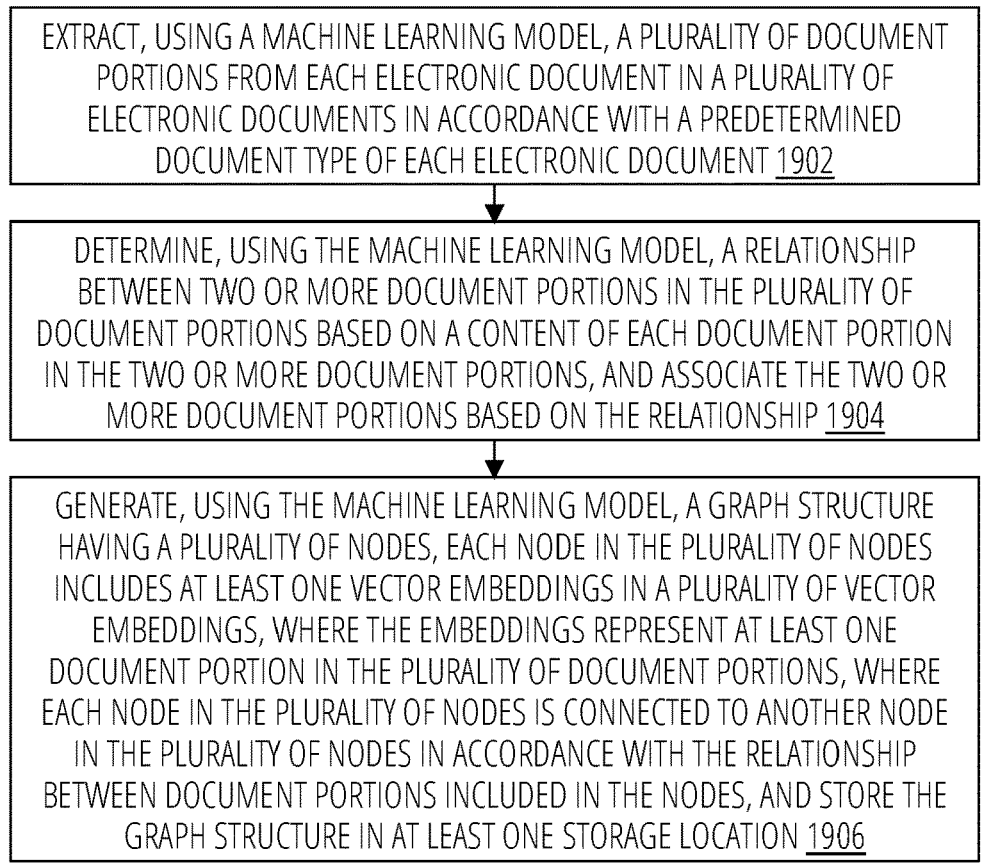
FIG. 19 illustrates another example process for generating a document graph, according to some embodiments of the current subject matter.

FIG. 19 illustrates another example process 1900 for generating a document graph (e.g., document graph 1200 and/or document graph 1300), according to some embodiments of the current subject matter. The process 1900 may also be executed by the system 100 shown in FIG. 1, and in particular, the document structure and clause extraction engine 150, as shown in FIG. 2.

At 1902, the document graph engine 150 may extract a plurality of document portions (e.g., portions 1102) from each electronic document in a plurality of electronic documents (e.g., electronic documents 202) in accordance with a predetermined document type of each electronic document.

At 1904, the document graph engine 150 may determine, using a machine learning model (e.g., ML model(s) 210), a relationship (e.g., relationship(s) 1104) between two or more document portions based on a content of each document portion, and associate the document portions based on the relationship.

At 1906, the document graph engine 150 may generate, using the machine learning model, a graph structure (e.g., document graph 1200 and/or document graph 1300) having a plurality of nodes (e.g., nodes 1202). Each node may include at least one vector embedding in a plurality of vector embeddings. Embeddings may represent at least one document portion in the plurality of document portions. Moreover, each node may be connected to another node in accordance with the relationship between document portions included in the nodes. The document graph engine 150 may also store the graph structure in at least one storage location, e.g., graph database 214.

Figure 20:
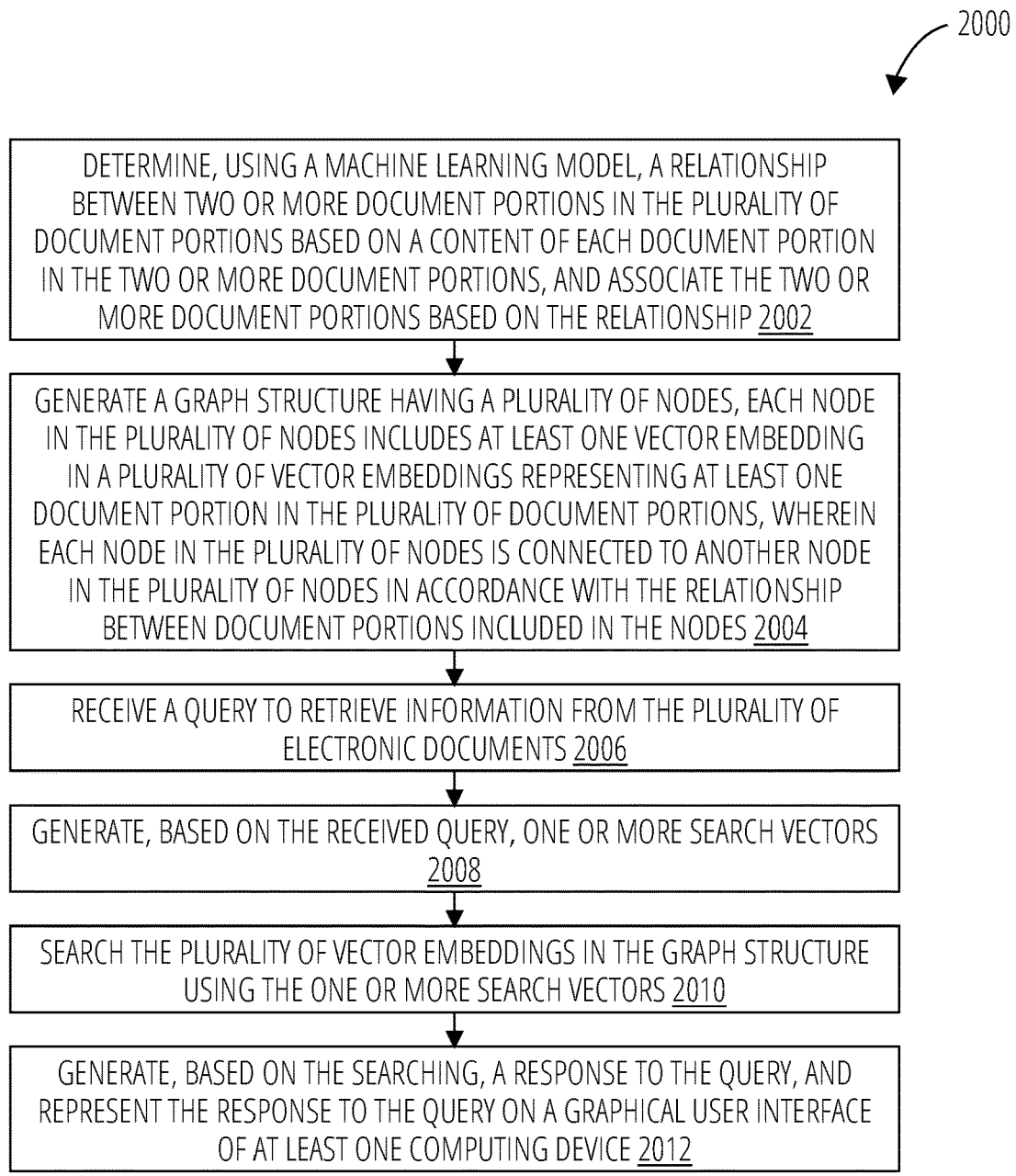
FIG. 20 illustrates yet another example process for generating a document graph, according to some embodiments of the current subject matter.

FIG. 20 illustrates yet another example process 2000 for generating a document graph (e.g., document graph 1200 and/or document graph 1300), according to some embodiments of the current subject matter. The process 2000 may also be executed by the system 100 shown in FIG. 1, and in particular, the document structure and clause extraction engine 150, as shown in FIG. 2.

At 2002, the document graph engine 150 may determine a relationship between two or more document portions in the plurality of document portions (e.g., document portions 1002) based on a content of each document portion and associate the document portions based on the relationship. The relationship may be determined using a machine learning model (e.g., ML model(s) 210).

At 2004, the document graph engine 150 may generate a graph structure (e.g., document graph 1200 and/or document graph 1300) having a plurality of nodes. Each node may include at least one vector embedding in a plurality of vector embeddings representing at least one document portion in the plurality of document portions. Moreover, each node may be connected to another node in the plurality of nodes in accordance with the relationship between document portions included in the nodes.

At 2006, the document graph engine 150 may receive a query (e.g., query 218 from the user device 216) to retrieve information from the plurality of electronic documents. At 2008, the engine 150 may generates, based on the received query, one or more search vectors. At 2010, the document graph engine 150 may search the plurality of vector embeddings in the graph structure using the search vectors. At 2012, the engine 150 may generate, based on the searching, a response to the query, and represent the response to the query on a graphical user interface of at least one computing device (e.g., user device 216).

Figure 21:
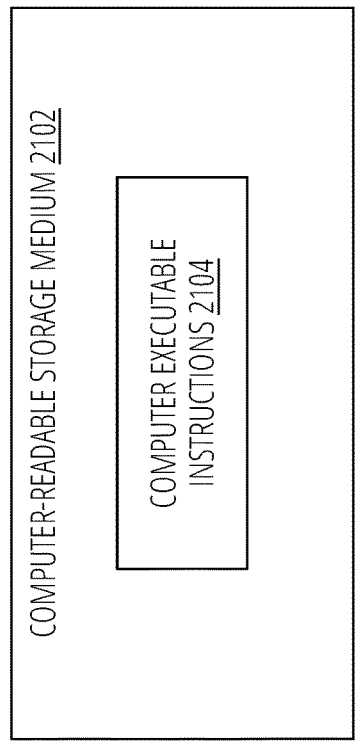
FIG. 21 illustrates a computer-readable storage medium, according to some embodiments of the current subject matter.

FIG. 21 illustrates an apparatus 2100. Apparatus 2100 may comprise any non-transitory computer-readable storage medium 2102 or machine-readable storage medium, such as an optical, magnetic or semiconductor storage medium. In various embodiments, apparatus 2100 may comprise an article of manufacture or a product. In some embodiments, the computer-readable storage medium 2102 may store computer executable instructions with which circuitry can execute. For example, computer executable instructions 2104 can include instructions to implement operations described with respect to any logic flows described herein. Examples of computer-readable storage medium 2102 or machine-readable storage medium may include any tangible media capable of storing electronic data, including volatile memory or non-volatile memory, removable or non-removable memory, erasable or non-erasable memory, writeable or re-writeable memory, and so forth. Examples of computer executable instructions 2104 may include any suitable type of code, such as source code, compiled code, interpreted code, executable code, static code, dynamic code, object-oriented code, visual code, and the like.

FIG. 22 illustrates an embodiment of a computing architecture 2200. Computing architecture 2200 is a computer system with multiple processor cores such as a distributed computing system, supercomputer, high-performance computing system, computing cluster, mainframe computer, mini-computer, client-server system, personal computer (PC), workstation, server, portable computer, laptop computer, tablet computer, handheld device such as a personal digital assistant (PDA), or other device for processing, displaying, or transmitting information. Similar embodiments may comprise, e.g., entertainment devices such as a portable music player or a portable video player, a smart phone or other cellular phone, a telephone, a digital video camera, a digital still camera, an external storage device, or the like. Further embodiments implement larger scale server configurations. In other embodiments, the computing architecture 2200 may have a single processor with one core or more than one processor. Note that the term "processor" refers to a processor with a single core or a processor package with multiple processor cores. In at least one embodiment, the computing architecture 2200 is representative of the components of the system 100. More generally, the computing architecture 2200 is configured to implement all logic, systems, logic flows, methods, apparatuses, and functionality described herein with reference to previous figures.

As used in this application, the terms "system" and "component" and "module" are intended to refer to a computer-related entity, either hardware, a combination of hardware and software, software, or software in execution, examples of which are provided by the exemplary computing architecture 2200. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

As shown in FIG. 22, computing architecture 2200 comprises a system-on-chip (SoC) 2202 for mounting platform components. System-on-chip (SoC) 2202 is a point-to-point (P2P) interconnect platform that includes a first processor 2204 and a second processor 2206 coupled via a point-to-point interconnect 2270 such as an Ultra Path Interconnect (UPI). In other embodiments, the computing architecture 2200 may be of another bus architecture, such as a multi-drop bus. Furthermore, each of processor 2204 and processor 2206 may be processor packages with multiple processor cores including core(s) 2208 and core(s) 2210, respectively. While the computing architecture 2200 is an example of a two-socket (2S) platform, other embodiments may include more than two sockets or one socket. For example, some embodiments may include a four-socket (4S) platform or an eight-socket (8S) platform. Each socket is a mount for a processor and may have a socket identifier. Note that the term platform may refers to a motherboard with certain components mounted such as the processor 2204 and chipset 2232. Some platforms may include additional components and some platforms may only include sockets to mount the processors and/or the chipset. Furthermore, some platforms may not have sockets (e.g., SoC, or the like). Although depicted as a SoC 2202, one or more of the components of the SoC 2202 may also be included in a single die package, a multi-chip module (MCM), a multi-die package, a chiplet, a bridge, and/or an interposer. Therefore, embodiments are not limited to a SoC.

The processor 2204 and processor 2206 can be any of various commercially available processors, including without limitation an Intel® Celeron®, Core®, Core (2) Duo®, Itanium®, Pentium®, Xeon®, and XScale® processors; AMD® Athlon®, Duron® and Opteron® processors; ARM® application, embedded and secure processors; IBM® and Motorola® DragonBall® and PowerPC® processors; IBM and Sony® Cell processors; and similar processors. Dual microprocessors, multi-core processors, and other multi-processor architectures may also be employed as the processor 2204 and/or processor 2206. Additionally, the processor 2204 need not be identical to processor 2206.

Processor 2204 includes an integrated memory controller (IMC) 2220 and point-to-point (P2P) interface 2224 and P2P interface 2228. Similarly, the processor 2206 includes an IMC 2222 as well as P2P interface 2226 and P2P interface 2230. IMC 2220 and IMC 2222 couple the processor 2204 and processor 2206, respectively, to respective memories (e.g., memory 2216 and memory 2218). Memory 2216 and memory 2218 may be portions of the main memory (e.g., a dynamic random-access memory (DRAM)) for the platform such as double data rate type 4 (DDR4) or type 5 (DDR5) synchronous DRAM (SDRAM). In the present embodiment, the memory 2216 and the memory 2218 locally attach to the respective processors (i.e., processor 2204 and processor 2206). In other embodiments, the main memory may couple with the processors via a bus and shared memory hub. Processor 2204 includes registers 2212 and processor 2206 includes registers 2214.

Computing architecture 2200 includes chipset 2232 coupled to processor 2204 and processor 2206. Furthermore, chipset 2232 can be coupled to storage device 2250, for example, via an interface (I/F) 2238. The I/F 2238 may be, for example, a Peripheral Component Interconnect-enhanced (PCIe) interface, a Compute Express Link® (CXL) interface, or a Universal Chiplet Interconnect Express (UCIe) interface. Storage device 2250 can store instructions executable by circuitry of computing architecture 2200 (e.g., processor 2204, processor 2206, GPU 2248, accelerator 2254, vision processing unit 2256, or the like). For example, storage device 2250 can store instructions for server device 102, client devices 112, client devices 116, or the like.

Processor 2204 couples to the chipset 2232 via P2P interface 2228 and P2P 2234 while processor 2206 couples to the chipset 2232 via P2P interface 2230 and P2P 2236. Direct media interface (DMI) 2276 and DMI 2278 may couple the P2P interface 2228 and the P2P 2234 and the P2P interface 2230 and P2P 2236, respectively. DMI 2276 and DMI 2278 may be a high-speed interconnect that facilitates, e.g., eight Giga Transfers per second (GT/s) such as DMI 3.0. In other embodiments, the processor 2204 and processor 2206 may interconnect via a bus.

The chipset 2232 may comprise a controller hub such as a platform controller hub (PCH). The chipset 2232 may include a system clock to perform clocking functions and include interfaces for an I/O bus such as a universal serial bus (USB), peripheral component interconnects (PCIs), CXL interconnects, UCIe interconnects, interface serial peripheral interconnects (SPIs), integrated interconnects (I2Cs), and the like, to facilitate connection of peripheral devices on the platform. In other embodiments, the chipset 2232 may comprise more than one controller hub such as a chipset with a memory controller hub, a graphics controller hub, and an input/output (I/O) controller hub.

In the depicted example, chipset 2232 couples with a trusted platform module (TPM) 2244 and UEFI, BIOS, FLASH circuitry 2246 via I/F 2242. The TPM 2244 is a dedicated microcontroller designed to secure hardware by integrating cryptographic keys into devices. The UEFI, BIOS, FLASH circuitry 2246 may provide pre-boot code.

The I/F 2242 may also be coupled to a network interface circuit (NIC) 2280 for connections off-chip.

Furthermore, chipset 2232 includes the I/F 2238 to couple chipset 2232 with a high-performance graphics engine, such as, graphics processing circuitry or a graphics processing unit (GPU) 2248. In other embodiments, the computing architecture 2200 may include a flexible display interface (FDI) (not shown) between the processor 2204 and/or the processor 2206 and the chipset 2232. The FDI interconnects a graphics processor core in one or more of processor 2204 and/or processor 2206 with the chipset 2232.

The computing architecture 2200 is operable to communicate with wired and wireless devices or entities via the network interface (NIC) 180 using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, 3G, 4G, LTE wireless technologies, among others. Thus, the communication can be a predefined structure as with a conventional network or simply an ad hoc communication between at least two devices. Wi-Fi networks use radio technologies called IEEE 802.11x (a, b, g, n, ac, ax, etc.) to provide secure, reliable, fast wireless connectivity. A Wi-Fi network can be used to connect computers to each other, to the Internet, and to wired networks (which use IEEE 802.3-related media and functions).

Additionally, accelerator 2254 and/or vision processing unit 2256 can be coupled to chipset 2232 via I/F 2238. The accelerator 2254 is representative of any type of accelerator device (e.g., a data streaming accelerator, cryptographic accelerator, cryptographic co-processor, an offload engine, etc.). One example of an accelerator 2254 is the Intel® Data Streaming Accelerator (DSA). The accelerator 2254 may be a device including circuitry to accelerate copy operations, data encryption, hash value computation, data comparison operations (including comparison of data in memory 2216 and/or memory 2218), and/or data compression. For example, the accelerator 2254 may be a USB device, PCI device, PCIe device, CXL device, UCIe device, and/or an SPI device. The accelerator 2254 can also include circuitry arranged to execute machine learning (ML) related operations (e.g., training, inference, etc.) for ML models. Generally, the accelerator 2254 may be specially designed to perform computationally intensive operations, such as hash value computations, comparison operations, cryptographic operations, and/or compression operations, in a manner that is more efficient than when performed by the processor 2204 or processor 2206. Because the load of the computing architecture 2200 may include hash value computations, comparison operations, cryptographic operations, and/or compression operations, the accelerator 2254 can greatly increase performance of the computing architecture 2200 for these operations.

The accelerator 2254 may include one or more dedicated work queues and one or more shared work queues (each not pictured). Generally, a shared work queue is configured to store descriptors submitted by multiple software entities. The software may be any type of executable code, such as a process, a thread, an application, a virtual machine, a container, a microservice, etc., that share the accelerator 2254. For example, the accelerator 2254 may be shared according to the Single Root I/O virtualization (SR-IOV) architecture and/or the Scalable I/O virtualization (S-IOV) architecture. Embodiments are not limited in these contexts. In some embodiments, software uses an instruction to atomically submit the descriptor to the accelerator 2254 via a non-posted write (e.g., a deferred memory write (DMWr)). One example of an instruction that atomically submits a work descriptor to the shared work queue of the accelerator 2254 is the ENQCMD command or instruction (which may be referred to as "ENQCMD" herein) supported by the Intel® Instruction Set Architecture (ISA). However, any instruction having a descriptor that includes indications of the operation to be performed, a source virtual address for the descriptor, a destination virtual address for a device-specific register of the shared work queue, virtual addresses of parameters, a virtual address of a completion record, and an identifier of an address space of the submitting process is representative of an instruction that atomically submits a work descriptor to the shared work queue of the accelerator 2254. The dedicated work queue may accept job submissions via commands such as the movdir64*b* instruction.

Various I/O devices 2260 and display 2252 couple to the bus 2272, along with a bus bridge 2258 which couples the bus 2272 to a second bus 2274 and an I/F 2240 that connects the bus 2272 with the chipset 2232. In one embodiment, the second bus 2274 may be a low pin count (LPC) bus. Various devices may couple to the second bus 2274 including, for example, a keyboard 2262, a mouse 2264 and communication devices 2266.

Furthermore, an audio I/O 2268 may couple to second bus 2274. Many of the I/O devices 2260 and communication devices 2266 may reside on the system-on-chip (SoC) 2202 while the keyboard 2262 and the mouse 2264 may be add-on peripherals. In other embodiments, some or all the I/O devices 2260 and communication devices 2266 are add-on peripherals and do not reside on the system-on-chip (SoC) 2202.

FIG. 23 illustrates a block diagram of an exemplary communications architecture 2300 suitable for implementing various embodiments as previously described. The communications architecture 2300 includes various common communications elements, such as a transmitter, receiver, transceiver, radio, network interface, baseband processor, antenna, amplifiers, filters, power supplies, and so forth. The embodiments, however, are not limited to implementation by the communications architecture 2300.

As shown in FIG. 23, the communications architecture 2300 includes one or more clients 2302 and servers 2304. The clients 2302 may implement a client version of the server device 102, for example. The servers 2304 may implement a server version of the server device 102, for example. The clients 2302 and the servers 2304 are operatively connected to one or more respective client data stores 2308 and server data stores 2310 that can be employed to store information local to the respective clients 2302 and servers 2304, such as cookies and/or associated contextual information.

The clients 2302 and the servers 2304 may communicate information between each other using a communication framework 2306. The communications communication framework 2306 may implement any well-known communications techniques and protocols. The communications communication framework 2306 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communication framework 2306 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.11 network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 2302 and the servers 2304. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

The components and features of the devices described above may be implemented using any combination of discrete circuitry, application specific integrated circuits (ASICs), logic gates and/or single chip architectures. Further, the features of the devices may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It will be appreciated that the exemplary devices shown in the block diagrams described above may represent one functionally descriptive example of many potential implementations. Accordingly, division, omission or inclusion of block functions depicted in the accompanying figures does not infer that the hardware components, circuits, software and/or elements for implementing these functions would necessarily be divided, omitted, or included in embodiments.

At least one computer-readable storage medium may include instructions that, when executed, cause a system to perform any of the computer-implemented methods described herein.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Moreover, unless otherwise noted the features described above are recognized to be usable together in any combination. Thus, any features discussed separately may be employed in combination with each other unless it is noted that the features are incompatible with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein, which form part of one or more embodiments. Rather, the operations are machine operations. Useful machines for performing operations of various embodiments include general purpose digital computers or similar devices.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Various embodiments also relate to apparatus or systems for performing these operations. This apparatus may be specially constructed for the required purpose, or it may comprise a general-purpose computer as selectively activated or reconfigured by a computer program stored in the computer. The procedures presented herein are not inherently related to a particular computer or other apparatus. Various general-purpose machines may be used with programs written in accordance with the teachings herein, or it may prove convenient to construct more specialized apparatus to perform the required method steps. The required structure for a variety of these machines will appear from the description given.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The various elements of the devices as previously described with reference to FIGS. 1—may include various hardware elements, software elements, or a combination of both. Examples of hardware elements may include devices, logic devices, components, processors, microprocessors, circuits, processors, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores," may be stored on a tangible, machine readable medium and supplied to various customers or manufacturing facilities to load into the fabrication machines that make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

It will be appreciated that the exemplary devices shown in the block diagrams described above may represent one functionally descriptive example of many potential implementations. Accordingly, division, omission or inclusion of block functions depicted in the accompanying figures does not infer that the hardware components, circuits, software and/or elements for implementing these functions would necessarily be divided, omitted, or included in embodiments.

At least one computer-readable storage medium may include instructions that, when executed, cause a system to perform any of the computer-implemented methods described herein.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Moreover, unless otherwise noted the features described above are recognized to be usable together in any combination. Thus, any features discussed separately may be employed in combination with each other unless it is noted that the features are incompatible with each other.

The following examples pertain to further embodiments, from which numerous permutations and configurations will be apparent.

In one aspect, a computer-implemented method may include receiving, using at least one processor, a plurality of electronic documents, each electronic document in the plurality of electronic documents has a predetermined document type; selecting, using the at least one processor, based on the predetermined document type, a machine learning model from the plurality of machine learning models; instructing, using the at least one processor, the selected machine learning model to extract a plurality of document portions from each electronic document in the plurality of electronic documents in accordance with the predetermined document type of each electronic document; defining, using the at least one processor, a relationship between two or more document portions in the plurality of document portions based on a content of each document portion in the two or more document portions, and associating the two or more document portions based on the relationship; and generating, using the at least one processor, a graph structure having a plurality of nodes, each node in the plurality of nodes including at least one document portion in the plurality of document portions, wherein each node in the plurality of nodes is connected to another node in the plurality of nodes in accordance with the relationship between document portions included in the nodes, and storing the graph structure in at least one storage location.

The method may also include wherein the defining includes semantically searching, using at least one machine learning model in the plurality of machine learning models, the plurality of document portions extracted from the plurality of electronic documents to determine the content of each document portion.

The method may also include wherein the instructing includes generating, using the content of each document portion, a label for each document portion in the plurality of document portions; and assigning each generated label to a node in the graph structure including corresponding document portion.

The method may also include wherein the graph structure is generated for the plurality of electronic documents irrespective of a format of each electronic document in the plurality of electronic documents.

The method may also include wherein the at least one document portion included in each node in the plurality of nodes is represented by at least one vector embedding in a plurality of vector embeddings, the at least one vector embedding is generated based on the at least one document portion using at least one machine learning model in the plurality of machine learning models.

The method may also include receiving a query to retrieve information from the plurality of electronic documents; generating, based on the received query, one or more search vectors; searching the plurality of vector embeddings in the graph structure using the one or more search vectors; and generating, based on the searching, a response to the query.

The method may also include wherein the query is a natural language representation query.

The method may also include wherein the generating includes identifying one or more vector embeddings in the plurality of vector embeddings to be semantically similar to the one or more search vectors; and retrieving one or more document portions corresponding to the identified one or more vector embeddings and including the retrieved one or more document portions in the response.

The method may also include wherein the generating includes identifying one or more another vector embeddings connected to the one or more vector embeddings using the defined relationship; and retrieving one or more another document portions corresponding to the identified one or more another vector embeddings and including the retrieved one or more another document portions and the retrieved one or more another document portions in the response.

The method may also include wherein the search vector includes at least one of: a word level vector, a sentence level vector, a paragraph level vector, and any combination thereof.

The method may also include wherein the predetermined document type includes at least one of the following: a legal document type, a non-legal document type, and any combinations thereof.

The method may also include wherein the plurality of document portions includes at least one of the following: a text, an audio, a video, an image, a table, and any combination thereof.

The method may also include wherein the plurality of machine learning models includes at least one of the following: a large language model, at least one generative artificial intelligence model, and any combination thereof.

In one aspect, a system may include at least one processor; and at least one non-transitory storage media storing instructions, that when executed by the at least one processor, cause the at least one processor to: extract, using a machine learning model, a plurality of document portions from each electronic document in a plurality of electronic documents in accordance with a predetermined document type of each electronic document; determine, using the machine learning model, a relationship between two or more document portions in the plurality of document portions based on a content of each document portion in the two or more document portions, and associate the two or more document portions based on the relationship; and generate, using the machine learning model, a graph structure having a plurality of nodes, each node in the plurality of nodes includes at least one vector in a plurality of vector embeddings embedding representing at least one document portion in the plurality of document portions, wherein each node in the plurality of nodes is connected to another node in the plurality of nodes in accordance with the relationship between document portions included in the nodes, and store the graph structure in at least one storage location.

The system may also include wherein the machine learning model is selected from a plurality of machine learning models based on the predetermined document type, wherein the plurality of machine learning models includes at least one of the following: a large language model, at least one generative artificial intelligence model, and any combination thereof.

The system may also include wherein the at least one processor is configured to semantically search, using the machine learning model, the plurality of document portions extracted from the plurality of electronic documents to determine the content of each document portion.

The system may also include wherein the at least one processor is configured to generate, using the content of each document portion, a label for each document portion in the plurality of document portions; and assign each generated label to a node in the graph structure including corresponding document portion.

The system may also include wherein the graph structure is generated for the plurality of electronic documents irrespective of a format of each electronic document in the plurality of electronic documents.

The system may also include wherein the at least one processor is configured to receive a query to retrieve information from the plurality of electronic documents; generate, based on the received query, one or more search vectors, wherein generation of the one or more search vectors includes identifying one or more vector embeddings in the plurality of vector embeddings to be semantically similar to the one or more search vectors; and identifying one or more another vector embeddings connected to the one or more vector embeddings using the defined relationship; retrieving one or more another document portions corresponding to the identified one or more another vector embeddings and including the retrieved one or more document portions and the retrieved one or more another document portions in the response; search the plurality of vector embeddings in the graph structure using the one or more search vectors; and generate, based on the searching, a response to the query.

In one aspect, a non-transitory computer-readable storage medium, the computer-readable storage medium including instructions that when executed by at least one processor, cause the at least one processor to: determine, using a machine learning model, a relationship between two or more document portions in the plurality of document portions based on a content of each document portion in the two or more document portions, and associate the two or more document portions based on the relationship; generate a graph structure having a plurality of nodes, each node in the plurality of nodes includes at least one vector embedding in a plurality of vector embeddings representing at least one document portion in the plurality of document portions, wherein each node in the plurality of nodes is connected to another node in the plurality of nodes in accordance with the relationship between document portions included in the nodes; receive a query to retrieve information from the plurality of electronic documents; generate, based on the received query, one or more search vectors; search the plurality of vector embeddings in the graph structure using the one or more search vectors; and generate, based on the searching, a response to the query, and represent the response to the query on a graphical user interface of at least one computing device.

Any of the computing apparatus examples given above may also be implemented as means plus function examples. Other technical features may be readily apparent to one skilled in the art from the following figures, descriptions, and claims.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future filed applications claiming priority to this application may claim the disclosed subject matter in a different manner and may generally include any set of one or more limitations as variously disclosed or otherwise demonstrated herein.

What is claimed is:

1. A computer-implemented method, comprising:
   receiving, using at least one processor, a plurality of electronic documents, each electronic document in the plurality of electronic documents has a predetermined document type;
   selecting, using the at least one processor, based on the predetermined document type, a machine learning model from a plurality of machine learning models;
   instructing, using the at least one processor, the selected machine learning model to extract a plurality of document portions from each electronic document in the plurality of electronic documents in accordance with the predetermined document type of each electronic document;
   defining, using the at least one processor, a relationship between two or more document portions in the plurality of document portions based on a content of each document portion in the two or more document portions, and associating the two or more document portions based on the relationship; and
   generating, using the at least one processor, a graph structure having a plurality of nodes, each node in the plurality of nodes including at least one document portion in the plurality of document portions, wherein each node in the plurality of nodes is connected to another node in the plurality of nodes in accordance with the relationship between document portions included in the nodes, and storing the graph structure in at least one storage location.

2. The method of claim 1, wherein the defining includes semantically searching, using at least one machine learning model in the plurality of machine learning models, the plurality of document portions extracted from the plurality of electronic documents to determine the content of each document portion.

3. The method of claim 1, wherein the instructing includes
   generating, using the content of each document portion, a label for each document portion in the plurality of document portions; and
   assigning each generated label to a node in the graph structure including corresponding document portion.

4. The method of claim 1, wherein the graph structure is generated for the plurality of electronic documents irrespective of a format of each electronic document in the plurality of electronic documents.

5. The method of claim 1, wherein the at least one document portion included in each node in the plurality of nodes is represented by at least one vector embedding in a plurality of vector embeddings, the at least one vector embedding is generated based on the at least one document portion using at least one machine learning model in the plurality of machine learning models.

6. The method of claim 5, further comprising
   receiving a query to retrieve information from the plurality of electronic documents;
   generating, based on the received query, one or more search vectors;
   searching the plurality of vector embeddings in the graph structure using the one or more search vectors; and
   generating, based on the searching, a response to the query.

7. The method of claim 6, wherein the query is a natural language representation query.

8. The method of claim 6, wherein the generating includes
   identifying one or more vector embeddings in the plurality of vector embeddings to be semantically similar to the one or more search vectors; and
   retrieving one or more document portions corresponding to the identified one or more vector embeddings and including the retrieved one or more document portions in the response.

9. The method of claim 8, wherein the generating includes
   identifying one or more another vector embeddings connected to the one or more vector embeddings using the defined relationship; and
   retrieving one or more another document portions corresponding to the identified one or more another vector embeddings and including the retrieved one or more document portions and the retrieved one or more another document portions in the response.

10. The method of claim 6, wherein the search vector includes at least one of: a word level vector, a sentence level vector, a paragraph level vector, and any combination thereof.

11. The method of claim 1, wherein the predetermined document type includes at least one of the following: a legal document type, a non-legal document type, and any combinations thereof.

12. The method of claim 1, wherein the plurality of document portions includes at least one of the following: a text, an audio, a video, an image, a table, and any combination thereof.

13. The method of claim 1, wherein the plurality of machine learning models includes at least one of the following: a large language model, at least one generative artificial intelligence model, and any combination thereof.

14. A system, comprising:
    at least one processor; and
    at least one non-transitory storage media storing instructions, that when executed by the at least one processor, cause the at least one processor to:

extract, using a machine learning model, a plurality of document portions from each electronic document in a plurality of electronic documents in accordance with a predetermined document type of each electronic document;

determine, using the machine learning model, a relationship between two or more document portions in the plurality of document portions based on a content of each document portion in the two or more document portions, and associate the two or more document portions based on the relationship; and generate, using the machine learning model, a graph structure having a plurality of nodes, each node in the plurality of nodes includes at least one vector in a plurality of vector embeddings representing at least one document portion in the plurality of document portions, wherein each node in the plurality of nodes is connected to another node in the plurality of nodes in accordance with the relationship between document portions included in the nodes, and store the graph structure in at least one storage location.

15. The system of claim 14, wherein the machine learning model is selected from a plurality of machine learning models based on the predetermined document type, wherein the plurality of machine learning models includes at least one of the following: a large language model, at least one generative artificial intelligence model, and any combination thereof.

16. The system of claim 14, wherein the at least one processor is configured to semantically search, using the machine learning model, the plurality of document portions extracted from the plurality of electronic documents to determine the content of each document portion.

17. The system of claim 14, wherein the at least one processor is configured to generate, using the content of each document portion, a label for each document portion in the plurality of document portions; and assign each generated label to a node in the graph structure including corresponding document portion.

18. The system of claim 14, wherein the graph structure is generated for the plurality of electronic documents irrespective of a format of each electronic document in the plurality of electronic documents.

19. The system of claim 14, wherein the at least one processor is configured to receive a query to retrieve information from the plurality of electronic documents;

generate, based on the received query, one or more search vectors, wherein generation of the one or more search vectors includes identifying one or more vector embeddings in the plurality of vector embeddings to be semantically similar to the one or more search vectors; and identifying one or more another vector embeddings connected to the one or more vector embeddings using the defined relationship; and retrieving one or more another document portions corresponding to the identified one or more another vector embeddings and including the retrieved one or more document portions and the retrieved one or more another document portions in the response;

search the plurality of vector embeddings in the graph structure using the one or more search vectors; and generate, based on the searching, a response to the query.

20. A non-transitory computer-readable storage medium, the computer-readable storage medium including instructions that when executed by at least one processor, cause the at least one processor to:

determine, using a machine learning model, a relationship between two or more document portions in the plurality of document portions based on a content of each document portion in the two or more document portions, and associate the two or more document portions based on the relationship;

generate a graph structure having a plurality of nodes, each node in the plurality of nodes includes at least one vector embedding in a plurality of vector embeddings representing at least one document portion in the plurality of document portions, wherein each node in the plurality of nodes is connected to another node in the plurality of nodes in accordance with the relationship between document portions included in the nodes;

receive a query to retrieve information from the plurality of electronic documents;

generate, based on the received query, one or more search vectors;

search the plurality of vector embeddings in the graph structure using the one or more search vectors; and generate, based on the searching, a response to the query, and represent the response to the query on a graphical user interface of at least one computing device.

* * * * *